(12) United States Patent
Ben-Shaul et al.

(10) Patent No.: US 6,976,090 B2
(45) Date of Patent: Dec. 13, 2005

(54) DIFFERENTIATED CONTENT AND APPLICATION DELIVERY VIA INTERNET

(75) Inventors: Israel Ben-Shaul, Herzliya (IL); Israel Cidon, Haifa (IL); Ilan Kessler, Haifa (IL); Itai Lev-Ran, Haifa (IL); Oren Unger, Haifa (IL)

(73) Assignee: Actona Technologies Ltd. (IL)

( * ) Notice: Subject to any disclaimer, the term of this patent is extended or adjusted under 35 U.S.C. 154(b) by 818 days.

(21) Appl. No.: 09/785,977

(22) Filed: Feb. 16, 2001

(65) Prior Publication Data

US 2002/0010798 A1 Jan. 24, 2002

Related U.S. Application Data

(60) Provisional application No. 60/198,908, filed on Apr. 20, 2000, and provisional application No. 60/232,580, filed on Sep. 13, 2000.

(51) Int. Cl.[7] .............................................. G06F 15/16
(52) U.S. Cl. ........................ 709/246; 709/218; 709/245
(58) Field of Search ................................ 709/201–203, 709/217–219, 223–226, 245–247

(56) References Cited

U.S. PATENT DOCUMENTS

| | | | | | |
|---|---|---|---|---|---|
| 5,862,325 | A | * | 1/1999 | Reed et al. ................... | 709/201 |
| 6,108,703 | A | * | 8/2000 | Leighton et al. ............ | 709/226 |
| 6,185,598 | B1 | * | 2/2001 | Farber et al. ................ | 709/226 |
| 6,317,777 | B1 | * | 11/2001 | Skarbo et al. .............. | 709/203 |
| 6,430,624 | B1 | * | 8/2002 | Jamtgaard et al. .......... | 709/246 |
| 6,484,143 | B1 | * | 11/2002 | Swildens et al. ........... | 709/224 |
| 6,604,106 | B1 | * | 8/2003 | Bodin et al. ................. | 709/203 |

OTHER PUBLICATIONS

Labrinidis, Alexandros; and Roussopoulos, Nick, "Generating dynamic content at database–backed web servers: cgi–bin vs. mod_perl," SIGMOD Record, vol. 29, No. 1, Mar. 2000, pp. 26–31.*

U.S. Appl. No. 60/198,908, Ilan Kessler, filed Apr. 20, 2000 entitled "Differentiated CDD: System Description" Version 0.05.*

U.S. Appl. No. 60/232,580, Israel Ben–Shaul et al., filed Sep. 13, 2000 entitled Caching and Processing of Dynamic Content at the.*

P. Mockapetris, Request for Comments: 1035, entitled "Domain Names Implementation and Specification" Nov. 1987, 55 pages.*

R. Fielding et al., Request for Comments: 2616, entitled "Hypertext Transfer Protocol—HTTP/1.1" Jun. 1999, 114 pages.

BIND 9 Administrator Reference Manual (ARM), Version 9, Sep. 2000, Internet Software Consortium, Redwood City, CA, 96 pages.

* cited by examiner

*Primary Examiner*—Patrice Winder
*Assistant Examiner*—Victor Lesniewski
(74) *Attorney, Agent, or Firm*—Blakely, Sokoloff, Taylor & Zafman

(57) ABSTRACT

A technique for centralized and differentiated content and application delivery system allows content providers to directly control the delivery of content based on regional and temporal preferences, client identity and content priority. A scalable system is provided in an extensible framework for edge services, employing a combination of a flexible profile definition language and an open edge server architecture in order to add new and unforeseen services on demand. In one or more edge servers content providers are allocated dedicated resources, which are not affected by the demand or the delivery characteristics of other content providers. Each content provider can differentiate different local delivery resources within its global allocation. Since the per-site resources are guaranteed, intra-site differentiation can be guaranteed. Administrative resources are provided to dynamically adjust service policies of the edge servers.

52 Claims, 15 Drawing Sheets

DIFFERENTIATED CONTENT AND APPLICATION DELIVERY VIA INTERNET

CROSS-REFERENCE TO RELATED APPLICATIONS

This application claims the priority of Provisional Application No. 60/198,908 filed Apr. 20, 2000 and Provisional Application No. 60/232,580 filed Sep. 13, 2000.

BACKGROUND OF THE INVENTION

1. Field of the Invention

This invention relates to the transmission of data across an internet. More particularly this invention relates to a technique for content and application level distribution and customization of data and applications across an internet, utilizing an integrated combination of origin servers and spatially distributed controlled edge servers to efficiently deliver content differentiated electronic content or data from content providers to various classes of consumers.

2. Description of the Related Art

With the onset of the internet as the major vehicle for information distribution, e-commerce, and business information technology (IT) management, major efforts have been made to improve the internet's underlying networking infrastructure. Until recently, these efforts have focused mainly on addressing low-level networking issues such as faster connections, improved routing and switching software and hardware. While there have been some major achievements in these areas, it is becoming clear that selectively improving end-to-end delivery of content over the internet by only addressing these low level issues is overly complex and inherently limited. In particular, the decentralized nature of the internet imposes difficult administrative barriers on reaching global service level agreements, and the magnitude of the internet imposes difficult scalability problems regarding the configuration of network elements.

More recently, a new kind of service, termed content delivery and distribution (CDD), has emerged. Example of CDDs include Akamai, Digital Island and Adero.

In the basic model, a CDD provider maintains a network of geographically dispersed caches. When a request for certain content that is covered by the CDD is issued from a client, the domain name system (DNS) server that is authoritative for the site to which the request was issued, redirects the request to one of the caches of the CDD. Typically, the selected cache is chosen based on its proximity to the requester, and on the availability of the requested resource at the cache.

Not all requests for HTTP resources from a given site need to be redirected to the CDD, however. A common model, employed by Akamai Technologies, is depicted in FIG. 1 and FIG. 2. At the origin server 10, hypertext markup language (HTML) pages are modified by assigning the uniform resource locators (URLs) of selected resources. These are typically images with domain name system names of the server of the content delivery and distribution provider 12, instead of the origin server 10. The server of the CDD provider 12 in this example carries the domain name www.cdd.com. As shown in FIG. 1, when a client 14 requests a page that includes such "exported" objects, the request, indicated by line 16, arrives at the origin server 10 as a usual request (following the DNS name resolution at domain znn.com). The origin server 10 replies with the desired page to the client 14, indicated by line 18. Subsequent requests from the client 14 for the embedded objects within that page are served from the servers of the content delivery and distribution provider 12, however, as indicated by line 20 in FIG. 2.

The integrity of the model shown in FIG. 1 and FIG. 2 relies on a constellation of DNS servers: the client regional DNS server 22, the root DNS server 24, the authoritative DNS server 26, and the DNS mapping server 28. The latter is an enhanced DNS system that is responsible to return an IP address of the server of the CDD provider 12, which is located in the proximity of the client for each DNS resolution request in the zone www.cdd.com, originating from a regional DNS server. BIND is the most popular standard domain name server in the internet today. It dates to 1986, and BIND version 8 dates to 1997. BIND version 8 compiles and runs on major UNIX (TM) origin servers, and on Windows-NT (TM). On UNIX (TM) it runs under the name "named". On Windows-NT (TM) it runs as a service. BIND has a textual configuration file that describes its general behavior as a Name Server, and also configures specific information about zones. Especially the zones for which that BIND is authoritative, and the root (".") zone. The authoritative information, in the form of resource records, is held in a zone file, which is a textual file describing the zone data.

The most common types of resource records are given in Table 1.

TABLE 1

| Record Name | Record Type | Brief Definition Of Record |
|---|---|---|
| A | Address (IP) | Maps a host name to an IP Address. |
| NS | Name Server | Identifies an authoritative name server for a domain zone. |
| CNAME | Canonical NAME | Alias hostname for the official hostname. |
| SOA | Start Of Authority | Identifies the best name server for information on a unique domain. Only one SOA can be used per one. |
| PTR | PoinTeR | Reversely maps an IP address to a name versus mapping a name to an IP address like an "A record" |
| HINFO | Host INFOrmation | Identifies hardware information of host. |
| MX | Mail Exchange | Identifies a host that delivers, receive and forward mail. |

Upon start or restart BIND first reads the configuration file, and according to that file it loads the zone information from the zone files.

BIND keeps two Data-Bases as hash tables: (1) "fcachetab", used for storing Authoritative data read from zone files; and (2) "hashtab", used for all the locally cached DNS data.

BIND works in an event driven environment. The program "named" listens on each registered UDP/TCP port for incoming messages which can be requests or responses, and dispatches according to the type of the message. While processing a request, BIND tries to find the information in its cache, and if unsuccessful, issues a request to another name server, and awaits a response.

While processing a response, BIND may update its caches with new DNS information. This process may involve updating various classes of resource records. The update is automatic, and the appearance of these records depends on the relevancy of these records for BIND. BIND treats response information according to its precedence. The more authoritative the information is, the more reliable it is considered to be.

The DNS mapping server 28 is a known component. This device is part of the distributed director produced by Cisco (San Jose, Calif.), as well as International Business Machine's (Armonk, N.Y.) Network Dispatcher products. These mapping DNS servers return the IP address of a CDD provider cache or server that is as close as possible to the client regional DNS network.

It is often the case that the content delivery and distribution provider has a large number of geographically dispersed content delivery and distribution servers. It could manage to forward the requests to the content delivery and distribution servers, using some form of location based resolution of DNS names to IP addresses, based on the origin of the request. Assuming that the content delivery and distribution servers have the desired content cached or mirrored, are relatively near the client, and are not overloaded, then these objects can be served quickly and transparently. This reduces significantly the latency for content arrival, a critical objective in today's web. It should be noted that in this arrangement, the content providers, which control the origin servers, need know nothing about the distribution policy of the content delivery and distribution provider.

A second type of content delivery includes selected replication of web and media data from a single place. This approach was taken by SightPath of Boston, Mass. in their SODA architecture. Here a central staging center copies a certain resource only to a selected number of distributed servers and maintains the knowledge where each replica resides. Since not all servers include a replica of all resources, the SightPath architecture requires that all requests (such as http requests for web resources) are first directed to the central staging server and then are redirected, using a special http redirection command, to a server which is in the proximity of the requesting client. There is no way to use the DNS redirection method here, as the selected replication method supplies a single resolution for multiple resources request. The connection between the staging server and the distributed servers in this approach might face difficulties when crossing firewalls. This is because the SODA model requires the staging server to push the content into the distributed servers, and is not accomplished via standard web technologies.

While promising, the first type of content delivery and distribution model has major drawbacks. First, it imposes centralized control. While physically distributed, the control and management, maintenance, organization, revenue collection and general service provisioning are all done by a single entity. This implies that no matter how large it is, such service is likely to hit scalability barriers that are unavoidable, given the size of the internet. Moreover, most content delivery and distribution models involve a location based DNS resolution that involves multiple DNS request and response exchanges for a given resolution. Referring again to FIG. 1, the resolution process starts with the client regional DNS server 22. Then, if not cached to a root DNS server 24, the process transfers to the authoritative DNS server 26 for all content delivery and distribution domain names, and, if necessary, to a central DNS mapping server 28, such as the above noted distributed director, that maps the request according to its origin IP address to a certain content delivery and distribution server.

Second, the first type of content delivery and distribution follows a basic "black-box" approach. Content providers "export" selected HTTP resources to the content delivery and distribution provider, and from then on they lose control over the delivery characteristics of these resources. Moreover, the differentiation in delivery that a content provider can employ is extremely coarse: an object is either provided via "content delivery and distribution", or served from the origin server. While some differentiation "rules" may be provided internally by the content delivery and distribution, e.g., depending on the demand for some resources, content providers are unable to alter the delivery despite some important parameters. Such parameters include the relative importance of content objects, e.g., headlines vs. minor news, time and location of delivery, type of content (dynamic, streaming media, etc.), customers, both individuals and business partners, who are important to the content provider, refresh policy, and more. It should be noted that even if some of these parameters could be somehow specified in the first type of content delivery and distribution, the centralization of control would minimize their impact due to the global considerations in handling content for multiple content providers.

Third, both CDD methods are mostly restricted to delivery of static content. In particular, dynamic content cannot be cached, and must always get generated at the origin site.

Fourth, both types of content delivery and distribution are restricted to transparent delivery that merely enhances performance, but does not impact the content. This implies that any differentiation in the actual content that is being delivered, as opposed to how it is delivered, must be performed in the origin server. For example, in order to differentiate between regular users and paying subscribers the origin server needs to maintain passwords for each subscriber and perform on-line authentication for each privileged request.

Fifth, in the first type of content delivery and distribution, if the content that is delivered to customers is carried over secured channels such as virtual private network (VPN), the overall content delivery system is ineffective. The reason is that caching and mirroring depend on open use of URLs and on storing the related objects at public caches and mirror servers. In the second model the use of a special control protocol between the staging server and the distributed servers, which requires the former to establish connections to the latter, will not be allowed across the firewalls of most organization and content providers.

Sixth, both content delivery models are currently limited to bringing the content to either the target customer, the Internet service provider (ISP) and in many cases only up to a Network Access Point (NAP) which is close to the customer's ISP. In many cases, and in particular the business to business (B2B) side of the E-commerce, it is important to deliver the content to the customer's own network. This is true since the Internet connection speed from an organization to its ISP is usually much slower than the speed on the internal organization network. Therefore, placing the content within the organization will considerably speed up delivery to the end user.

Finally, the end customer has no control on the content delivery policy. In certain cases, in particular the business to business (B2B) side of the E-commerce, it is important to allow the customer to define which type of content should be delivered, at what times, at which priority, and at what speeds. The customer may wish to select relevant or newly created content and deliver it at certain hours and delivery speeds that are appropriate in terms of its network resources, e.g. during non-busy hours, and the time of actual content use.

SUMMARY OF THE INVENTION

It is therefore a primary object of some aspects of the present invention to provide an improved open technology for decentralized and differentiated content and application delivery.

It is another object of some aspects of the present invention to provide a decentralized and differentiated content and application delivery system that allows content providers to directly control the delivery of content based on regional and temporal preferences, client identity and content priority as well as the characteristics of the resources that are delivered to the end users.

It is yet another object of some aspects of the present invention to provide a decentralized and differentiated content and application delivery system that delivers the content to the end customers, and to allow end customers to customize the delivery process based on local preferences, content priority, delivery time and the characteristics of the resources associated with the delivery.

It is yet another object of some aspects of the present invention to provide a scalable platform for decentralized and differentiated content and application delivery the can be easily and gradually integrated into existing worldwide web infrastructure.

It is another object of some aspects of the present invention to provide a flexible and fault tolerant DNS system that can direct the user requests for a content provider resource or resource class either to a local server that will serve the user locally or to the origin site according to the user location and the type of resource requested.

It is another object of some aspects of the present invention to provide an extensible framework for edge services, employing a combination of a flexible profile definition language and an open pluggable edge server architecture in order to add new and unforeseen services on demand.

In a key aspect of the invention, which separates it from conventional content delivery and distribution systems, content providers are enabled to define and carry out advanced services on the edges of the internet. The techniques herein disclosed can be seamlessly and gradually integrated into existing web infrastructure, and can be deployed globally or regionally, over the internet, over secured extranets and within corporate intranets.

The objects of the present invention are attained by a model termed differentiated content and application delivery (DCAD). In this model, content delivery is completely decentralized, enabling individual content providers full or shared control over their own dedicated resources via whitebox, fine-grained and explicitly specified delivery characteristics. There are two main levels of differentiation:

First, there is differentiation between content providers. Each provider may be allocated its own dedicated resources, which are not affected by the demand or the delivery characteristics of other providers. Thus, the intended delivery characteristics can be guaranteed by the system.

Second, there is differentiation within a content provider. Since each provider owns its resources, it can allocate different "local" delivery resources to different content, within its global allocation. Since the per-site resources are guaranteed, intra-site differentiation can also be guaranteed.

According to some aspects of the invention, a high-degree of decentralization and differentiation is provided by delegation and off-loading of functionality and control from an origin site (OS), itself consisting of one or more origin Web servers (OWS),) to a new web entity which referred to herein as an edge server (ES).

In some preferred embodiments each origin site has a set of subordinate edge servers which are geographically distributed and reside in the "edges" of the internet. There are two kinds of edge servers: public edge servers, which reside in internet service provider facilities (ISPs) and serve individual end-users, and dedicated edge servers, which are located within a possibly secured private domain such as an organizational intranet. They may be privately owned or supplied by ISPs as customer premise equipment (CPE). Unlike conventional content delivery and distribution servers, which are shared among content providers and controlled by a centralized content delivery and distribution provider, each edge server is dedicated to its own content provider and is controlled by it. This approach does not exclude the option to host several virtual edge servers under the same physical host edge server, similar to web hosting. But each virtual edge server is separately managed and controlled by its own origin site. This approach does not exclude the option that part or all the control over the delivery process and each edge server is defined at the target site where the edge server resides or from a third party site. Such multiple sources of control may work in cooperation with the origin site. Optionally the sources of control can be realized by separate policy servers linked to the third party site or to the origin site. Subsidiary links to the edge server may be provided as well.

Each edge server implements the policy that is specified by the content provider and other sources of control. Thus, the content provider may control the operation of its edge servers, although a specific policy can delegate some or all the control to the edge servers, to a local policy derived at the target site, or in other cases to a different (third party) source of control. The behavior and evolution of edge servers, directed from the origin site, locally or from a third party location, is specified in a new content delivery markup language (CDML), the encoding of which is facilitated by a high-level and easy-to-use content delivery authoring and deployment tool, and in a more advanced content delivery scripting language (CDSL).

An improved mechanism of domain name resolution is employed. Using edge DNS servers it is possible to achieve redirection of HTTP requests using dynamic cache replacement. In some embodiments the cache of the Edge DNS server is modified by trusted entities, while on other embodiments, the Edge DNS server reregisters domain name entries in regional DNS name servers.

In some preferred embodiments CDML may be partitioned into at least some of the following distinct specifications. These specifications include, first, the description of the resources at the origin site. Such as the protocol, resource type, author, creation time, keywords, location of replicas, location of the source code that created the object, target groups, special events related to the resource, a list of edge servers that can serve the resource, etc. Second, the description of the target groups is specified in terms of region, language, interest, organization type, security level, edge server specification and capabilities, communication speeds, subgroups, type of events, etc. Third, the delivery policy and actions that relate the delivery of resources to target groups and notification triggered for such deliveries are specified. Fourth, there is a specification of the DNS and HTTP redirections policies. Fifth, the load balancing policy to be carried by the edge server is specified. Sixth, there is a description of the environment and the programming resources for conducting dynamic content generation. In some preferred embodiments CDML is based on XML, and the resource description part is an extension of resource definition framework (RDF).

Edge servers are integrated into the web's control and data flow in the following manner. The URLs of some of the origin server's resources objects and pages may be slightly modified to include the domain name of a regional edge server. Since, however, all regional servers are mapped to a domain name selected from a fixed small set of domain names, the set of regional addresses is small and bounded. Within each edge system a request for a URL is first resolved in terms of the domain name system (DNS). The client regional DNS system may return for each domain name either the network address of a local edge server or the network address of one of the origin servers. Thus, for selected domain names in the set, requests for the origin site's content arrive at a regional, or private edge server, and the edge server handles the requests according to the specified policy. If there is no regional edge server, the request is directed to the origin site.

In some preferred embodiments the client regional DNS system is composed of forwarding DNS resolution requests for certain zones in the OS domain name to a special local DNS entity termed the EdgeDNS. The EdgeDNS is responsible to return the IP address of either the edge server or another server for resources that whose URL resides in these domains. The control over which resources zones are directed to the edge servers may be controlled via the edge server policy.

The differentiated content and application delivery model supports several types of edge-level differentiation, alone, or in combination, each of which can be mapped to various edge-level services:

1. Content based differentiation. This basic characteristic allows one to specify different priority to different content. This may affect the priority on the cache in terms of replacement scheme, the frequency of invalidation and mirroring policy. For example, in e-commerce, resources that are associated with a transaction should be assigned a relatively high priority. Also, applications that can migrate can be executed at the edge server, thereby off-loading the origin site and improving response time.

2. Regional and group differentiation. This characteristic allows one to differentiate delivery based on the location or the organization membership of the edge server. Thus, the same resource may have different priorities in different edge servers, permitting optimized use of resources. Or, the same URL may be translated to different physical resources, depending on the region or organization in which the request is made. Or, a certain resource may be visible, in whole or in part, to only some organizations, but not to others.

3. Temporal differentiation. Content may be prioritized based on time to address different access patterns during the day, or during holidays and other special days.

4. Customer-based differentiation. The identity, preference, and group membership of the customer may impact the definition of both the delivery and the content.

The following services are supported by the edge server:

1. Advanced Caching and Mirroring. This is the dominant functionality in most current content delivery and distribution services. Unlike conventional client-based caches and other content delivery and distribution based caches, the content of edge server caches and their validation policies are controlled by the origin site, the target site or a third party site, using the service policy. A unique feature of the differentiated content and application delivery model according to the invention is the capability of the content provider to set cache policies based on regional, temporal, and other fine-grained characteristics. This also includes full mirroring and pre-position of content at regular times or at when certain conditions are met, for example when the network is unloaded or when a certain changes are introduced to the content. Another capability is the active update and invalidation of cached resources at regular times, or when certain conditions are met.

2. Quality of service. The priority or privileges of certain resources objects or contents at certain edge servers is based on their relative importance. Also certain clients can receive different priority or privileges for different content at certain edge server. The quality of service policy may affect storage allocation, processing priority or communication priority. In some preferred embodiments communication priority is regulated by the queuing-policy for reception of a request or transmission of a response. In other preferred embodiment of the invention, communication priority is assigned by applying network marking, e.g. term-of-service (TOS) bits at the IP header or lower level LAN priority) or by allocating such flows networking resources via signaling protocols, e.g. user-to-network interface (UNI) in asynchronous transfer mode (ATM) or reservation protocol (RSVP) in IP, or by other allocation means, such as IP DiffServe or multiprotocol label switching (MPLS).

3. Packing Services. These services essentially leverage the distributed architecture of the system. Content can be compressed in the origin site and uncompressed in the edge servers transparently. This has two advantages. It expedites the delivery in the backbone of the internet, while at the same time not requiring each browser to explicitly perform computationally expensive decompression. Compression is only one aspect of packing. Another example which is particularly applicable to private edge servers is encryption which is decoded once in the edge server and then becomes readily available to a group of employees of the organization.

4. Delivery of applications and other special content. This includes support for application execution on edge servers, e.g., e-commerce transactions, and delivery of streaming media. In particular, a given executable resource which is replicated at the edge server may at times execute at the edge server, and at other times at the origin site, depending on the specified policy for that resource. If an application runs at the edge, it can use system variables (e.g., location), set by the edge server but controlled by the origin site, in order to obtain local information and integrate it into the application.

5. Local feed. This service enables the supplementation of some of the content from local sources, by mapping the regional URLs to regionally created content, as opposed to remote content that is only served by the regional edge server. Local feed also enables the provision of local service policies, preferably using the same CDML control language, by the local administrator.

6. Domain name server dynamic configuration. This service provides dynamic updates of domain name server entries. Using dynamic configuration each system of edge servers is configured to direct each name within the origin site subdomain either to an edge server or to one of the origin site servers.

7. Statistics collection and reporting. This service provides site accounting information, e.g., page hits, by collecting and merging relevant statistics and accounting information from edge servers.

8. Redirection. This service provides the edge server with the ability to direct requests for particular resources to other local or remote servers using redirection methods such as HTTP redirections. These services help to use the edge server as a local controller for a group of servers or for the purpose of edge server load balancing.

9. Different site views. This important service allows for different views of a site to different customers. Specifically, when an edge server is located within a possibly secured private client domain, such as an intranet, it can be used as a differentiation mechanism that provides special services for a particular class of clients. Such services may not be provided to clients who are outside the class and who access the origin site directly or who access a shared edge server. This form of service differentiation is particularly useful in business-to-business (B2B) applications, e.g., clients of a market research company, CAD system providers or a large wholesale vendor. This service enables different views of the content at different edge server locations and provides special regional and local services and privileges. Such services are enabled for a particular edge server by the downloading of CDML instruction and data structures from the origin site, the target site or a third party site, and by interpretation of CDML code and data structure within the content. Other features of this service include the following:

a. Individual edge servers can be configured to allow or suppress certain privileged or allowable objects such as pages, images or streams. For example pictures or music types can be hidden or protected at certain locations.

b. Decoding and caching of encrypted pages can be enabled at certain sets of edge server, thereby allowing certain edge server to access and present privileged or encrypted origin content to particular clients, while other edge server or clients are unable to decode such content. Key distribution and enabling instruction can thus be distributed on secured instruction pages, using CDML coding. The service increases system efficiency because decoding and caching of clear information at the edge server eliminates the overhead of on-line decoding at local browsers or by other application clients. Exemplary uses of this service include provision of different levels of documentation to various classes of clients, such as marketing reports of different value, and providing different levels of software or model distribution.

c. Certain edge servers can be enabled to display privileged links while others do not disclose them.

d. In some preferred embodiments, for a given URL, a particular edge server can be directed to fetch desired material from different pages by conducting a process of URL translations or modifications. The mapping policy is stored on origin site instruction pages and is dependent on the site policy profile and the URL. Typically it defines a function that is applied to certain URLs in order to map them into different URLs. Thus the same links can lead to different content at different edge server locations. This service, which may be combined with data encryption, enables accessing different type of content from different location for the same web links or objects. For example this service may direct edge servers to a local language object for the same object URL. It requires no processing at any origin server, such as computer graphics interface (CGI) processing at the server farms.

e. In some preferred embodiments particular edge servers are enabled to decode and cache compressed information in uncompressed form, where the compressed information is stored at the origin server or farm. This feature reduces traffic and accelerates transfer. In combination with URL translation, edge servers that have decoding capabilities may be directed to fetch compressed information instead of fetching the normal uncompressed content addressed by the original URL. The compressed version of pages and their URL encoding, along with the related automatic construction of instructions for the URL mapping can be obtained automatically by a single application. In some preferred embodiments only those pages which possess high compression values have compressed versions. CDML tagging, or the use of URL names which are recognized automatically, are employed to indicate the existence of an additional compressed version.

f. In some preferred embodiments particular edge servers are enabled to copy or to allocate content fetched from the origin site to other local storage forms or formats. For example the content can be stored within a local file system and classified within appropriate predefined directories. In another example, web based application notes can be stored in PDF format in the local file system to be used by local engineers.

g. In some preferred embodiments particular edge servers are enabled to modify the content according to the service policy, information or tags which are included in the content itself or the user profile. In particular the edge server may combine local content with the remote one. For example a user request from a book store for a cook book will return a list of cook books. The local edge server may add to the content information regarding local food and cookware stores in response to a directive that is embedded in the content as well as in the locally stored user profile.

10. Request Modification. In some preferred embodiments particular edge servers are enabled to modify the user requests before they are sent to the origin site. This can be done in terms of the described above URL translation or in terms of appending additional information to the request. Such information may describe the user profile (age, gender, hobby, affiliation, location, browsing device) for commercial or matching use, contain passwords for authentication etc.

11. Conditional delivery. In some preferred embodiments the edge server may pre-fetch content only when network is unloaded or adapt the rate of delivery to network conditions. This can be done by providing the edge server with the appropriate directives and with monitored information regarding the status of network or link loads.

12. Origin site load balancing. In some preferred embodiments the edge server may direct user requests to or download content from unloaded origin or relatively close servers. The edge server may maintain a profile of servers load and network condition by measuring rates and latencies experienced with a set of remote origin servers. Using such an approach, the best origin servers in terms of network distance and loading combination may be selected.

13. Origin site protection and isolation. In some preferred embodiments the origin site can be fully isolated from users which are served exclusively from edge servers. This feature can provide exclusivity where only certain ISPs or B2B partners are allowed to access the origin site information or can provide security where all edge server access to the origin site are authenticated and possibly encrypted.

14. Caching of Dynamic Content. The generation of dynamic content often depends on the user request and on server-side parameters. An uncontrolled edge server is limited in its capability to cache dynamic content because it cannot know which parameters affect the response. Using a controlled edge-server, the origin site can specify exactly what parameters affect each dynamic content program, thereby allowing the edge server to precisely cache dynamic content.

15. Simple monitoring. Edge servers get updates on their policies by periodically polling the origin site for new policies. Using this behavior, the origin site provides basic "liveness" checking, telling at any point for each edge server when it last contacted the origin site.

An important characteristic of differentiated content and application delivery policy is its adaptability. Policies for a given content may change dynamically, and can be immediately applied. The differentiated content and application delivery model provides an evolution path for future functions. Since CDML can be extended, the edge server includes the functionality of a full fledged web server and the content platform is controlled by the content provider remotely. CDML extensions to provide new or modified functions as well as the software updates which are required to provide these new functions are automatically downloaded by the edge server from the origin site or any other site equipped with that capabilities.

Therefore, the above list is by no means exhaustive. The extensible system architecture according to the invention enables the incremental addition of new services.

The invention provides a content and application delivery system comprising an origin web site which has an origin web server having a first memory for storing a first version of web content. The system includes an edge server communicating via a data network with the origin web server and with a policy control server. The edge server has a second memory for storing a second version of the web content and deriving the second version from the origin web server according to directives of a service policy that resides at the policy control server. The edge server downloads the directives of the service policy from the policy control server via the data network. A request of a user directed to the origin web site for a resource from the web content is redirected to the edge server, and responsive to the request a third version of the web content is provided to the user from the edge server. the third version is derived from the second version in accordance with the directives of the service policy.

According to an aspect of the invention, the policy control server is the origin web server itself.

According to still another aspect of the invention, the directives of service policy are specified using an XML based language.

According to another aspect of the invention, the directives of the service policy include a description of resources of the origin web site.

According to a further aspect of the invention, the description of resources is specified using a resource definition framework, which has extensions comprising protocol, type, size, encoding convention, creation time, expiration time, keyword, target groups, an alternate URL for fetching the resources, and a location of a code for creating a dynamic resource, wherein the description of resources includes at least one of the extensions.

According to yet another aspect of the invention, the directives of the service policy include a description of users at a target site.

According to still another aspect of the invention, communication between the edge server and at least one of the policy control server and the origin web server is effected using an http protocol or an https protocol.

According to yet another aspect of the invention, the edge server supports a plurality of origin web sites.

According to an additional aspect of the invention, the policy control server includes a plurality of web servers. The web servers can be the origin web server, the edge server or a server located at a third party site.

According to another aspect of the invention, the directives comprise a description of an edge server group associated with the origin web site.

According to a further aspect of the invention, the description of an edge server group includes information concerning at least one of an organization type, geographical region, language, business relation to the origin web site, edge server hardware capabilities, edge server software capabilities, edge server security specifications, internet location, and internet connection speed of members of the edge server group.

According to yet another aspect of the invention, the second version is derived from the first version by selecting resources from the first version according to predetermined criteria. The criteria comprise at least one of a resource URL, a time of resource generation, length, keyword list, target groups, data format, and key. The second version is further derived from the first version by transforming a selected resource in the second memory responsive to the directives. The directives comprise a description of an edge server group associated with the origin web site, and storing the transformed selected resource in the second memory.

According to still another aspect of the invention, the second memory is a cache memory.

According to an additional aspect of the invention, the predetermined criteria comprise updated resources in the first version that are absent in the second version.

According to a further aspect of the invention, the service policy differentiates a resource of the first version from a resource of the second version according to an attribute of the edge server, and an attribute of at least one of the first resource and the second resource.

According to an aspect of the invention, the attribute includes at least one of a caching priority, caching validation, a caching invalidation, preposition at a predetermined time and preposition upon an occurrence of a predetermined event.

According to a further aspect of the invention, the service policy differentiates a resource of the second version from a resource in the third version according to at least one of attribute of the user, attribute of the edge server, request time and attribute of the resource.

According to a further aspect of the invention, one of the directives of the service policy instructs the edge server to redirect the request of the user to another web resource.

According to yet another aspect of the invention, the other web resource is located at the origin web site.

According to still another aspect of the invention, the other web resource is external to the origin web site.

According to an additional aspect of the invention, the request is redirected by sending an http redirect instruction from the edge server to the user.

According to still another aspect of the invention, the request is redirected to another resource by the edge server by modifying a URL portion of the request and loading the resource from the origin site.

According to an aspect of the invention, the request is redirected according to an attribute of the user.

According to another aspect of the invention, at least two of the first version, the second version, and the third version are identical.

According to a further aspect of the invention, a group of resources of the first version is stored in a compressed form, and a corresponding group of resources of the second version is uncompressed by the edge server according to the directives.

According to still another aspect of the invention, the group of resources of the first version is stored in a packed form, and the corresponding group of resources of the second version is unpacked by the edge server according to the directives.

According to a further aspect of the invention, a resource of the first version is in an encrypted form, and a corresponding resource of the second version is decrypted by the edge server according to the directives.

According to an additional aspect of the invention, a resource of the first version is communicated by a first protocol to form a resource of the second version, and the resource of the second version is communicated by a second protocol to form a resource of the third version.

According to an aspect of the invention, the first protocol is file transfer protocol and the second protocol is http.

According to another aspect of the invention, the first protocol is identical to the second protocol, except that parameters of the first protocol differ from parameters of the second protocol.

According to yet another aspect of the invention, the resource has an action defined therein, and the edge server performs the action.

According to a further aspect of the invention, the action includes execution of an application.

According to an aspect of the invention, the application is a web form processing application, wherein in a first step the edge server communicates a form to be completed by the user, and in a second step parameters of the form are transmitted from the user to the edge server.

According to another aspect of the invention, the application is a user password processing application, wherein in a first step the edge server triggers a password template to be filled by the user, and in a second step form parameters of the password template are transmitted from the user to the edge server.

According to an additional aspect of the invention, instructions of the application cause the edge server to identify an attribute of the user that is included in the request and to return resources in the second memory of the edge server that are associated with a URL of the request and the attribute of the user.

According to an aspect of the invention, the attribute is identified in a request header has a cookie, and the resources are defined in the directives of the service policy, wherein the directives are stored in the edge server.

According to another aspect of the invention, the application is a user password processing application, wherein the edge server forwards the request to the origin web server, and delivers a user name and a user password to the origin web server. Responsive to the user name and the user password, the resource is transmitted by the origin web server to the edge server.

According to yet another aspect of the invention, the resource is held in a cache by the edge server.

According to yet another aspect of the invention, the application is a web common gateway interface extension or a Java servlet.

According to an aspect of the invention the user is a member of a group, and responsive to the request the edge server authenticates a membership of the user in the group.

According to another aspect of the invention, the edge server is in communication with an external web server via the data network, and a portion of the second version is obtained from the external web server according to the service policy.

According to another aspect of the invention, the resource is received by the edge server from the origin web server and stored therein, wherein the resource is modified prior to being stored in the edge server, according to attributes of the edge server, the user, and the resource that are specified in the directives of the service policy.

According to a further aspect of the invention, the resource is modified by replacement thereof with a second resource that is local to the edge server.

According to yet another aspect of the invention, the resource is modified by combination thereof with a second resource that is local to the edge server.

According to still another aspect of the invention, the resource is a web page that is modified by an operation consisting of at least one of frame insertion, textual or graphic insertion, html code insertion, link modification, embedded object modification, and adaptation of the web page to requirements of a browser.

According to an additional aspect of the invention, the request is modified according to edge server, user and resource attributes that are specified in the directives.

According to an aspect of the invention, the request is modified by an operation consisting of at least one of an addition of user information to an http header of the request, adding a cookie to the request, modifying a URL of the request, modifying form content of the URL, modifying a body of the request, and adding password information to the URL.

According to an aspect of the invention, the system includes a DNS system associated with the data network, and the request is redirected by the DNS system, wherein the DNS system resolves a domain name that is included in the request for the resource, and the DNS system provides the user with an address of one of the origin web server, another web server that can serve the resource, and the edge server.

According to another aspect of the invention a requested resource includes a first URL. In a first operation the first URL is modified to define a second URL having a domain name value such that a routing of the request using the second URL is directed to the edge server, and in a second operation the second URL is modified to define a third URL having a domain name value such that a routing of the request using the third URL omits the edge server.

The invention provides a computer implemented method of electronic commerce, comprising the steps of storing a first version of web content in a first server, implementing a service policy as control instructions that reside in the first server, transmitting the control instructions from the first server to a second server, wherein the control instructions reside in the first server. The method further comprises the steps of, responsive to the control instructions, storing a second version of the web content in the second server, redirecting a first request of a first user directed to the first server for a first resource of the web content to the second server, providing the first user with a third version of the web content from the second server, redirecting a second request of a second user directed to the first server for a second resource of the web content to the second server in accordance with the control instructions, providing the second user with a fourth version of the web content from the second server in accordance with the control instructions, and associating the first user with the second user via a communication path extending through the second server.

According to an aspect of the invention, the third version and the fourth version are identical.

An additional aspect of the invention includes the step of differentiating the first version from the second version according to an attribute of the second server.

An aspect of the invention includes the step of differentiating the second version from the third version according to a criterion consisting of at least one of an attribute of the user, an attribute of an edge server, a request time and an attribute of the resource.

Another aspect of the invention includes the steps of compressing the first version, downloading the first version from the first server to the second server, uncompressing the first version in the second server, and deriving the second version from the first version in the second server.

According to yet another aspect of the invention, the first resource executes an application.

According to still another aspect of the invention, the step of executing an application includes communicating a form to be completed by the first user, and accepting parameters of the form from the first user.

According to an additional aspect of the invention, the step of executing an application includes triggering a password template to be filled by the first user, and accepting parameters of the password template from the first user.

The invention provides a domain name system, comprising a regional DNS server that is non-authoritative for an external domain name zone, a root DNS server, and an authoritative DNS server for the external domain name zone. The regional DNS server, the root DNS server, and the authoritative DNS server are linked via a data network. In response to a DNS address resolution request for a name within the external domain name zone received from a client, the regional DNS server effects a first resolution of the DNS address resolution request into a first network address and communicates the first network address to the client. The first network address is different from a second network address that is configured in the authoritative DNS server. The second network address is a second resolution of the DNS address resolution request in the external domain name zone.

According an aspect of the invention, the first resolution effected by the regional DNS server is controlled by a policy control server that is linked to the data network.

According to an additional aspect of the invention, an Edge DNS server is linked to the data network.

According to an aspect of the invention, the regional DNS server conducts a zone forwarding procedure to the Edge DNS server for a domain name corresponding to the first resolution.

According to an additional aspect of the invention, the first resolution effected by the regional DNS server is controlled by a policy control server that is linked to the data network.

According to another aspect of the invention, responsive to the zone forwarding procedure, the Edge DNS server returns the first resolution of the DNS address resolution request to the regional DNS server.

According to a further aspect of the invention, the first network address is registered in the Edge DNS server in response to a DNS cache registration operation.

According to yet another aspect of the invention, a resolution table of the Edge DNS server is automatically derived from the regional non-authoritative DNS server responsive to a directive of the policy control server.

According to still another aspect of the invention, the Edge DNS server includes a plurality of Edge DNS servers, wherein in an event of a failure of a first one of the Edge DNS servers, a second one of the Edge DNS servers is substituted therefor.

The invention provides a method of domain name resolution, comprising the steps of receiving a DNS address resolution request via a data network from a client for a name within an external domain name zone. The request is received in a regional DNS server that is non-authoritative for the external domain name zone. The method further comprises the steps of obtaining a first resolution of the DNS address resolution request from an authoritative DNS server for the external domain name zone via the data network, defining a first network address, wherein the authoritative DNS server is linked to a root DNS server in the data network, effecting a second resolution of the DNS address resolution request in the regional DNS server, defining a second network address, wherein the second network address is different from the first network address, and communicating the second network address to the client via the data network.

An aspect of the invention includes the steps of linking a policy control server in the data network, and controlling the second resolution according to a policy of the policy control server that corresponds to the name in the external domain name zone.

According to an aspect of the invention, the policy control server resides in an origin server that corresponds to the name in the external domain name zone.

According to a further aspect of the invention, the policy controls the second resolution by specifying a domain name according to an operational criterion of an origin server in the data network.

The invention provides a method of domain name resolution, comprising the steps of receiving a DNS address resolution request via a data network from a client for a name within an external domain name zone in a regional DNS server that is non-authoritative for the external domain name zone, wherein an authoritative DNS server is accessible in the data network by the regional DNS server, and the name is resolvable in the authoritative DNS server to effect a first resolution thereof. The authoritative DNS server is linked to a root DNS server in the data network. The method further comprises the steps of forwarding the DNS address resolution request from the regional DNS server to an Edge DNS server via the data network, and instructing an edge server in the data network to periodically write a regional domain name DNS resolution into a resolution cache of the Edge DNS server, wherein a time-to-live interval of the regional domain name DNS resolution exceeds an interval between successive performances of the step of writing. The method further comprises the steps of, responsive to the step of periodically writing the regional domain name DNS resolution, effecting a second resolution of the DNS address resolution request in the Edge DNS server, defining therein a second network address, wherein the second network address is different from the first network address, communicating the second network address from the Edge DNS server to the regional DNS server via the data network, to define an actual network address and communicating the actual network address from the regional DNS server to the client via the data network.

An aspect of the invention includes the steps of obtaining the actual network address by querying the root DNS server to obtain the first resolution in an event of failure of the edge server to perform the step of periodically writing, and storing the first resolution in the Edge DNS server, to define the actual network address therein as the first network address.

According to a further aspect of the invention where the second resolution is effected by an operation consisting of at least one of providing a local edge server network address, providing an origin site network address, and altering the time to live value for a cached resolution.

According to another aspect of the invention, the policy control server resides in an origin server that corresponds to the name in the external domain name zone.

The invention provides a method of domain name resolution, comprising the steps of receiving a DNS address resolution request via a data network from a client for a name within an external domain name zone. The request is received in an regional DNS server that is non-authoritative for a region the external domain name zone, wherein the name is mapped at an authoritative DNS server to a first network address. The regional DNS server forwards the request to an Edge DNS server that is non-authoritative for the external domain name zone, the Edge DNS server defining a second network address, wherein the second network address is different from the first network address. The method further comprises the steps of communicating the second network address from the Edge DNS server to the regional DNS server via the data network, and communicating the second network address from the regional DNS server to the client via the data network.

An aspect of the invention includes the steps of linking a policy control server in the data network, and controlling the second network address according to a policy of the policy control server.

The invention provides a method of domain name resolution, comprising the steps of, using an edge server, inserting registrations into an Edge DNS server for a name of a domain via a data network, wherein the Edge DNS server is configured as a master DNS server for the domain, receiving in a regional DNS server in the data network a DNS address resolution request via the data network from a client for the name of the domain. The method further comprises the steps of, responsive to one of the registrations, effecting a resolution of the DNS address resolution request in the regional DNS server, to define a network address, and communicating the network address from the regional DNS server to the client via the data network.

An aspect of the invention includes the steps of testing unavailability of the Edge DNS server, and responsive to the step of testing, redirecting entries of the regional DNS server to one of a root DNS server and an origin server in the data network.

BRIEF DESCRIPTION OF THE DRAWING

For a better understanding of these and other objects of the present invention, reference is made to the detailed description of the invention, by way of example, which is to be read in conjunction with the following drawings, wherein.

DESCRIPTION OF THE PREFERRED EMBODIMENT

Figure 1:
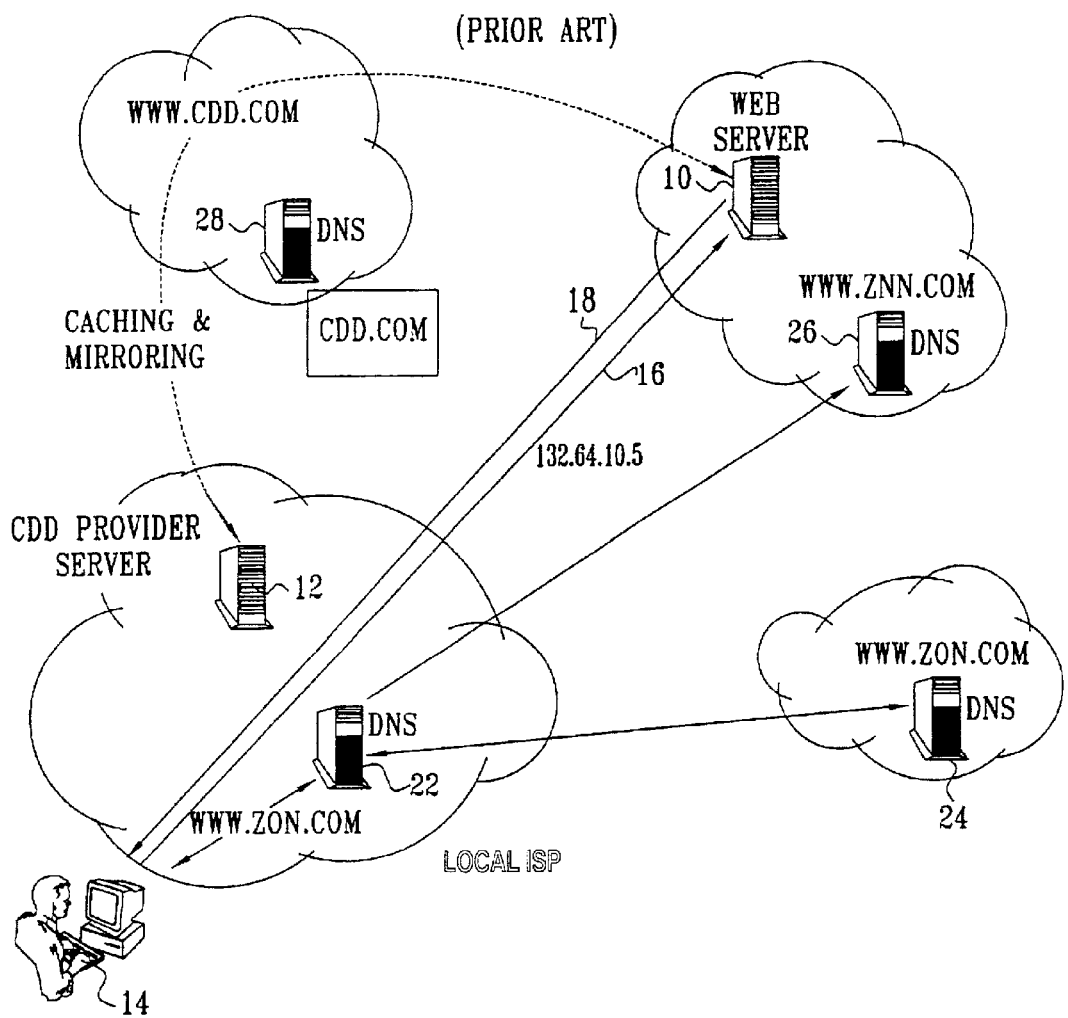
FIG. 1 represents a model of a content delivery and distribution system according to the prior art.

In the following description, numerous specific details are set forth in order to provide a through understanding of the present invention. It will be apparent however, to one skilled in the art that the present invention may be practiced without these specific details. In other instances well known circuits, control logic, and the details of computer program instructions for conventional algorithms and processes have not been shown in detail in order not to unnecessarily obscure the present invention.

The definitions and usages in the following table apply to this disclosure:

TABLE 2

| | |
|---|---|
| Cache | A cache is a program's local store of response messages and the subsystem that controls this message storage, retrieval, and deletion. A cache stores cacheable responses in order to reduce the response time and network bandwidth consumption for future, equivalent requests. |
| Edge Server | A subordinate software server that resides in an "edge" of the internet (e.g., at an internet service provider) and provides enhanced content delivery services to users on behalf of one or more origin servers. |
| Edge DNS Server | A modified local DNS server according to the disclosure herein. |
| External domain name zone | A domain name zone that does not identity the organizations associated with the client or the regional DNS. |
| front edge tool | A tool for defining service profiles. |

TABLE 2-continued

| | |
|---|---|
| In-bound/ outbound | Inbound and outbound refer to the request and response paths for messages: "inbound" means "traveling toward an origin server", and "outbound" means "traveling toward the user agent". |
| Origin Web Site | The web site on which a given resource resides or is to be created. Each origin server is mapped to a single domain name, but it may be mapped to physical hosts in different ways. In particular, a single origin server may span multiple physical servers, and many origin servers can be co-hosted by the same physical server. |
| Proxy | A proxy is an intermediary program that acts as both a server and a client for the purpose of making requests on behalf of other clients. Requests are serviced internally or by passing them on, with possible translation, to other servers. A proxy MUST implement both HTTP client and server protocol sides. A "transparent proxy" is a proxy that does not modify the request or response beyond what is required for proxy authentication and identification. A "non-transparent proxy" is a proxy that modifies the request or response in order to provide some added service to the user agent, such as group annotation services, media type transformation, protocol reduction, or anonymity filtering. |
| Resource | A resource is a network data object or service that can be identified by a Uniform Resource Identifier (URI). Resources may be available in multiple representations (e.g. multiple languages, data formats, size, and resolutions) or may vary in other ways. |
| Service Attributes | A set of properties that parameterize the application of a certain service directive by defining the content to which it is applied, at what times it is applied, on what edge server's it is applied, and for which customers. |
| Service directive | An instantiated request for service from one or more edge server's. It consists of the type of service and the actual service attributes. A service directive is created using the front edge tool. |
| Service profile | A service profile defines what services an edge server should provide and under what conditions each service is enabled. |
| edge server profile | A collection of service, management and configuration directives that apply to a specific edge server. An edge server profile can be derived from multiple profiles. |
| Target content | A service attribute that defines the content to which a certain service directive applies. |
| Target customers | A service attribute that defines the group of end-users to which a certain service directive applies. |
| Target edge server group | A service attribute that defines the group of edge servers to which a certain service directive applies. |
| Target time | A service attribute that defines the times during which a certain service directive applies. |
| User agent | The client that initiates a request for a resource. These are often browsers, editors, spiders (web-traversing robots), or other end user tools. |
| Name Resolution | The process done by the name servers (NSs) of searching through the DNS to find data for which they are not authoritative. Since the DNS is structured as an inverted tree, a NS needs only the domain names and addresses of the root NSs. |
| BIND | Berkeley Internet Name Daemon (BIND) is the most widely used NS in the internet. Currently there are two supported versions: BIND 4.9.3, BIND 8.2.2, and a Beta version of BIND 9. |
| Caching | In order to reduce DNS traffic, and delays, an NS has an internal cache that stores valid replies, and also has a negative cache that stores valid errors. A time-to-live value is attached to each cached entry, so it can be invalidated. Normally the cache is internal, and is updated only upon DNS replies to queries. |
| Domain Name | The full domain name of any node in the DNS tree is the sequence of labels on the path from the node to the root, with dots separating the names in the path. For example: "mail.versedge.com". The maximum length of a domain name is 255 bytes. |
| Domain Name Space | An inverted tree of labels (each label is a node and is limited by 63 characters). The root of the tree is (empty label name). Each node can have an unlimited number of children. The tree depth is limited to 127 levels. |
| Forwarding NS | An NS that forwards a query to a predefined NS if it can't find the data locally in the cache or in the authoritative data. In case of forwarding, the request is always recursive. |
| Fallover | Sending a DNS query to the authoritative DNS server when there is no valid cached information. |
| Master Server | An ultimate source of information about a domain. A primary master is an authoritative server configured to be the source of zone transfer for one or more secondary servers. |
| Name Server | The program that stores information about the DNS. Name servers generally have complete information about some part of the DNS, called a zone. The name server is than said to have authority for that zone. Zones usually represent administrative boundaries. A DNS server is authoritative for an external domain name zone provided that the DNS server is defined as such at the root DNS or at another authoritative server for the external domain name zone. |
| Recursion | The action a name server performs when it receives a recursive query. In recursion, the NS must reply with the requested data or with an error if data was not found. In order to complete the Recursion, the name server itself can use a recursive query to other name server, or use an Iteration method. |
| Resolver | a resolver is the client of the DNS system, who accesses name servers. The resolver is used by local programs. The resolver handles: -Querying a name server -Interpreting a response from the name server -Returning the information to the program that requested it. |
| Resource Record | The data associated with domain names is contained in Resource Records (RR's). Records are divided into classes. The internet class (IN) is the most popular and default class. Within a class, records come in several types, which correspond to the different varieties of data that may be stored in the domain name space. (Example: Address, Mail exchange (MX), Canonical name (CNAME)) |
| RFC | Request For Comments. The Internet Request For Comments (or RFC) documents are the written definitions of the protocols and policies of the Internet. |
| Root NS | An NS that is authoritative to the top-level domains, or knows where there are authoritative NS's to a top-level domain. |
| Slave Server | A slave server, also called a secondary server, is an authoritative server that uses zone transfers from the primary master server to retrieve the zone data, or optionally from a cache. |
| Subdomain Delegation | Subdomain Delegation involves assigning responsibility for some part of the domain to other Authoritative Name Servers. Delegation is achieved by pointing to the authoritative name servers instead of containing information for the subdomain. |
| Zone | A zone contains all the domain names and data of a domain, except for domain names and data in delegated subdomains of that domain. If a subdomain of the domain is not the subject of delegation, however, the zone contains the domain names and data in the subdomain. Example: The zone "versedge.com" has a delegated subdomain "test.versedge.com". The zone "versedge.com" contains all the domain names in the DNS subtree starting at "versedge.com", except for all the domain names that belong to the subdomain "test.versedge.com". |

General Organization and Data Flow.

Figure 2:
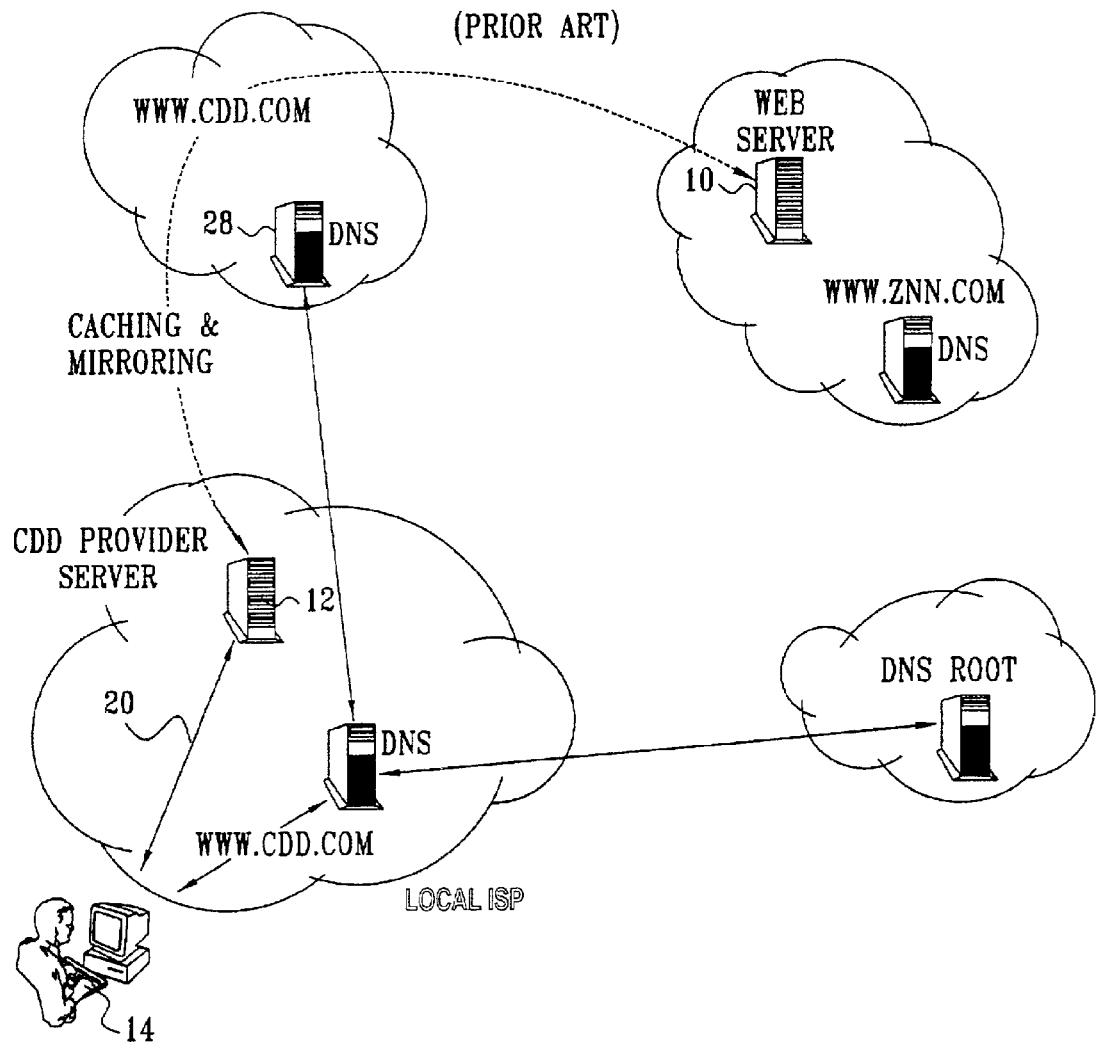
FIG. 2 represents another view of the content delivery and distribution system shown in FIG. 1.
Figure 3:
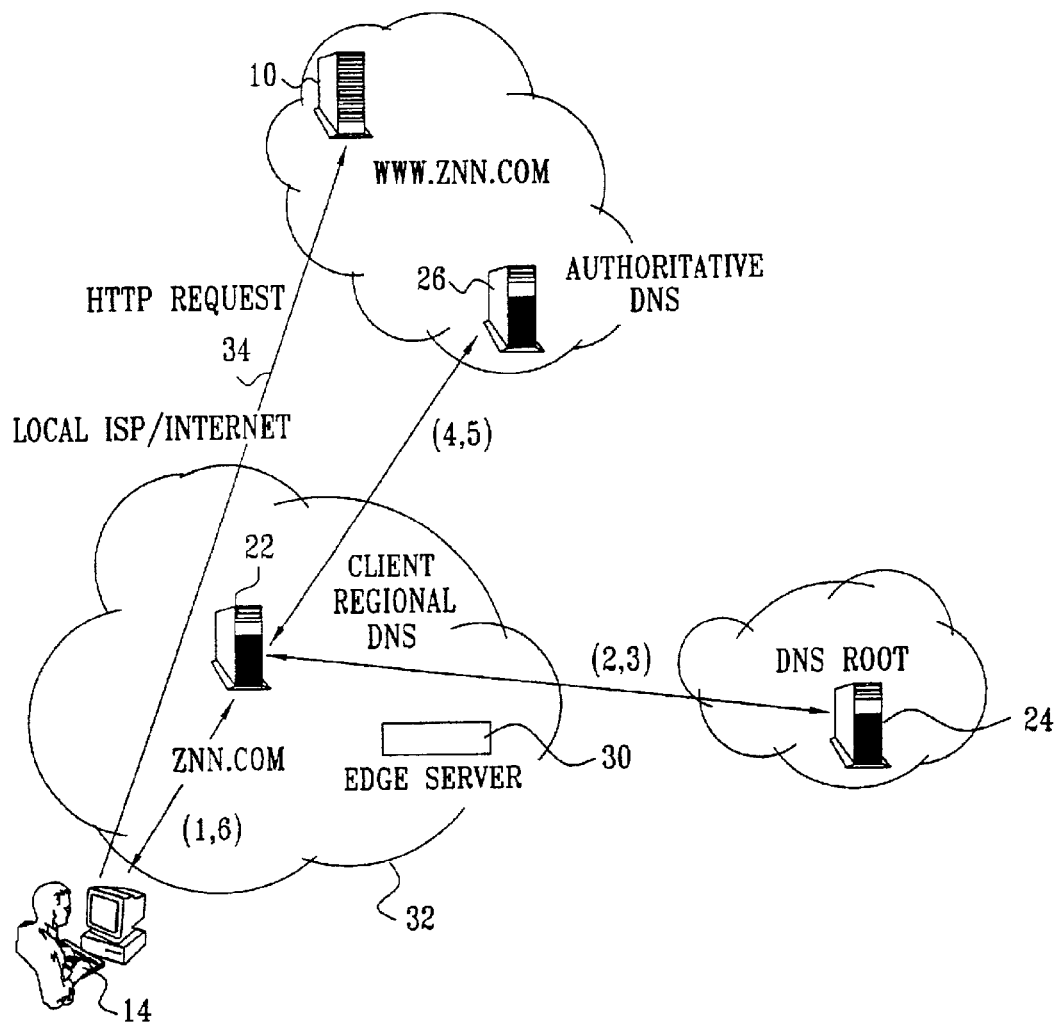
FIG. 3 represents a model of a content delivery and distribution system according to a preferred embodiment the invention.
Figure 4:
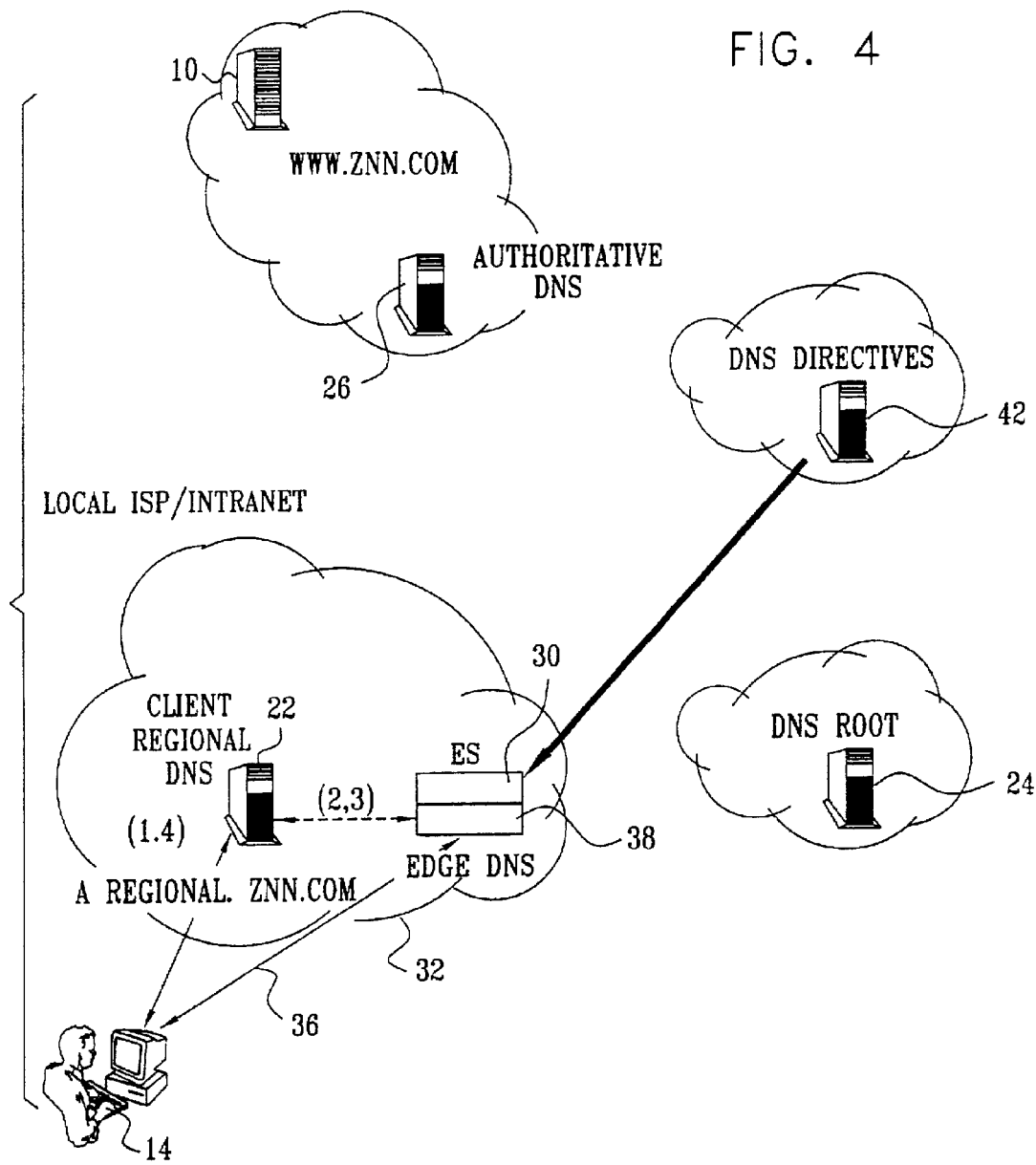
FIG. 4 represents another view of the content delivery and distribution system shown in FIG. 3.

Turning now to the drawings, in which like reference numbers denote the same element throughout, FIG. 3 and FIG. 4 give a high-level overview of the control flow in one embodiment of the differentiated content and application delivery solution. While there are similarities between FIGS. 1 and 2, and FIGS. 3 and 4, a new entity, the regional edge server 30 is now introduced. Within specified regions where regional edge servers exist, such as the region 32, requests by the client 14 for selected pages or objects may or may not be directed to the regional edge server 30. In regions where no regional servers are placed, or when the regional edge server 30 is not active, requests from clients are directed to the origin site 10. This is accomplished by modifying the URLs of the selected links at the origin server 10 so that the domain name component of the URL is renamed. The renamed URL uses one or more domain names that are translated at each region via its regional DNS mechanism in a different way. In particular, in the region 32 certain domain names are translated to the IP address of the regional edge server 30. For example, the additional domain names that are used may be znn-regionalX.com, where X stands for a number. This naming convention accommodates a set of regional servers that serve requests for renamed URLs at their respective regions. In some cases requests for any URL of a given site might be mapped to the IP address of a regional edge server.

In some cases all the renamed URLs are associated with the same DNS zone using a naming convention such as X.znn-regional.com, where X is some character string. The local DNS mechanism maps the regional name to the IP address of a nearby host, if it exists, and thus the resolution is done locally. Using the dynamic update capability of the DNS server, alternate regional or remote hosts can be assigned dynamically as needed to provide a measure of reliability. In particular, the local DNS preferably has as an alternate mapping of the IP address of the origin server. In areas where such a dynamic DNS mapping is not conducted or is disabled, the authoritative DNS server for the renamed URLs is used to direct the request, as in conventional centralized or content delivery and distribution systems.

In some preferred embodiments regional servers are assigned to group domain names, using a naming convention such as znn-regionalX, where X again represents some number, by causing the regional server to download membership instructions from the origin server or farm in a manner which is disclosed hereinbelow. Such instructions or configuration files for edge server grouping are managed within the znn.com domain. The regional servers at each region then apply these mappings using a local DNS insertion mechanism.

The local DNS mechanism can be realized using any of the following alternatives. All of them require an authoritative DNS for both the znn.com and regional.znn.com zones under the control of the content provider, which owns the origin site. The authoritative DNS server is the one that serves the origin site including the domain znn.com. Accordingly, from every internet sub-network where an edge server is not active, and no DNS insertion mechanism is employed, requests intended for these zones are directed to an origin server. This is accomplished by resolving DNS queries that arise from an HTTP request 34 directed to the origin server 10, as shown in FIG. 3. Such DNS queries are initially directed to the client regional DNS server 22, and are resolved via the root DNS server 24, and the authoritative DNS server 26. The data flow sequence is indicated by numbers in parentheses. Thus a request is initiated from the client 14 in a first step and the resolution is finally returned from the client regional DNS server 22, in the sixth step of the data flow sequence as indicated by the notation (1, 6). First intermediate data flow between the client regional DNS server 22 and the root DNS server 24 is indicated by the notation (2, 3). Second intermediate data flow between the client regional DNS server 22 and the authoritative DNS server 26 is indicated by the notation (4, 5). Although a regional edge server 30 can be present, it plays no role in this uncomplicated DNS resolution.

But in a subnet such as 32 where an edge server does exist, the local DNS insertion mechanism, which may include an additional DNS server, an EdgeDNS, automatically directs requests from clients in that sub-network, for some zones in particular domain names in the zone X.regional.znn.com. The standard existing method in which a local standard DNS server forwards the requests to another local DNS server for requests made for a particular domain name zone is termed "zone forwarding" to a particular local edge server.

1. This alternative is termed DNS cache registration and is explained with reference to FIG. 4. Concurrent with an HTTP request 36 by the client 14 which reaches the regional edge server 30, the client regional DNS server 22 forwards a request to the EdgeDNS 38 which has extended capabilities in comparison to a standard DNS server. In this local DNS insertion alternative, the client regional DNS server 22 conducts a periodic write of a regional domain name (a.regional.znn.com) DNS resolution with a binding to a local edge server IP address, together with a specified time-to-live (TTL) which is longer than the write period. The writing is done into the resolution cache of the EdgeDNS 38. If such a periodic write ceases, the cache entry is aged and eventually discarded. After which, the resolution is directed from the EdgeDNS 38 to the root DNS server 24, and thence to the authoritative DNS server 26. As is known, conventional DNS servers do not support DNS cache writing. The writing mechanism has the advantage of enabling dynamic redirection of requests without the involvement of the root DNS system. The data flow sequence leading to resolution of the DNS request is indicated by numbers in parentheses. Thus a request is initiated from the client 14 and the resolution is finally returned from the client regional DNS server 22, as indicated by the notation (1, 4). Subsequent intermediate data flow between the client regional DNS server 22 and the EdgeDNS 38 is indicated by the notation (2, 3). The configuration of the EdgeDNS 38 and its coordination with the client regional DNS server 22, the root DNS server 24, and the authoritative DNS server 26 is controlled by DNS directives that originate from one or more policy control servers.

Figure 5:
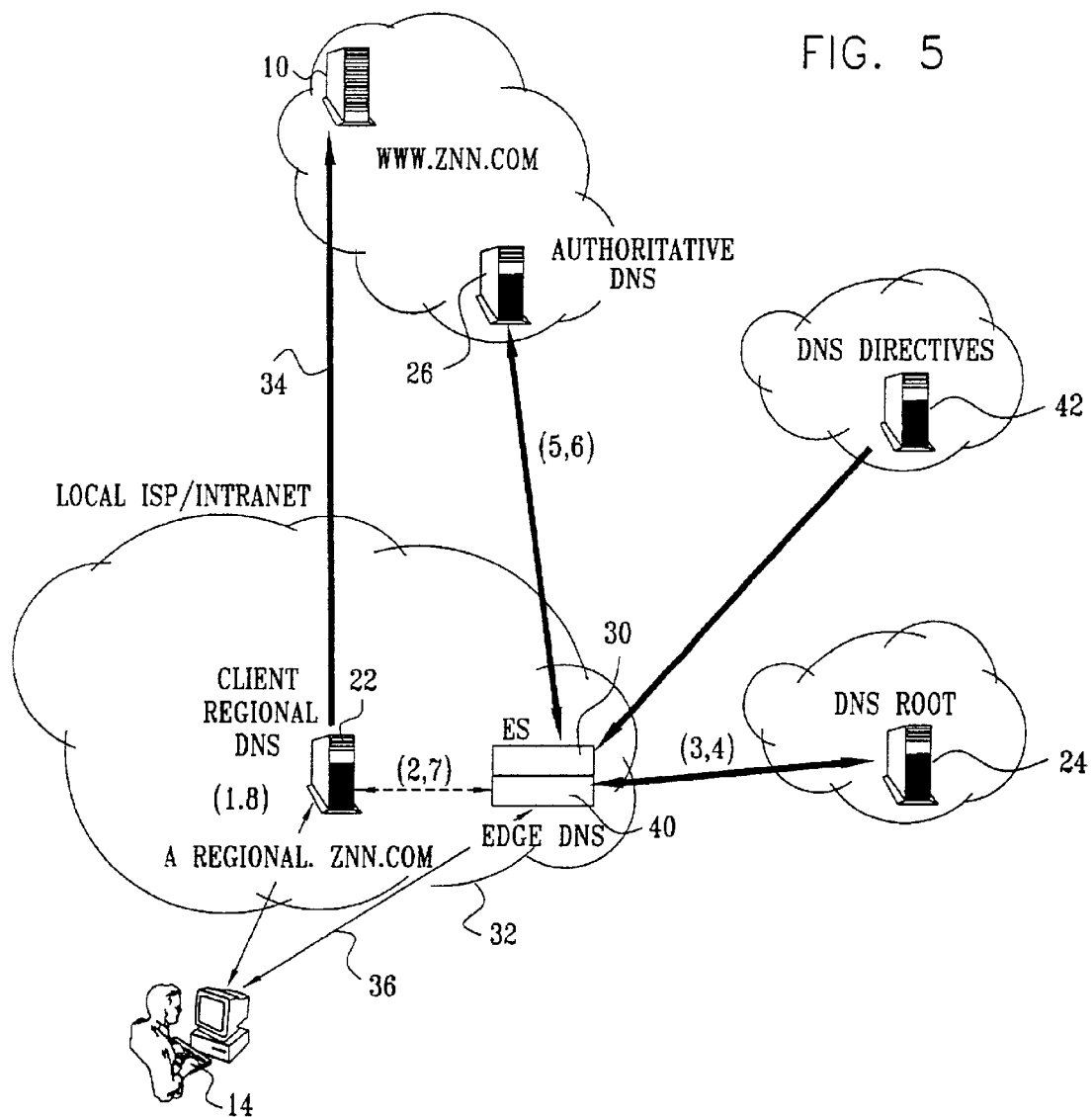
FIG. 5 is a model of s content delivery and distribution system according to an alternate embodiment of the invention.

2. As shown in FIG. 5, the EdgeDNS 40 is a standard DNS server and needs no special capabilities. An HTTP request 34 from the client 14 is directed to the origin server 10. The EdgeDNS 40 is configured to zone forward DNS resolution requests in predetermined zones within regional.znn.com to the root DNS server 24, while other zones will be resolved to a local IP address of an edge server, such as the client regional DNS server 22. This is done by configuring the EdgeDNS 40 as an authoritative DNS server for these particular zones, but without registering it as such in the root DNS server system. The configuration of the EdgeDNS 40 and its coordination with the client regional DNS server 22 is controlled by DNS directives that originate from one or more policy control servers 42. In addition each DNS server located at the sub-network where the EdgeDNS 40 resides is configured to direct requests for the zone regional.znn.com to the EdgeDNS 40. This can optionally be accomplished in a master-slave relationship, where the master is the EdgeDNS 40, and the slave is the client regional DNS server 22. Such a registration is accomplished manually or automatically the EdgeDNS 40. If the client regional DNS server 22 is not responding, another DNS insertion module may be assigned to act as a master. The authoritative DNS server 26 or the root DNS server 24 can act in this role. In this case, it is preferable to code the domain names as X.regional.znn.com where X is a label and the zone is regional.znn. The additional DNS modules act as DNS masters, as they are authoritative in these domains. However, they are not registered in the root DNS system as such. In this alternative the regional edge server 30 may optionally be present, but has no involvement in the transactions.

The data flow sequence leading to resolution of the DNS request in this embodiment is indicated by numbers in parentheses. Thus a request is initiated from the client 14 and the resolution is finally returned from the client regional DNS server 22, as indicated by the notation (1, 8), which has the same meaning as given above. Next, forwarding of the request from the client regional DNS server 22 to the EdgeDNS 40 and an eventual return communication is indicated by the notation (2, 7). Communication between the EdgeDNS 40 and the root DNS server 24, if it occurs, is indicated by the notation (4, 5). Communication between the EdgeDNS 40 and the authoritative DNS server 26, if it occurs, is indicated by the notation (5, 6).

3. In this option there is no need for the additional EdgeDNS, and the DNS insertion mechanism inserts registrations in the local DNS system. The DNS entry for a given zone, X.regional.znn.com, is inserted by the DNS insertion mechanism in the existing local DNS server as a DNS master for that zone, and a domain name that belongs to this zone is then directed to the IP address of the local edge server. This registration is conducted manually or automatically by a module of the DNS insertion mechanism. A failure-recovery mechanism is provided using another module of the DNS insertion mechanism which is separate from the edge server. The failure-recovery mechanism tests the availability of the edge server, and in case of failure resets the entries to the root server, or the origin server IP address.

4. In this method, no configuration to the local DNS servers are required. Request from clients to the local DNS server are responded using information stored in the caches or by forwarding requests to higher level DNS servers. Such forwarded DNS requests are intercepted by a software or hardware module which are part of the DNS insertion mechanism. If the requests belong to the zone regional.znn.com it is sent to the EdgeDNS that either resolves it locally at the edge server IP address or directs the request to the root DNS.

Redirection of requests to the regional site is only the first step. The main focus of the system is the interaction between origin servers and edge servers to enable high-quality, differentiated delivery of content to the edge server.

Figure 6:
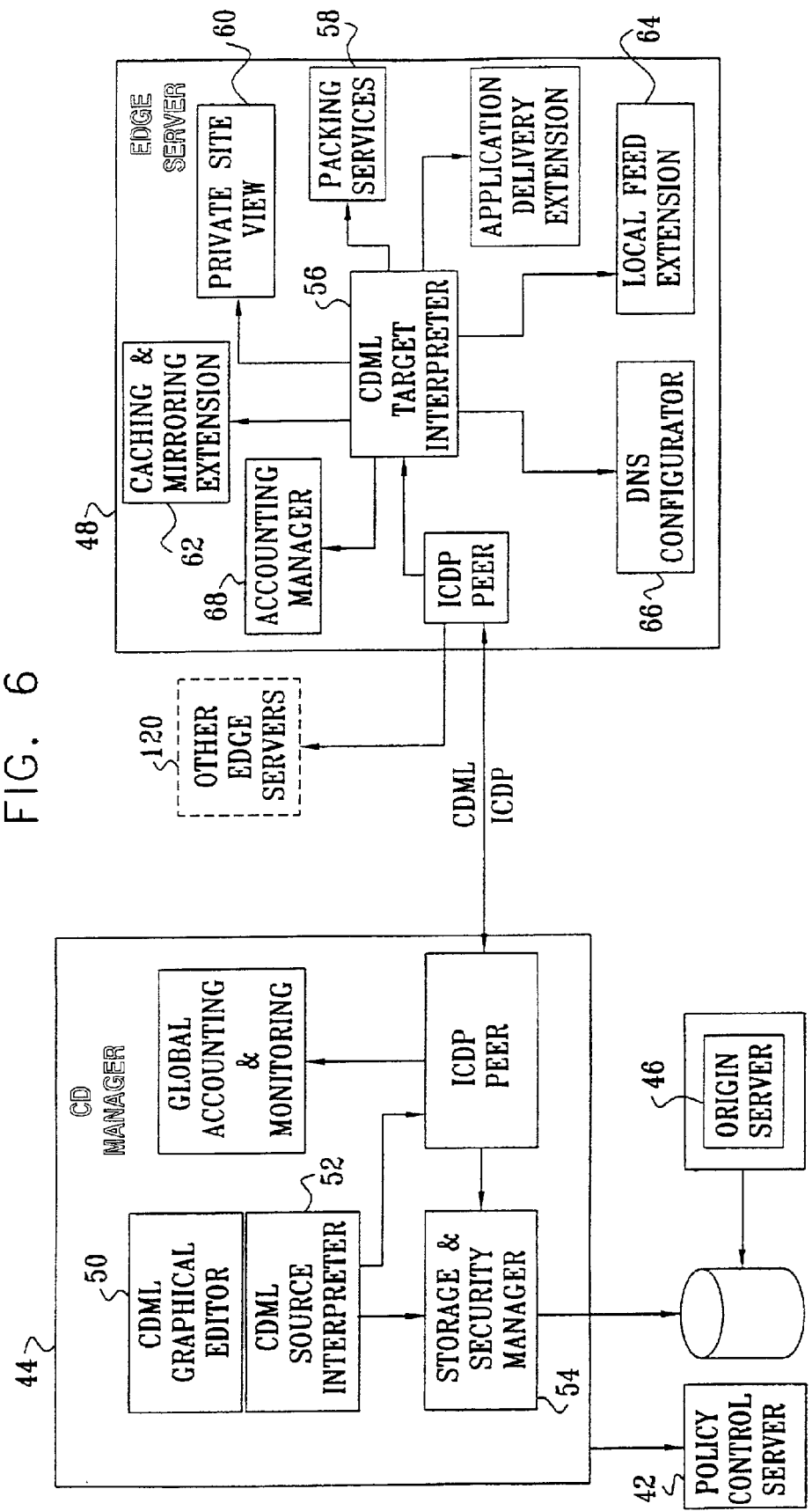
FIG. 6 is a block diagram illustrating the architecture of an edge server and of the content delivery manager according to a preferred embodiment of the invention.

The architecture of the edge server and of the content delivery manager is now disclosed with reference to FIG. 6. The content delivery manager 44 is associated with an origin web server 46, and optionally with a policy control server 42, although it does not have to reside in the same physical site as the origin web server 46 or the policy control server 42. The content delivery manager 44 is responsible for specifying content delivery policies, preferably using CDML, and for embedding CDML in the content, either within actual web pages or at separately addressable CDML pages, as well as deploying it to edge servers. Shown representatively as edge server 48. Implementation of CDML is accomplished using the CDML editor 50 and the source interpreter 52. The CDML editor 50 is a graphical editor that eases the construction of CDML code and the modification of URLs to regional DNS names. The editor can operate at various levels of granularity, ranging from a single object, to an entire site. The CDML editor 50 includes a directory of the name space, such that a given policy applies to all documents within the name space of the directory. The CDML editor 50 provides a composite HTML page, meaning that the given policy applies to the page and all its embedded objects. The CDML editor 50 further provides a recursive HTML page—meaning that an object and all documents linked from it, recursively are considered. The depth of recursion can be optionally set.

CDML.

There are two important issues regarding delivery of the CDML code itself. The first issue is the embedding of CDML code in the content, and the second issue is the way by which CDML code is delivered. For the first issue, there are 3 main alternatives:

1. CDML code is embedded inside HTML content. It is ignored by HTML parsers, since it contains tags that are either unknown to HTML, or are contained in comment fields, but are nevertheless interpreted by the CDML target. This mode requires modification of HTML content, but does not require any modification of the origin web server 46. Embedded objects can still be annotated from the HTML page by marking the embedded objects with CDML attributes, but the target interpreter is required to record these definitions and apply them when the embedded object is requested.

2. CDML code embedded in HTTP headers, thus not restricted to HTML. In this mode any object delivered by HTTP can include CDML code. This mode does not require modification to the content, but does require extension of the origin web server 46 to accommodate the HTTP headers. This however does not exclude the possibility that the CDML code is not provided from the origin site.

3. CDML code is kept in a separate file with a postfix extension ".cdml". This is the least intrusive approach, but is decoupled from the content, and therefore normally requires a separate fetch. It further requires the additional step of matching CDML files to pages. This approach has an added advantage in that one file can include a specification for many pages, as opposed to per-page specifications. It also eases the access to CDML objects in other sites, which are not necessarily part of the origin site. In particular, CDML source can be located at the edge server itself, or at a server in its sub-network, as well as at the server of a third party.

The second issue is concerned with the method of delivery of CDML code. In the above noted first and second methods for inclusion of CDML, CDML is part of the content, and therefore its deployment depends on the deployment of the documents. However the CDML editor 50 enables the user to specify various "push" operations for content, in which case CDML metadata is conveniently piggybacked.

This additional capability also applies to the third method of CDML code delivery. The CDML code can be stored as a URL in the origin web server 46 under a special CDML directory, or in a policy control server 42 that is distinct from the origin web server 46, and is intended to be fetched by edge servers. Thus, in the least intrusive approach, no access to the file system of the origin web server 46 is required, while CDML is delivered to the edge just as any other content is. It is also easy to secure the CDML transfer using standard web security such as passwords and SSL. The CDML code is pushed to some edge servers such as the edge server 48.

To ease the construction of CDML code, the CDML editor 50 has a highly graphical user interface, and users are conducted through the menus to generate a valid CDML document.

The storage and security manager 54 is responsible for storing CDML code in a repository, and for securing access to this directory. The global accounting and monitoring service 55 receives accounting information from individual edge servers' local accounting manager 68, and monitors the liveness and state of the edge servers by accepting periodically status messages from the edge servers accounting managers 68.

The central element in the edge server 48 is the CDML target interpreter 56. This module dispatches the CDML code to the various extensions, translating the requests to a notation or application program interface (API) that is understood by the target extension facilities. Each extension has a different application program interface, into which CDML translates. The extensions themselves are thus not required to have language interpreters of their own, which would impose overhead and require changes to the components. Instead, there is a mapping from CDML code into application program interface calls, which are invoked by the target interpreter 56. The edge server 48 also includes a number of features, the functions of which were described above. There are a packing services facility 58, a private site view 60, a caching and mirroring extension 62, a local feed extension 64, and a DNS configurator 66. Statistics collection and reporting is provided by an accounting manager 68.

The special content delivery markup language, CDML, is provided in preferred embodiments of the invention in order to assure highly controlled content delivery characteristics. CDML enables content providers to define precisely, and in as much detail as desired, how content is delivered to its destinations. It also enables the content provider to supply descriptive and classification information about its content so that local delivery directives, as seen at the edge, can identify the content to be delivered. As described above, CDML code is generated by graphical editors, and is interpreted by two entities. Referring again to FIG. 6, the source interpreter 52 at the origin controls how CDML meta-information is disseminated to the edges of the internet, and the target interpreter 56 implements the semantics of the CDML code at the edges. In addition, the source interpreter 52 and the target interpreter 56 cooperate to carry out distributed policies that require both interpreters, such as mirroring content from the origin server to some of the edges as well as pack and unpack operations.

In addition to primitive operations, e.g., push a page to a specific edge server, CDML provides higher level constructs. These constructs encapsulate various policies that can be attached to content. For example, a refresh(0) expression attached to a page implies that as soon as a page expires in the edge server 48, a fresh copy is fetched if it has been modified since last stored. It is equivalent to the following set of low level statements:

---
Listing 1
---

```
if (page expired)
  then if (page was modified since cached)
    then fetch new copy of page.
```

---

CDML can also be used to describe the content, its length and type, its version or freshness, its priority or importance, provides keyword about it and possible target groups of edge servers. This facilitates CDML operation involving content objects from the target edge server. For example it can specify a policy to pre-fetch at certain hours newly created objects in certain category intersection.

In addition to the built-in policies, CDML enables a fully programmable interface through the scripting language, CDSL, that can be used to ship policies, such as the one indicated in the above code fragment, as attribute values attached to nodes.

CDML is based on Extended Markup Language (XML), i.e., it defines an XML document type definition (DTD), and therefore validity of the document can readily be tested using a standard XML parser. The editor is also syntax-directed, taking advantage of XML. In order to provide flexibility in expressing differentiation while still complying with the DTD, CDML allows any nesting of characteristics to take place. For example, a given URL may be associated with a policy that states that certain regions should download a given URL only after five o'clock p.m. local time. This could be expressed by the following pseudo CDML code:

---
Listing 2
---

```
<?xml version="1.0"?>
<!DOCTYPE cdml SYSTEM "CDML.dtd" >
<document url-name="news.html">
  <temporal time="17:00" action="download">
    <regional region="Western Europe"/>
    <regional region="middle East"/>
  </temporal>
</document>
```

---

In this case time is the major characteristic and location is secondary. An alternative policy could require downloading of a page having a high priority to region A, a page having medium priority to region B, and one having low priority to region C. Here the region is the major characteristic, and content-based differentiation is secondary. Hence, in the XML tree the regional characteristic would contain the temporal characteristic. Finally, CDSL, as well as the built-in semantic actions of the CDML interpreter may be based on an extension to the standard XML style sheet language transformations (XSLT), or externally implemented.

Typical examples of working CDML documents and their associated DTD file listings are now presented.

Listing 3 is a CDML file showing configurations parameters. The DTD file corresponding to Listing 3 is shown in Listing 4. This DTD file defines the structure of the configuration parameters of Listing 3.

---
Listing 3
---

```
<?xml version="1.0" ?>
<!DOCTYPE conf_cdml (View Source for full doctype . . . )>
<conf_cdml es_id="10021" in-
dex_url="http://www.versedge.com/cdml_data/index.10021.cdml">
  <os_params organization="Versedge" domain="www.versedge.com"
  email="oren@versedge.com" contact_info="Oren Unger" />
</conf_cdml>
```

Listing 4

```
<!--
**************************************************************
ELEMENT: conf_cdml
COMMENT: The root element
**************************************************************
-->
<!ELEMENT conf_cdml (os_params)>
<!ATTLIST conf_cdml
  es_id CDATA #REQUIRED
  index_url CDATA #REQUIRED
>
<!--
**************************************************************
ELEMENT: os_params
COMMENT: The Origin Site parameters - for use by the VES
**************************************************************
-->
<!ELEMENT os_params EMPTY>
<!ATTLIST os_params
  organization CDATA #IMPLIED
  domain CDATA #REQUIRED
  email CDATA #REQUIRED
  contact_info CDATA #IMPLIED
>
```

Listing 5 is a CDML file that concerns indexing.

Listing 5

```
<?xml version="1.0" ?>
<!DOCTYPE index (View Source for full doctype . . . )>
<index next_reading_time="1.1.2001 20:00">
<group id="108">
<group id="30">
<group id="0"/>
</group>
</group>
<vars>
<file url="http://www.versedge.com/cdml/vars.10012.cdml"version="6"/>
</vars>
<svcs>
<file url="http://www.versedge.com/cdml/svcs.10012.cdml"version="1"/>
</svcs>
<mgmt>
<file url="http://www.versedge.com/cdml/mgmt.10012.cdml"
  version="2"/>
</mgmt>
</index>
```

The DTD file corresponding to Listing 5 is shown in Listing 6, which defines the structure of the CDML file of Listing 5.

Listing 6

```
<!--
**************************************************************
ELEMENT: index
COMMENT: The root element. The 'group' elements describe the
  pathes to the root of the ES hierarchy.
**************************************************************
-->
<!ELEMENT index (group+,vars,svcs,mgmt) >
<!ATTLIST index
  next_reading_time CDATA #IMPLIED
>
<!--
**************************************************************
```

-continued

Listing 6

```
ELEMENT: group
COMMENT: A single ES group in the ES groups hierarchy. A group
  may point to at most one parent group.
**************************************************************
-->
<!ELEMENT group (group?) >
<!ATTLIST group
  id CDATA #REQUIRED
>
<!--
**************************************************************
ELEMENT: mgmt
COMMENT: The URL and version of the Management directives file
**************************************************************
-->
<!ELEMENT mgmt (file?)>
<!--
**************************************************************
ELEMENT: svcs
COMMENT: The URL and version of the Service directives file
**************************************************************
-->
<!ELEMENT svcs (file?)>
<!--
ELEMENT: vars
COMMENT: The URL and version of the Variables file
**************************************************************
-->
<!ELEMENT vars (file?)>
>!--
**************************************************************
ELEMENT: file
COMMENT: Describes the URL and version of a CDML file
**************************************************************
-->
<!ELEMENT file EMPTY>
<!ATTLIST file
  url CDATA #REQUIRED
  version CDATA #REQUIRED
>
```

Listing 7 is a CDML file which contains management directives. Its corresponding DTD file is given in Listing 8, which defines the structure of the management directives CDML file of Listing 7.

Listing 7

```
<?xml version="1.0" standalone="yes" ?>
<!DOCTYPE mgmt (View Source for full doctype . . . )>
<mgmt version="1111">
<mgmt_set version="001" group_id="121">
<directive id="1212" eid="12121EEEE">
<add_rm_domain action"Add"
              list="www.versedge.com,www.intra.versedge.com">
<discrete Repeat"5">
<time_element Time_Domain="GMT" Start_Date="01/01/2001"
                                          Start_Time"12:34"
/>
</discrete>
</add_rm_domain>
</directive>
<directive id="121212344" eid="121212FFFF">
<cache_prefetch type="zip">
<url value="http://www.versedge.com/cdml/top.zip" />
<discrete Repeat="0">
<time_element Time_Domain="GMT"
                    Start_Date="01/01/2000" Start_Time="00:00"
/>
</discrete>
</cache_prefetch>
</directive>
```

Listing 7

```
</mgmt_set>
</mgmt>
```

Listing 8

```
-->
<!ELEMENT mgmt (mgmt_set+)>
<!ATTLIST mgmt
  version CDATA #REQUIRED
>
<!-- The set of directives that belongs to a given group in the hierarchy
-->
<!ELEMENT mgmt_set directive+)>
<!ATTLIST mgmt_set
  version CDATA #REQUIRED
  group_id CDATA #REQUIRED
>
<!-- A single directive. eid is the Edglet ID -->
<!ELEMENT directive (ac-
tive_update|cache_prefetch|svc_activate|dir_activate|deleg_re-
claim|add_rm_do
main|stat_collect|stat_upload)>
<!ATTLIST directive
  id CDATA #REQUIRED
  eid CDATA #REQUIRED
>
<!-- A cache active update directive. -->
<!ELEMENT active_update ((discrete|compact)+, (url|url_pattern)+)>
<!-- A cache prefetch directive. -->
<!ELEMENT cache_prefetch (url+, (discrete|compact)+)>
<!ATTLIST cache_prefetch type (None|zip|gzip) "None">
<!-- A service activation directive -->
<!ELEMENT svc_activate ((discrete|compact)+)>
<!-- action - the activation action. service name - the service -->
<!ATTLIST svc_activate
  action (Enable|Disable|Reset|Halt) #REQUIRED
  service (Cach-
ing|CachePriorities|ActiveUpdate|Prefetch|SiteView|URLTransla-
tion|QueryExpansion|RequsetModification|ResourceTransforma-
tion) #REQUIRED
>
<!-- A directive activation directive. -->
<!ELEMENT dir_activate ((discrete|compact)+)>
<!-- action: The activation action. list - a comma seperated list of dir ids
-->
<!ATTLTST dir_activate
  action (Enable|Disable|Remove) #REQUIRED
  list CDATA #REQUIRED
>
<!-- A delegation reclaim directive. -->
<!ELEMENT deleg_reclaim ((discrete|compact)+)>
<!ATTLIST deleg_reclaim action (Delegate|Reclaim) #REQUIRED>
<!-- A domain addition/removal directive -->
<!ELEMENT add_rm_domain ((discrete|compact)+)>
<!-- list - a list of subdomain names to add or remove -->
<!ATTLIST add_rm_domain
  action (Add|Remove) #REQUIRED
  list CDATA #REQUIRED
>
<!-- A statistics collection directive -->
<!ELEMENT stat_collect ((continuous|compact)+)>
<!-- list - a list of events to collect -->
<!ATTLIST stat_collect list CDATA #REQUIRED>
<!-- A statistics upload directive -->
<!ELEMENT stat_upload ((discrete|compact)+)>
<!ATTLIST stat_upload
  method (http_put|http_post|smtp|ftp) "http_put"
  url CDATA #REQUIRED
  clearing (Recycle|Clear|Keep) "Recycle"
>
```

Listing 8

```
<!-- DTD definition of time, url and url_pattern: -->
<!-- Compact representation for a time -->
<!ELEMENT compact EMPTY>
<!ATTLIST compact value CDATA #REQUIRED>
<!-- Continuous time indication -->
<!ELEMENT continuous (time_element)>
<!-- Discrete time indication -->
<!ELEMENT discrete (time_element)>
<!ATTLIST discrete Repeat CDATA "0">
<!-- Time element - common for both continuous and discrete times -->
<!ELEMENT time_element (recurrence|exception)?>
<!ATTLIST time_element
  Time Domain (GMT | ES_time) 37 GMT"
  Start_Date CDATA "00/00/0000"
  Start_Time CDATA "00:00"
  End_Date CDATA #IMPLIED
  End_Time CDATA IMPLIED
>
<!-- A recurrence pattern for a time element -->
<!ELEMENT recurrence (exception*)>
<!ATTLIST recurrence
  Recurrence_Type (weekly | monthly | yearly) #REQUTRED
  End_Date CDATA "infinite"
  Duration CDATA #REQUIRED
  Weekdays CDATA #IMPLIED
  Month_Day CDATA #IMPLIED
  Month_Weekday CDATA #IMPLIED
  Month CDATA #IMPLIED
>
<!-- An exception. May be referenced once by a time element,
  Or many times by a recurrence pattern -->
<!ELEMENT exception EMPTY>
<!ATTLIST exception
  Date CDATA #REQUIRED
  Start_Time CDATA #IMPLIED
  Duration CDATA #IMPLIED
>
<!-- A url described by a simple string. -->
<!ELEMENT url EMPTY>
<!ATTLIST url value CDATA #REQUIRED>
<!-- A pattern that describes a URL. method should always be 'http' -->
<!ELEMENT url_pattern (host,path,filename)>
<!ATTLIST url_pattern method CDATA "http">
<!-- The host part of the URL pattern. May contain a port number. -->
<!ELEMENT host (pattern)>
<!ATTLIST host port CDATA #IMPLIED>
<!-- The path part of the URI pattern. -->
<!ELEMENT path (pattern)>
<!-- The filename part of the URI pattern. (last part of the path) -->
<!ELEMENT filename (pattern)>
<!-- A pattern representation. -->
<!ELEMENT pattern EMPTY>
<!ATTLIST pattern
  value CDATA #REQUTRED
  type (startswith | endswith | is | isnot | has | hasnot) "is"
>
<!-- A single condition element -->
<!ELEMENT condition EMPTY>
<!ATTLIST condition
  header (Accept Accept-Charset | Accept-Encoding | Accept-Language
  From | Host | Max-Forwards | Referer | User-Agent) #REQUIRED
  operand (startswith) endswith | is | isnot has | hasnot) "is"
  value CDATA #REQUIRED
>
```

Listing 9 and Listing 10 are corresponding CDML and DTD files which describe service directives and the structure of the service directives file respectively.

Listing 9

```
<?xml version"1.0"?>
<!DOCTYPE svcs SYSTEM "servicedirs.dtd">
  <svcs version="100">
```

-continued

Listing 9

```
<svcs_set version"10" group_id="100021">
    <directive id="12121201" eid="EDFE12121">
        <cache_priority priority="High" query_params="cvsroot">
            <url_pattern method="http">
                <host>
                    <pattern value="www.versedge.com" type="is">
                    </pattern>
                </host>
                <path>
                    <pattern value="oren" type="isnot">
                    </pattern>
                </path>
                <filename>
                    <pattern value="cvsweb.cgi" type="is">
                    </pattern>
                </filename>
            </url_pattern>
            <continuous>
                <time_element Time_Domain="GMT" Start_Date="01/01/2000" Start_Time="12:13">
                    <recurrence Recurrence_Type="weekly" End_Date="03/03/2000" Duration="100" Weekdays="127">
                        <exception Date="02/02/2000" Start_Time"12:35" Duration"50">
                        </exception>
                    </recurrence>
                </time_element>
            </continuous>
        </cache_priority>
    </directive>
</svcs_set>
</svcs>
```

Listing 10

```
-->
<!ELEMENT svcs (svcs_set+)>
<!ATTLIST svcs
version CDATA #REQUIRED
>
<!-- The set of directives that belongs to a given group in the hierarchy -->
<!ELEMENT svcs_set (directive+)>
<!ATTLIST svcs_set
version CDATA #REQUIRED
group_id CDATA #REQUIRED
>
<!-- A single directive. eid is the Edglet ID -->
<!ELEMENT directive
(cache_priority|url_translation|query_expansion|request_modification|resource_transformation)>
<!ATTLIST directive
id CDATA #REQUIRED
eid CDATA #REQUIRED
>
<!-- A cache priority directive. -->
<!ELEMENT cache_priority
((url|url_pattern)+, (continuous | compact) *, condition*)>
<!ATTLIST cache_priority
priority (Normal | High | Sticky | NoCache) "Normal"
>
<!-- List of headers to consider when caching resources -->
<!ATTLIST cache_priority headers CDATA #IMPLIED >
<!-- List of Query parameters to ignore when caching resources -->
<!ATTLIST cache_priority query_params CDATA #IMPLIED >
<!-- A URL translation directive. -->
<!ELEMENT url_translation
((url|url_pattern)+, (continuous | compact) *,condition*,target_url,
error_exception*)>
<!-- A target URL description for URL translation. The target may be
a single url, which is a simple replacement. The target may also be a
complex translation rule, which uses parts of the source url. -->
```

-continued

Listing 10

```
<!ELEMENT target_url (url|target_pattern)>
<!-- A target pattern for URL translation
    Each attribute may describe a replacement to the relative source attribute.
    If the attribute is missing, the source attribute will be used.
    In order to substitute parts of the source attribute in the target attribute,
    the usage of regexp substitution is needed.
-->
<!ELEMENT target_pattern EMPTY>
<!ATTLIST target_pattern
method CDATA "http"
host CDATA #IMPLIED
path CDATA #IMPLIED
filename CDATA #IMPLIED
>
<!-- A query expansion directive. -->
<!ELEMENT query_expansion
((url|url_pattern) +, (continuous | compact) *,condition*,
error_exception*)>
<!-- list - a comma sepetrated list of variable names to be added -->
<!ATTLIST query expansion list CDATA #REQUIRED>
<!-- A request modification directive. -->
<!ELEMENT request_modification
((url|url_pattern) +, (continuous | compact)*,condition*,
error_exception*)>
<!-- list - a comma sepetrated list of variable names to be added as headers -->
<!ATTLIST query_expansion list CDATA #REQUIRED>
<!-- An exception handling parameter for Site View directives -->
<!ELEMENT error_exception EMPTY>
<!ATTLIST error exception
code CDATA #REQUIRED
url CDATA #IMPLIED
>
<!-- A resource transformation directive. -->
<!ELEMENT resource_transformation
((url|url_pattern) +, (continuous | compact)*,condition*)>
<!ATTLIST resource_transformation
cacheable (True|False) "True"
extension CDATA #REQUIRED
argv CDATA #REQUIRED
>
<!-- DTD definition of time, content and conditions: -->
<!-- Compact representation for a time -->
<!ELEMENT compact EMPTY>
<!ATTLIST compact
value CDATA #REQUIRED
>
<!-- Continuous time indication -->
<!ELEMENT continuous (time_element)>
<!-- Time element - common for both continuous and discrete times -->
<!ELEMENT time_element (recurrence|exception)?>
<!ATTLIST time_element
Time_Domain (GMT | ES_time) "GMT"
Start_Date CDATA "00/00/0000"
Start_Time CDATA "00:00"
End_Date CDATA #IMPLIED
End_Time CDATA #IMPLIED
>
<!-- A recurrence pattern for a time_element -->
<!ELEMENT recurrence (exception*)>
<!ATTLIST recurrence
Recurrence_Type (weekly | monthly | yearly) #REQUIRED
End_Date CDATA "infinite"
Duration CDATA #REQUIRED
Weekdays CDATA #IMPLIED
Month_Day CDATA #IMPLIED
Month_Weekday CDATA #IMPLIED
Month CDATA IMPLIED
>
<!-- An exception, May be referenced once by a time element,
    Or many times by a recurrence pattern --->
<!ELEMENT exception EMPTY>
<!ATTLIST exception
Date CDATA #REQUIRED
```

-continued

Listing 10

```
    Start_Time CDATA #IMPLIED
    Duration CDATA #IMPLIED
>
<!--
A url described by a simple string.
-->
<!ELEMENT url EMPTY>
<!ATTLIST url
    value CDATA #REQUIRED
>
<!--
A pattern that describes a URL. method should always be 'http'
-->
<!ELEMENT url_pattern (host,path,filename)>
<!ATTLIST url_pattern
    method CDATA "http"
>
<!--
The host part of the URL pattern. May contain a port number.
-->
<!ELEMENT host (pattern)>
<!ATTLIST host
    port CDATA #IMPLIED
>
<!--
The path part of the URL pattern.
-->
<!ELEMENT path (pattern)>
<!--
The filename part of the URL pattern. (last part of the path)
-->
<!ELEMENT filename (pattern)>
<!--
A pattern representation.
-->
<!ELEMENT pattern EMPTY>
<!ATTLIST pattern
    value CDATA #REQUIRED
    type (startswith | endswith | is | isnot | has | hasnot) "is"
>
<!-- A single condition element -->
<!ELEMENT condition EMPTY>
<!ATTLIST condition
    header (Accept | Accept-Charset | Accept-Encoding | Accept-Language
From | Host | Max-Forwards | Referer | User-Agent) #REQUIRED
    operand (startswith | endswith | is | isnot | has | hasnot) "is"
    value CDATA #REQUIRED
>
```

Listing 11 is an example of the resource description part of the CDML. This resource description can be independent of the policy. This means that the resource description may be supplied regarding the origin site content. The policy may be defined to perform content delivery of resources that are described to groups which are described in Listing 12. The resource description may include extensions, such as protocol, type, size, coding convention, creation and expiration time, keywords, target groups, alternate URL for fetching the resource, and the location of the code that creates a dynamic resource. For example an edge server may modify a resource by combining it, or even replacing it with a local resource. The resource can be modified by an operation that may include frame insertion, textual or graphic insertion, html code insertion, link modification, embedded object modification, and adaptation of a web page to requirements of a particular browser.

Listing 11

```
<? xml version="1.0" ?>
    <RDF xmlns = "http://w3.org/TR/1999/PR-rdf-syntax-19990105#"
        xmlns:VC = "http://www.versedge.com/VC#">
        <Description about = "https://www.versedge.com/report.html">
            <VC:Title> The Future of Content Delivery </VC:Title>
            <VC:Creator> John Smith </VC:Creator>
            <VC:ValidDate> 2000-01-01 </VC:ValidDate>
            <VC:ValidTime> 13:20 </DC:ValidTime>
            <VC:ExpirationDate> 2000-01-01 </VC:ExpirationDate>
            <VC:ExpirationTime> 08:00 </VC ExpirationTime>
            <VC:Type> Dynamic
                <Cache:Status> Yes </ Cache:Status>
                <Cache:EdgeServerVesrion> ES1.1 </Cache:EdgeserverVes-
                    rion>
                <Cache:CacheParameter> cookie
                    <Cookie:Match> /*/name/ * </Cookie:Match>
                </Cache:CacheParameter>
            <VC:Type>
            <VC:Size> 10Mbytes </VC:Size>
            <VC:SubjectLevelTop> Internet, data network,
                IP </VC:SubjectLevelTop>
            <VC:SubjectLevel1> content delivery, caching, mirroring
        </VC: SubjectLevel1>
            <VC:SubjectLevel2> DNS, redirection </VC:SubjectLevel2 >
            <VC:EmbeddedObjects> http://www.versedge.com/pictures/gif/
                bottom.gif,
    http://www.versedge.oom/scripts/cgi/form3.cgi,
    https://www.versedge.com/report.html
            </VC:EmbeddedObjects>
            <VC:TargetGroups> English, Geeks,
                High Tech </VC:TargetGroups>
        </Description>
    </RDF>
```

Similar to the resource description that describes the resources that are available at the origin sites for caching, mirroring or transformation, CDML can describe the target groups. The policy profiles can therefore match the right content with target group. The XML based specification is TDF (target definition format). An example is given in Listing 12.

Listing 12

```
<? xmi version="1.0" ? >
    <TDF xmlns =
"http://www.versedge.com/TR/2000/PR-tdf-syntax-20000101#"
        xmlns:TC = "http://www.versedge.com/TC#" >
        <Description about = ES#1175563 >
        <VC:Host> es3.Versed.ge.com </VC:Host>
        <VC:Own>JohnSmith,email=smith@versedge.com},
cel=97253678923</VC:Own>
            <VC:UpDate> 2000-01-01 </VC:UpDate>
            <VC:UpTime> 13:20 </DC:UpTime>
            <VC:LicenseExpirationDate> 2000-01-01
</VC:LicenseExpirationDate>
            <VC Hardware>
                <ESH:Version> 1.1 </ESH:Version>
                <ESH:Disk> 20 </ESH:Disk>
                <ESH:Memory> 256 </ESH:Memory>
                <ESH:Access> ADSL </ESH:Access>
            </VC: Hardware>
            <VC: Software>
                <ESS:Version> 1.4 </ESS:Version>
                <ESS:OS> Linux 7.0 </ESS:OS>
            </VC: Software>
            <VC: GroupLevelTop> HighTech, Internet </VC: GroupLevelTop>
            <VC: GroupLevel1> content delivery, caching</VC GroupLevel1>
            <VC: GroupLevel2> DNS, redirection </VC:GroupLevel2 >
            <VC: TargetUser1> English, Geeks, High Tech </VC:TargetUser1>
            <VC: TargetUser2> English, Financial, Stocks </VC:TargetUser2>
            <VC: Organization> status=company,
```

-continued

Listing 12

```
ownership=public </VC:Organization>
    </Description>
</TDF>
```

Service Profiles.

Service profiles take into consideration all operational customer requirements. Such requirements include system environment, network security, and many more. Most of the non-functional requirements are aspects of network security or involve integration into existing web infrastructure.

It is generally impractical to install a server application in the origin server, so the front edge tool for defining service profiles, according to a preferred embodiment of the invention, is a client application.

However, the front edge tool at the origin site (or at a third party site) can be associated with an on-going dedicated server for purposes of monitoring and managing the edge servers.

Passing a service profile file between the origin server (or a third party site) and the edge server can be accomplished in two ways. The front edge tool can send the service profile file to the edge server. While this technique has the advantage that no access to the origin server is needed, it is ineffective if a firewall exists. In a second method, the edge server itself can request the service profile file from the origin site. In this case the CD Editor module of the front edge tool, which will be disclosed in further detail below, exports the service profile file to the origin server, and the edge server reads the file on demand. Although access to the origin server is needed, a Firewall will not prevent operation. It is assumed that the firewall permissions are only for HTTP or HTTPS protocols. Therefore the HTTP or HTTPS protocols are preferably used to transfer data between the origin server and the edge server. Such a scheme also enables CDML based service policies to be provided from a multiplicity of locations that may be associated with the content provider, the organization where the edge server is located, or from a third party. This is also true as multiple front edge tools can be used at different locations.

System Architecture.

Figure 7:
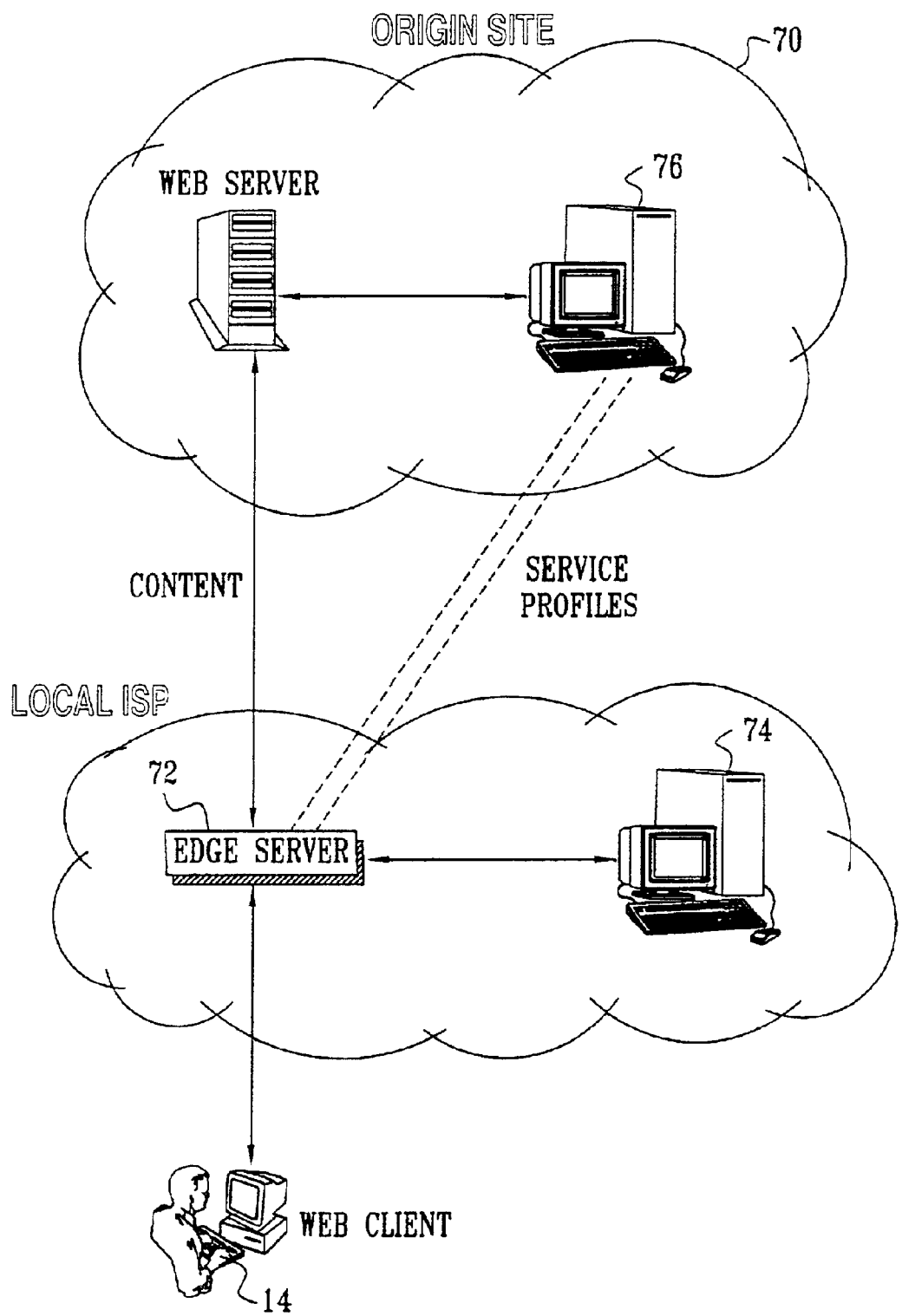
FIG. 7 is a diagram illustrating an alternate embodiment of the invention, applied in a business-to-customer scenario.

A logical view of an embodiment of the invention, applied in a business-to-customer scenario is shown in FIG. 7. A logical view of an alternate embodiment of the invention, applied in a business-to-business scenario is shown in FIG. 8.

According to the invention the standard origin web site 70 is augmented by one or more geographically dispersed edge web servers, shown representatively as the edge server 72, which are placed in remote public internet service providers or in private organizations. The edge server 72 provides a variety of unique services on behalf of its controlling origin web site 70, or a local operator. These include caching, mirroring, content localization, service prioritization and application delivery. End users are not aware of the existence of the edge server 72, however. A user request by a client 14 to access a certain resource on the origin web site 70 is selectively and transparently intercepted and handled by the site's edge server 72, if one exists. If there is no local edge server or if the edge server 72 has failed, the user request is directed to the origin web site 70 and handled conventionally.

Content providers and possibly end-users can control the behavior of a remote edge server by defining service profiles using a "front edge" tool, which is physically distributed, having a front edge module 74 and an origin site front edge module 76. This approach differs from the conventional content delivery approach, whereby caches are transparent to the origin servers and provide shared services to a multiplicity of providers.

Figure 8:
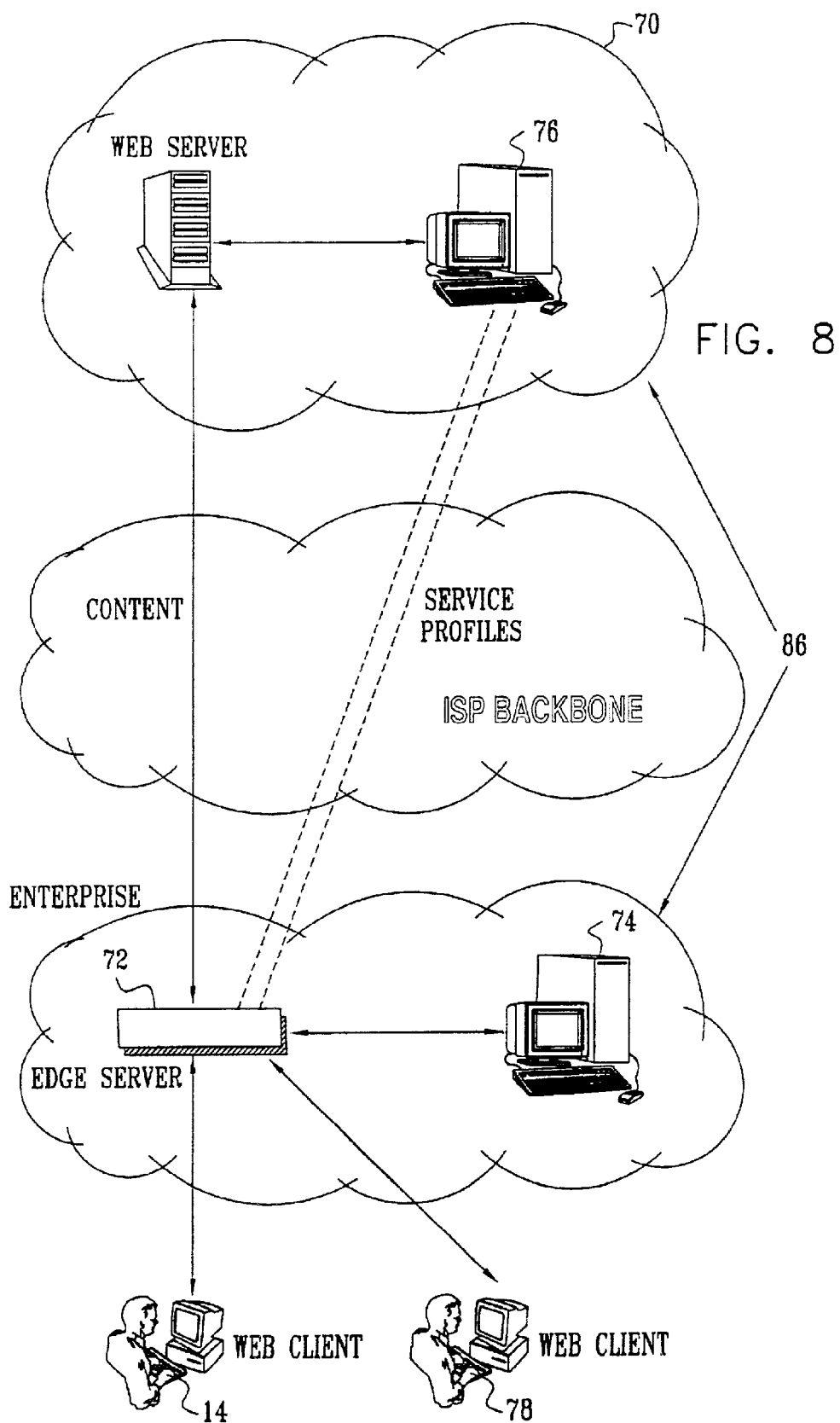
FIG. 8 is similar to FIG. 7, in which an alternate embodiment of the invention is applied in a business-to-business scenario.

FIG. 8 differs from FIG. 7 in that there is a second client 78 which relates to the client 14, using the services of the edge server 72.

When a user-request or server response passes through the edge server 72, the edge server 72 can apply any actions that are defined for the resource. If no actions are defined on the given resource, the edge server 72 transparently relays the requests and responses.

The above described arrangement has several advantages. Performance of the origin web site 70 is hardly affected, since localization and differentiation are performed at the edge server 72. Construction and operation of the origin web site 70 are significantly simplified, since the differentiation functionality is provided by infrastructure components, as opposed to ad hoc application level extensions. Site scalability is further improved by viewing the edge server 72 as a group representative. The edge server 72 can perform some operations once for the group (e.g., membership check), eliminating the need to redundantly perform these operations for each individual member.

There are two classes of potential users of the system according to the invention. Content providers can use the system in order to enhance their services and content delivery to end-users, either in a business-to-customer or a business-to-business scenario. Internet service providers can host or outsource edge servers for content providers, and may add local service profiles, in addition to the profiles defined by content providers and end users. Local profiles can improve the internet service provider service to content providers and end users, both consumer and businesses.

Figure 9:
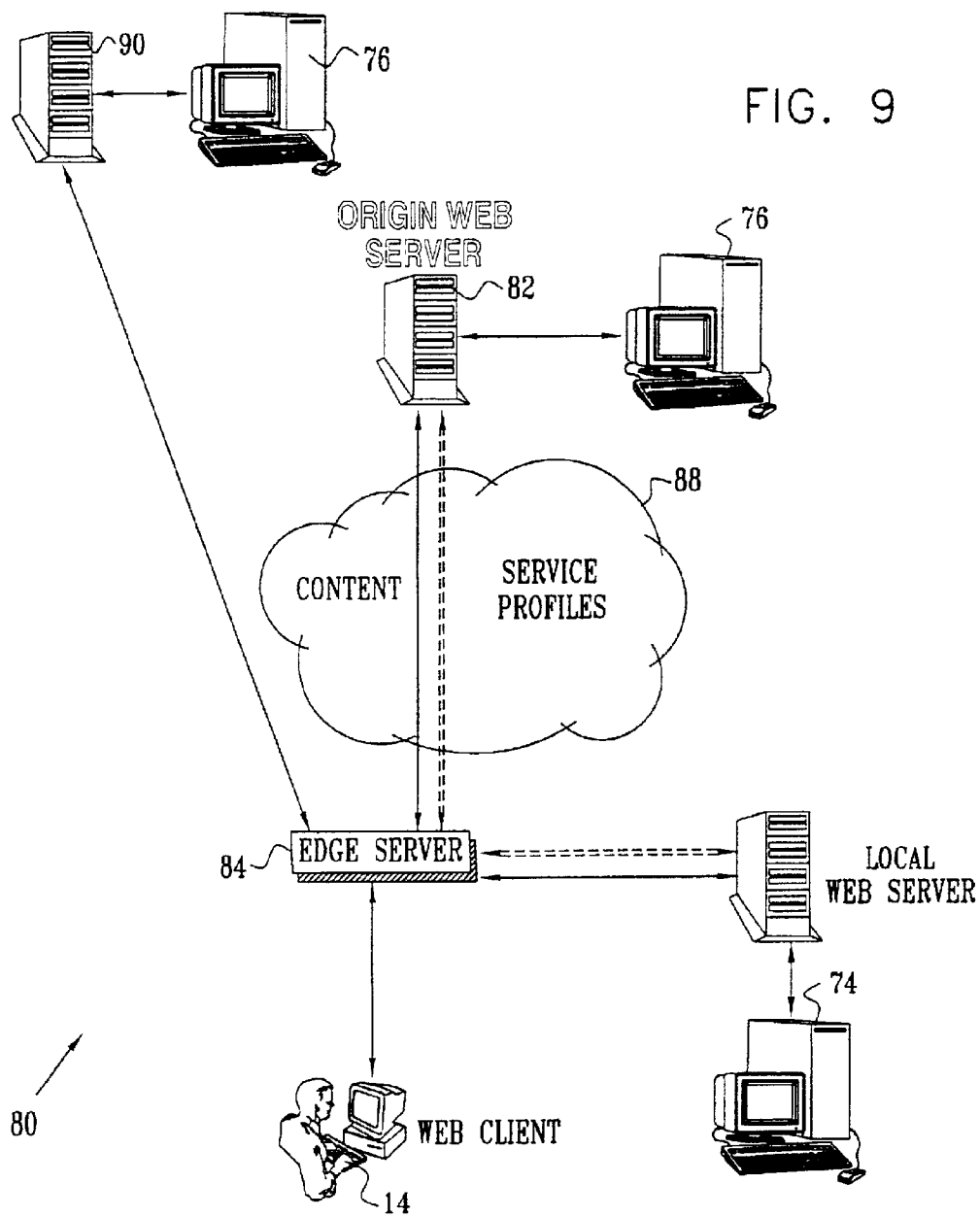
FIG. 9 is a high level view of a system according to another embodiment of the invention.

A high level view of the system architecture is presented with reference to FIG. 9, in which an internet implemented system 80 is illustrated in which added components are present, embodying the teachings of the present invention. Each origin web site 82 has a set of deployed edge servers, shown representatively as the edge server 84, that act on its behalf. An edge server is a non-transparent proxy that intercepts selected requests to, and responses from, its origin web site 82 to provide added targeted services relating to content provided in the origin web site 82 to selected user agents served by the edge server 84. Each edge server is customized by an edge server profile. An edge server profile is a collection of service and management directives that control the behavior of the edge server by enabling or disabling various services and by configuring these services with respect to service attributes, such as the target content, target time and target customers. The services can also be applied over content with respect to a content description profile.

Edge server profiles are defined by profile editors using a special front edge tool 86, indicated by the origin site front edge module 76 and the regional front edge module 74. The front edge tool 86 may be used by content providers at the origin web site 82, and by internet service providers or other organizations for defining additional local edge server profiles. Local profiles may reference content that is provided by sources outside of the origin web site 82, e.g.; local content such as news and weather forecasts. An access control mechanism on the edge server 84 prevents unwanted overriding of directives by different entities.

The front edge tool 86 can be used in two basic modes, static and dynamic. In the static mode, profiles are created off-line, for the entire site, and define the default edge policy for the origin web site 82. In the dynamic mode, profiles are created to specialize the handling of newly published content, for which the default static profiles should be overridden, or to address requirements that are not covered by the static profiles. The distinction between modes is only methodological. The front edge tool 86 is not restricted in preferred embodiments of the invention, nor does they edge server 84 distinguish between static and dynamic profiles.

Once defined, edge server profiles are transferred to the edge servers, such as the edge server 84. While the front edge tool 86 logically controls the profiles on the edge server 84, the physical transfer of profiles to the edge server 84 is done through the origin web site 82. The front edge tool 86 stores the profiles on the origin web site 82, and the edge server 84 downloads its profile from the origin web site 82 via standard client-server web protocols using the internet 88. The profile editing service is effectively decoupled from the responsibility for reliable and secure storage and transfer of information, which is conventionally provided by the origin server.

The edge server 84 optionally supports multiple origin web sites, such as the origin web site 90, in which case it maintains and supports an edge server profile for each of its controlling origin web sites. Such an edge server is termed a shared edge server. The alternative is also true. An edge server can support multiple target sites that implement multiple local directives for the same content provider.

General Specifications and Operating Conditions.

Referring again to FIG. 9, in preferred embodiments of the invention, the system 80 operates with standard web servers, web browsers, and DNS servers, and uses standard web protocols for the communication between the edge server and its origin server. The utility of the invention is enhanced due to ease of the integration with existing web technologies.

It is preferred that the edge server initiate all interaction between itself and an origin server. This eases the security requirements on the edge server, since it need not accept and filter incoming requests, unless received from end users. In particular, this approach enables the deployment of edge servers inside intranets.

The above noted front edge tool not need be continuously running. The only server with which the edge server interacts is the origin server. This avoids any need to maintain another server at origin server site. This however, does not exclude the possibility that the front edge tool is always active and may have additional functions. For example it may collect operational data regarding the collection of edge servers. It can also serve as a web server for storing and serving CDML resources.

The edge server periodically accesses the origin site in order to download updated profiles. The minimal interval between downloads is configurable and is generally in the order of a few minutes. Dynamic changes of edge server profiles are thus enabled.

Content providers have full control over what content is subject to control of the system 80, and what is not under such control. This is dynamically configurable by the content providers, and provides for gradual adoption of the system 80.

The process of publishing content does not require interactive editing of edge server profiles by profile editors. edge server profile generation normally takes place statically, and off-line. However, publish-time editing can be used, if desired, to provide a specialized service that is either undefined in the static edge server profile, or needs to be overridden. This provision facilitates automatic publishing and minimizes publishing overhead. In particular, generating CDML based content profiles that describe that content which is publish may be very useful. This enables the edge server to apply directives originated at the origin site, the target, or at a third party over content profiles.

The system 80 provides numerous services, including: (1) advanced caching and mirroring; (2) a localized view of the origin server that is specific for a particular edge server; (3) packing content at the origin server, and unpacking it at the edge server; (4) application delivery, with support for generation of dynamic content at the edge servers; (5) collection of access and usage statistics at the edge server; (6) configurable prioritization of communication and processing, including inbound and outbound edge server communication, and processing at the edge server; and (7) streaming media support.

Rendering of these services can be flexibly configured. It is possible to define the content to which a service is applied. It is also possible to designate the edge servers or edge server groups to which a service is applicable, when the service is applicable, and to which customers the service is applied.

Provision is made for user defined predicates. Using a simple scripting language, profile editors can specify a Boolean expression over a predefined set of primitives, which must evaluate to the value true in order for the service to take place. Exemplary predicates are performance oriented predicates, such as edge server load or origin server response time, can be used to provide better quality of service and to enhance scalability.

The behavior of edge servers is controlled by service profiles, which are created by the front edge tool 86, stored at the origin web site 82, at a web server that is local to the edge server or elsewhere, and are downloaded by the edge servers. A service profile defines what services an edge server should provide, over which content profiles and under what conditions each service is enabled. The life span of service profiles is under user control. Service activation conditions, as defined by service attributes, can be combined using logical Boolean operators. Each edge server may accept multiple service directives that overlap and potentially conflict. Conflicting directives can originate from the same profile, or from multiple profiles that apply to the same edge server, e.g., when merging origin server based profiles with a local internet service provider based profile. The edge server employs a simple conflict resolution scheme.

The system 80 provides advanced caching and mirroring functionality. Caching and mirroring are implemented in the edge server 84, and configured by the front edge tool 86. Unlike conventional shared caches, which may cache content from multiple sites, The edge server in the system 80 is dedicated to its origin server. In the case of a shared edge server, each controlling origin server can register its required resources when the edge server is configured. The shared edge server reserves resources for each origin server, subject to its holding capacity and the resource allowances defined for the various origin servers.

The edge server cache is HTTP 1.1 compliant, and supports all standard caching directives. The edge server also provides pseudo one-way mirroring functionality. That is, it maintains updated replicas of selected origin server content in the edge servers.

The edge servers support the following advanced caching features:

The priority directive impacts the cache replacement policy that determines which resources are replaced when the cache is full and a new resource is requested. There are four levels of priority: normal (default), high and sticky (mirror). These levels denote the relative resource priority and are not fixed, priorities. Each level may be further assigned a range of internal priorities:

With normal priority, the resource exhibits normal popularity-based caching behavior.

The high priority mode overrides the default caching policy by assigning high priority to resources regardless of their popularity. This level is particularly useful for resources that are important to the content provider even though they may not be requested frequently.

Example: An e-commerce resource, such as an image that is part of a shopping transaction, should get a high priority in the cache despite the fact that it is accessed infrequently, in order to shorten the transaction delay.

Sticky priority is used to provide pseudo-mirroring of resources in the edge server. That is, so long as the priority is not changed, and so long as there is sufficient disk space to hold all resources having this priority, resources enjoying sticky priority are not removed from the edge server. Also, resources marked as sticky are not replaced in the edge server cache. If the edge server is prevented from adding a new, sticky, resource to its cache, an error log entry is generated. In contrast to standard mirroring, resource copying may be lazily driven by a client's request.

Resources having NoCache priority are not cached. The active update directive augments the standard passive invalidation scheme. It allows editors of the front edge tool 86 to specify when to actively schedule an update of a resource in the cache, assuming that the original resource was modified. A special case of active update is "invalidate", which means that a cached page is not replaced with anything, but is merely marked as invalid in the cache. The timing of active update can be specified using absolute time, the resource's age in the cache, or time intervals.

The prefetch directive specifies when an edge server should prefetch resources from the origin server. Prefetch times can be specified using absolute time, the resource's age in the cache, or time intervals.

Site View Functionality.

As mentioned above, the system 80 enables edge servers to maintain different views of the origin server content. Site view functionality is defined using the front edge tool 86, and is carried out at the edge server 84. Site view can be configured based on any of the following service attributes: target edge server e.g., provide a localized view for a given locale, target time, in which different content is shown at different times of the day, and target customer group, e.g., extra material is shown to preferred customers. There are two major methods for providing site views: (1) swapping the URL of an HTTP request, (2) resource transformation, in which the content of an HTTP reply is modified and (3) HTTP redirection.

URL Swapping.

The URL swapping method does not require any changes to resources. Using the front edge tool 86, profile editors create service directives that map source URLs to destination URLs. These mappings are downloaded to the relevant edge server, such as the edge server 84, in order to augment its edge server profile. Once downloaded, the edge server inspects a user initiated URL request to determine whether the requested URL is the source of a defined swap. If a swap has been defined and all other conditions hold, e.g., the timing attribute, the edge server 84 replaces the original URL request with a request for the swapped destination URL.

Content providers should ensure that the source URLs always point to valid content in the origin server even when mapping rules are defined for all edge servers. This is necessary, because a request for a resource may not always pass through an edge server, either because an edge server is not defined for the target origin server in the requesting user's internet service provider, or because of an edge server failure. In either case the original request is automatically forwarded to the origin web site, as part of the recovery mechanism of the system 80.

The following URL swapping methods are supported: A single URL-to-URL swap defines a fixed, one-to-one, swap between a single source URL and a single target URL. Most commonly the swap is between an internal URL and another internal URL. It is also possible to swap an internal URL with an external URL, which is a URL that points to another origin server.

External URLs cannot serve as a swap source, even when referred to by internal HTML resources. The reason is that external links usually do not pass through the edge server. Only when the same shared edge server serves both internal and external sites can an external link reach the edge server and be subject to a swap.

Pattern based rules for URL swapping defines "logical" swaps that may apply to multiple actual source and target URLs. The pattern is specified using regular expressions.

Example: the following pattern based swap can be used to map multiple requests for URL's from one location on the origin server to a different location:

www.znn.com/*->www.znn.com/approved-content/*.

Query expansion is a special case of URL swapping, in which URL requests have a "query" part that is handled by a program, and are mapped accordingly. A typical swap of this type maps a source URL to a target URL that is identical to the source, except it has an extra set of parameters. There is a predefined set of built-in system parameters, such as edge server ID, location, load, etc.

Query expansion follows the same behavior as other defined swaps, with the addition that, before forwarding the modified URL request to the origin server, the edge server fills in the request with the proper values for the requested parameters. It is assumed that the program that interprets the URL query request is able to accept the system parameters, and expects to receive them. In addition, such handling programs should always treat the additional edge server supplied parameters as optional, since the request might arrive without first passing through an edge server.

The front edge tool 86 enables editors to define error-handling rules that are associated with one or more URL swaps. These rules are applied when a swap results in an HTTP error code, such as 401 (unauthorized access) or 404 (resource not found). Exception handling rules can be used to provide a more meaningful explanation to the requesting client and to generate error notifications to the origin web site 82.

Example Applications of URL Swapping.

An origin server may provide edge servers with a localized view of its content, including language, relevant content, etc. The term "local" may not correspond necessarily to physical proximity. For example, the set of all edge servers that serve Hebrew-speakers and are interested in Israeli news may not be limited to edge servers in Israel.

When using browser based differentiation, an origin server may provide a "low end" view for users of web TV browsers, in which case these users receive images at low resolution. Similarly, wireless access protocol (WAP) users receive resources having stripped images. In this example the edge server is required to identify the user's agents.

When using "soft" URL masking, access to resources can be restricted to certain customer groups, by mapping them to a default "no-access" resource, e.g., for parental control purposes.

For purpose of load balancing, by swapping the domain name part of the URL, different edge servers may direct requests to multiple mirrored origin servers.

Finally, in order to achieve fault tolerance user-defined predicates are combined with JRL swapping, so that an edge server may choose different origin servers according to performance or operational criteria, e.g. the server's response time.

Resource Transformation.

Resource Transformation method requires the edge server to make changes to origin server resources that pass through the edge server as part of an HTTP response. The changes may be applied when the resource is entered into the cache or when it is sent in reply to a client request. The following kinds of transformations are supported:

Link Transformations inside HTML resources is a technique the restricts transformations only to URL references that are specified in hyperlinks embedded in HTML documents. As with URL swapping, the end-result is a redirection of an original URL to a different URL. However, the swap is done by modifying the body of the referring resource before the user's requests for the resource. In contrast, When using URL swapping the original URL is visible, and the swaps are performed dynamically after the user requests the resource, but without modifying the contents of resources.

Link disabling a special case of link transformation, which disables a hyperlink reference by removing the URL reference and converting the hyperlink to ordinary text.

Mapping of external URLs is another special case of link swapping, which involves the mapping of an external link to another link, either internal or external. An exemplary use of this method is local feed. The origin server defines a default external URL, but allows each edge server to define its own mapping to external resources that are in the vicinity of the edge server, such as local sports, local weather, local theater directory, etc.

Using an extended transformation technique, the edge server is designed to incorporate extensions that define resource transformations that are performed at the edge server. For example, an edge server may employ an HTML-to-wireless-markup-language (WML) transformation procedure. Such a transformation avoids the need to generate and store all possible versions of resources in the origin server. However since HTML transformations requires the edge server to parse and modify incoming HTML resources, they might impact performance. Thus, profile editors preferably use this method cautiously, generally in cases where the content is transferred off-line, for example, in the prefetch operation.

HTTP and Protocol Redirection.

HTTP redirection, and redirection of other protocols may be applied in order to transfer the user request to another server. This method uses standard protocol option where the destination refers the client to a different party. This is especially attractive in the following cases:

(i) The edge server directs the client to another local server where the content resides. This can be in case the edge server is unable to support such content (e.g. rich media, video, audio, streaming), and another server can.

(ii) For the purpose of load balancing between multiple local edge servers.

(iii) In case where it is clear that the content to addressed is not cacheable or carries the no-caching directive. In this case the client may be referred directly to the origin site to obtain the content without passing it via the edge server, thereby off-loading the transfer from being carried through the edge server and slowing it down.

Packing and Unpacking.

Packing and unpacking services are used to enhance the transfer of content from the origin server to the edge server, by providing tools for packing resources at the origin server and unpacking them at the edge server. There are several kinds of packing: compression, aggregation of multiple resources into one, encryption, and authentication. All packing procedures follow the same pattern:

Using the front edge tool 86, profile editors specify the documents to be packed, along with the packing procedure. The front edge tool 86 performs the packing procedure on the local resources, generates a new resource in a packed format, and stores it in the resource repository of the origin server. In addition, the front edge tool 86 generates URL swapping rules that map unpacked resources to the packed resource. Since a single packed resource may contain several unpacked resources, the mapping is not always one-to-one. In case of multi-resource packing, one of the URL swaps is referred to as the packing root, and represents the entire pack, as opposed to any of its individual resources.

When a packing service directive is downloaded to an edge server, the edge server records the URL swaps that relate to the packed resource, and it records the unpacking procedure to apply.

When the edge server needs to fetch a resource that is part of a pack, as identified by the existence of a swap rule along with a packing procedure to apply, it applies the swap, fetches the packed resource, unpacks it, and stores the unpacked resources in its cache.

It is not always desirable to fetch an entire large pack when one small resource in the pack is requested. Hence, the editors of the front edge tool 86 may specify what resources are fetched as is, and what resources should be fetched in packed form. They do so by specifying URL swap rules only for resources that are always to be fetched in packed form. A mandatory URL swap is automatically defined for the packing root. If a resource is modified in the origin server, all packs that contain it need to be identified and invalidated.

The system 80 supports several packing procedures, any of which can be applied in order to generate the final packed format, and then applied in reverse order to recover the unpacked form.

Compression compresses a single resource using a built-in compression method. The front edge tool 86 provides primitives for checking if resource compression is worthwhile, considering size and CPU load. These primitives enable profile editors to define conditions, as part of the service attributes, that specify when packing should be done.

Archival results in the creation of a single archive resource that contains a set of resources. The system 80 supports a built-in standard archive method.

Encryption results in creation of an encrypted version of the resource, using external cryptographic libraries. As such libraries are available, and due to export license considerations, it is unnecessary in many preferred embodiments of the invention for the system 80 to provide built-in cryptographic functionality.

Password processing In some preferred embodiments enables a single authentication to be performed once by the edge server on behalf of all users of that edge server, thereby offloading some origin server processing, and avoiding the need for each individual user to endure the authentication process.

Application Delivery.

The system 80 supports execution of applications on the edge server 84, which would normally execute at the origin web site 82 or on other origin servers. Such execution is transparent to the client 14, in the sense that it should be semantically indistinguishable from executing the same application at the origin server. The client 14 may, however, experience improved performance.

The application remains responsible for accessing external resources which might have become remote after its migration from the origin server to the edge server.

The edge server 84 supports several standard web server extension mechanisms, e.g., servelets, or personal home page (PHP). The application may be a web common gateway interface extension or a Java servelet. The application delivery service may depend on the compatibility of hardware and operating system platforms of the origin server and the edge server.

Statistics Collection.

The system 80 supports log generation on the edge server 84, and the periodic transmission of the logs to the origin web site 82 for further processing. The reporting frequency and the level of detail of the reports are configurable by the administrator of the system 80. It is required to embed in the origin web site 82 the capability to accept and process input posted by the edge server 84, using a standard approach such as a computer graphics interface program. At a minimum, the processing entails saving files for later use.

Communication and Processing Prioritization.

The system 80 supports the capability to prioritize communication between the edge server 84 and the origin web site 82. Communication prioritization is achieved through the setting of the term-of-service bits in IP packets. The system 80 also prioritizes the processing of requests at the edge server 84. Processing prioritization depends on operating system primitives that enable control over the scheduling priority of tasks. One possible prioritization criteria is caching priority Content Delivery Issues.

The system 80 is able to interface with existing streaming media servers, and supports the capability to differentiate content delivery services and specialize them according to the following service attributes: target content; target time; target edge server group; target customers; and user-defined conditions.

Target content is a central attribute that is mandatory in most services. It identifies a set of URLs for which a service applies. When defining a service directive, profile editors use the front edge tool 86 to select the target content to which the service applies. The service directives are downloaded to the edge servers, are checked for applicability to user requests, and applied as appropriate. Target content can be context-free or context-sensitive. Context-free content is defined as a set of resources that share a common pattern in their name. This would typically imply a common resource type, or a common location in the file system. Context-free marking is independent of the structure imposed by the HTML hyperlinks.

Example: all GIF images (ending with.gif) and JPEG (ending with.jpg)

Example: all URLs with the prefix
        http://www.cnn.com/sports/

Context-sensitive content is defined a set of resources that are reachable through the structure defined by following HTML hyperlinks. This method requires as input an HTML page, or a set that serves as the root, and an additional parameter that specifies the depth level. With level 1, which is the default, only direct hyperlinks are followed, and with level N, the same procedure is applied recursively, N times. External links are excluded. Context-sensitive marking is independent of the file-system structure and resource types. Other definitions require even more detailed description of the data. A URL may be followed by attributes such as the following: resource generation time, resource version, keywords for resource classification, resource type, resource size, methods and applications that can be applied to the resource, target groups for these resource, and other resources that are highly associated with this resource or the association classification. Target content can be selected using such content description conventions.

Target time identifies time segments in which services are applicable. Using the front edge tool 86, profile editors specify when each service directive should be applied. At the edge server 84, a service directive is performed only if the event that triggered that service, e.g., a URL request, occurs within the specified timing segments. The following time segments can be defined:

In the exact date and time segment, the standard internet representation is used, e.g., Sun, 06 Nov. 1994 08:49:37 GMT, wherein GMT is Greenwich Mean Time.

A time range is defined by exact start and end dates and times.

Repeating intervals can be daily, defined by the following 3-tuple:
    1. Every N days (default N=1).
    2. Time range within the day.
    3. Start and end dates (default=none).

Repeating weekly intervals are defined by the following 4-tuple:
    1. Every N weeks (default N=1).
    2. Day of the week.
    3. Time range within the day.
    4. Ending date (default=none).

Repeating monthly are defined by the following 4-tuple:
    1. Every N months (default N=1).
    2. Day in the month (e.g., every 9th day of month).
    3. Time range within the day.
    4. Ending date (default=none).

Specific services may impose a limit on the minimal period, to retain a reasonable system overhead.

Time can be specified in one of the following modes: GMT, origin server time (the default); and edge server time. The last mode is relative to each edge server.

The target edge server group attribute identifies the set of edge servers on which a service should be applied. Using the front edge tool 86, profile editors specify the set of edge servers for each service directive. At the end of an editing session, The front edge tool 86 generates an edge server service profile for each edge server that contains only those service directives that apply to it. This is in contrast with service profiles of the front edge tool 86, which contain a collection of service directives that are grouped by the editors for convenience.

The system 80 supports the capability to predefine meaningful grouping of edge servers, in order to simplify the application of policies applicable to a set of related edge servers. For example, edge servers may be organized by region, organization, or common interest. The edge server grouping, or edge server maps, are defined using the front edge tool 86. Administrators of the system 80 can construct hierarchies of edge servers, which are later used by profile editors in order to apply a particular service directive to a collection of edge servers. In particular, the front edge tool 86 supports defining service profiles for any internal node in the hierarchy, resulting in the application of the service directive to all edge servers in the node's subtree.

The organization of edge servers into logical groups is accomplished in multiple editing sessions if desired.

Edge server grouping is a hierarchy in which the edge servers are leaves, and internal nodes represent logical aggregations of nodes. Multiple hierarchies may exist, and the an edge server may belong to multiple hierarchies.

The front edge tool 86 supports the following edge server grouping operations: (1) creation of a new edge server group or subgroup; (2) removal of a group or subgroup; (3) addition of an edge server to a group or to a number of groups; deletion of an edge server from a group, or from any number of groups; (5) copying, pasting, and moving a group including all of its subtrees recursively; and (6) renaming an edge server group or node.

The front edge tool 86 provides an edge server graphical representation. This allows the client 14 and other users to view the list of edge servers either as a sorted list, or as a hierarchical map of edge servers. The hierarchical view allows the user to select and manipulate the hierarchies in an easy and intuitive manner. An example is shown as the view 92 in FIG. 10.

The target customer group attribute enables the editors of the front edge tool 86 to apply a service directive on a set of user agents, independent of the edge servers to which they belong. The system 80 supports two kinds of customer groups.

Edge server defined groups are identified automatically by the edge servers, and are based on system characteristics, e.g., browser type.

Groups defined by the front edge tool 86 groups denote a user grouping that is meaningful to the content provider and are defined by the editors of the front edge tool 86. For example, an origin server might define a group of selected "gold members", indicating a preferred group of customers. This technique requires the user agents to register as members of the group, and optionally requires them to be properly authorized.

Table 3 summarizes the list of services and the relevant service attributes. Each service has at least one mandatory attribute (denoted as M) and other attributes are either optional (denoted as O), or not applicable (N/A). The front edge tool 86 preferably does not allow non-applicable attributes.

TABLE 3

| | Service Attribute | | | |
|---|---|---|---|---|
| Services | Content default: all | Time default: always | Edge Server grouping default: all | Customer default: all |
| Caching & mirroring | | | | |
| Priority | M | O | O | O |
| Active Up-date | M | M | O | N/A |
| Pre-fetch | M | M | O | N/A |
| Site view | | | | |
| URL swapping | M | O | M | O |
| Resource transformation | M | O | M | N/A |
| Packing | M | O | O | O |
| Application Delivery | M | O | O | N/A |
| Statistics Collection | O | O | M | O |

TABLE 3-continued

| | Service Attribute | | | |
|---|---|---|---|---|
| Services | Content default: all | Time default: always | Edge Server grouping default: all | Customer default: all |
| Communication and Processing Prioritization | O | O | O | O |
| Streaming Media | M | O | O | O |

Operational and Management Requirements.

Three types of human operators can operate the system 80.

Content level profile editors are content domain experts, and define aspects of the edge server service profile that are content sensitive. For example, they can mark a certain news item as having high priority for a certain region, e.g., mark an article as "Hot in Asia".

System administrators define the aspects of the edge server configuration and management profiles, as well as service profiles that are system sensitive. For example, a system administrator could request a specific edge server to prefetch all new (according to the content profile) large size images off hours, perhaps because the link from the origin server to that edge server is slow.

Edge server installers are in charge of physical installation of edge servers and for their local configuration.

The system 80 supports dynamic enablement and disablement of edge server services. A disabled origin server does not provide any service to its end users. Instead, requests for such services are forwarded directly to the origin server. This feature is useful when an edge server is experiencing problems, such as a severe load, and for general debugging purposes, e.g., evaluation of improper profiles.

The disabling service may be applied either for all edge server services, or on a per-service basis. For example, the caching service of a given edge server may be disabled, while all other services continue to be provided.

The system 80 has the important capability of dynamically delegating control to the edge server. When a delegation is in force, all user requests that are intercepted by a delegatee edge server are handled completely by the edge server, without involving the origin server, except for possibly downloading profiles from the origin server. Thus, if a resource that was requested by a user resides in the cache, it is served. But if the resource is not in the cache, instead of referring the request to the origin server, an error message is returned to the user. This service is useful when the origin server is experiencing an extremely high load, e.g., a denial of service attack, since it still allows legitimate users to receive partial service, and it reduces the load on the origin server.

The complementary operation "reclaim" revokes the delegation, and restores the normal operation of the origin server.

Figure 10:
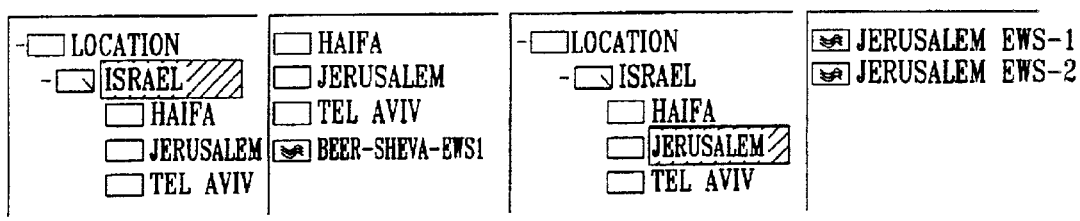
FIG. 10 is a hierarchical view of a list of edge servers according to the embodiment shown in FIG. 9.

The front edge tool 86 provides an interface for administrators of the system 80 to disable and enable edge servers, particular services, as well as to delegate and reclaim services. It is based the interface used for browsing the edge server map, shown as view 92 (FIG. 10).

The system 80 monitors remote edge servers and detects which ones are active and which are not. In addition, information is available regarding the state of the edge servers, which may be used by external monitoring tools. As with the statistics collection service, edge server monitoring requires the origin server to be able to track incoming requests from the edge server.

The system 80 provides a tool for edge server configuration. Administrators are able to add new edge servers, remove edge servers, and modify network parameters edge server properties, e.g., IP address, port number, domain name, and information relating to the origin server. In preferred embodiments of the invention this service is integrated with the edge server map view 92 (FIG. 10).

An interface to external billing software is provided, in order to provide billing services.

In the preferred embodiment of the invention, the system 80 is platform independent. It runs on standard operating systems, and uses standard web server platforms. The system 80 is compatible with both Linux and Windows-NT (TM). Support for additional systems may be added in the future.

The choice of the edge server platform depends mostly on the level of support that the system 80 provides for application delivery services that use non-portable executable code. It might also depend on the requirements of internet service providers regarding supported platforms, and on origin servers regarding compatibility with their existing operating systems platforms and web servers. However, since the system 80 complies with standard web technologies, it does not itself impose platform dependency between the origin server and the edge servers at any level, including hardware, operating system, and web server.
Security Requirements.

In general, the level of security that the system 80 provides is configurable by the content provider the system 80 supports secured encrypted transfer of profile data between the origin web site 82 and its edge servers, such as the edge server 84,provided that the origin web site 82 supports such transfer.

The system 80 provides secured authenticated access to profile data that resides in the repository of the origin web site 82 from the edge server 84, provided that the origin web site 82 supports authenticated access to its web site. Only authorized edge servers are able to read their profiles.

Secured authorized editing and deployment of edge server profiles is supported. In particular, only authorized personnel are allowed to edit and deploy certain features of the edge server 84.

The edge server 84 may download profiles from multiple sources. A specific profile source is denoted as the primary source. The primary source provides the edge server 84 with a list of additional profile sources The primary source may also specify certain restrictions with respect to service profile content that apply to the other sources.

A secure handshake protocol for initial setup of a remote edge server and its connection to the origin web site 82 is available, provided that the origin server supports such a protocol.

In regard to authorization of end users to access various resources of the origin web site 82, the edge server 84 preferably disallows bypass of the security rules of the origin web site 82. For example, if a password is required to access a particular resource on the origin web site 82, this resource cannot be accessed in the edge server 84 by end users without the same password.
Reliability Requirements.

In the event of failure of the edge server 84, all requests from user agents to the origin web site 82 are handled as if there was no edge server between the user agent and the origin server. In particular, user requests are not blocked nor do they result in an error due to a failure of an edge server. When the edge server 84 recovers, it renews its services transparently.

If the origin web site 82 fails, users, such as the client 14, are still able to work with the cache of the edge server 84.
Scalability and Storage.

The system 80 in the presently preferred embodiment does not have strict performance requirements. The edge server 84 supports at least 40 requests per second. The system 80 supports up to several thousand edge servers for each origin server.

Each edge server is configured with a domain name, an IP address or a list of IP addresses termed the boot origin server list (BOL). The boot origin server list informs the edge server of the set of first destinations that it attempts to access when it is initialized or after it has lost access to the origin server. Typically, when the edge server wakes up, it attempts to obtain its initial profile from the boot instruction page of the boot origin server list. As long as no boot origin server can be reached, the edge server attempts periodically, in a round robin fashion if multiple options exist in the BOL, to gain access to any origin server on the boot origin server list. The time period used is known as boot timeout (BTO) and is in the order of one minute.

Once the edge server reaches its first instruction page, it may receive a new list, containing a domain name, IP address, or a plurality of IP addresses, termed the working source list (WSL). The working source list may vary among edge servers depending on group membership. The working source list may also be prioritized, in the sense that while the edge server attempts to find the first operational origin server in a group, it attempts access to the various origin servers in a specified order. For example, if the working source list is composed of three potential prioritized origin server addresses, listed as PR{os1, os2, os3}, the edge server attempts to access them in that order when it accesses the working source list pages according to its working timeout (WTO). The working timeout is in the order of 5–10 minutes. If the list is given in a non-prioritized fashion, the decision may be arbitrary, round robin, or based on load balancing criteria. In the last case the server measures the response time for each server in the list, and chooses the best candidate. The selection criteria are defined in the description of the working source list. For example, round robin selection is specified by the notation RR{os1, os2, os3}. Load Balancing criteria are specified by the notation LB{os1, os2, os3}. Unlike the boot origin server list, the working source list defines origin server targets for content in which the boot origin server list includes instruction pages. The working source list groups may include edge servers as well as origin servers. For example the working source list definition PR{LB{ES1, ES2, ES3}, RR{OS1, OS2, OS3}}, specifies that for content fetching, the edge server first uses the best performing edge server among ES1, ES2, and ES3. If no edge server from this list is available, then OS1, OS2 and OS3 are accessed according to a round robin rule.

Figure 11:
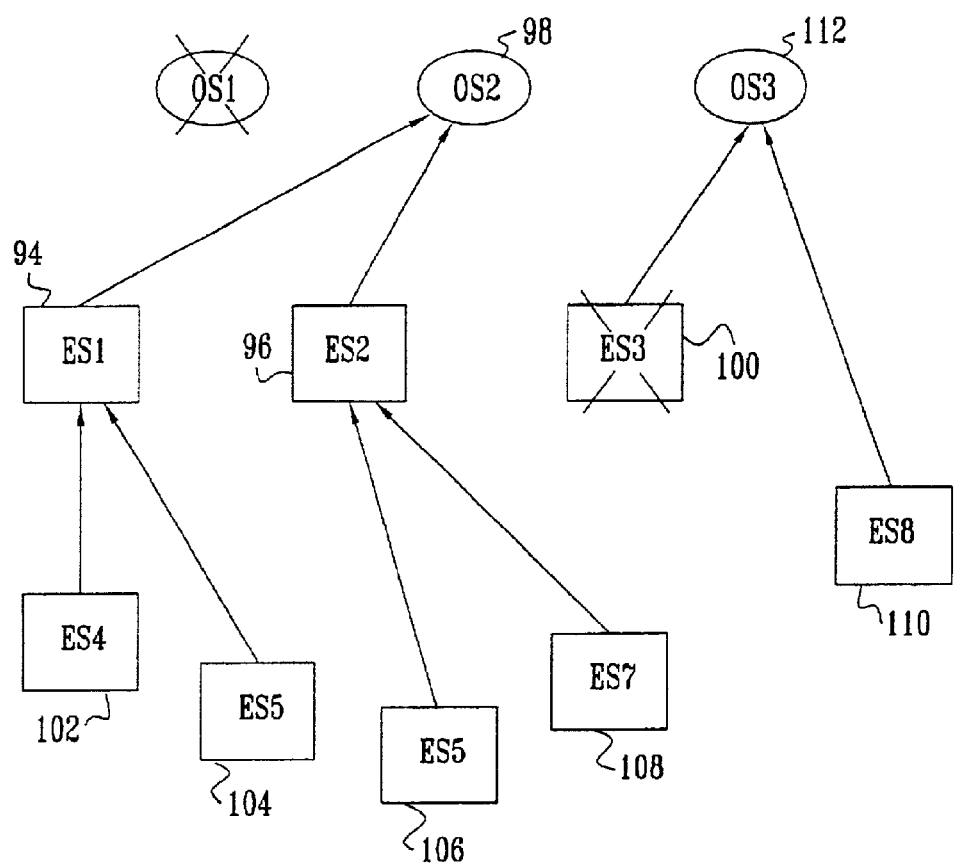
FIG. 11 is a block diagram illustrating a hierarchy of servers in accordance with an alternate embodiment of the invention.

Using the working source list convention, the administrator of the system 80 may create a hierarchy of origin servers, where multiple origin servers and edge servers reside at several levels of the hierarchy. As shown in FIG. 11, the edge servers 94, 96 have selected the origin server 98 using the working source list directive PR{OS1, OS2} while the edge server 100 used the directive PR{OS3, OS2}. The edge servers 102, 104, 106, 108 used the rule LB{ES1, ES2} and each selected the best content source in terms of delay and throughput. The edge server 110, although unavailable, would have used the directive RR{ES3, OS3} to select the origin server 112.

The use of the edge servers 94, 96 as an intermediate level cache saves multiple streams over an expensive WAN link, that would connect the edge server 94 with the origin server 98. It may also be the case that multiple working source list groups are defined for different content definitions, either according to URL prefix or according to the origin server tree structure. In such cases the graph representation varies according to the different URLs.

Figure 12:
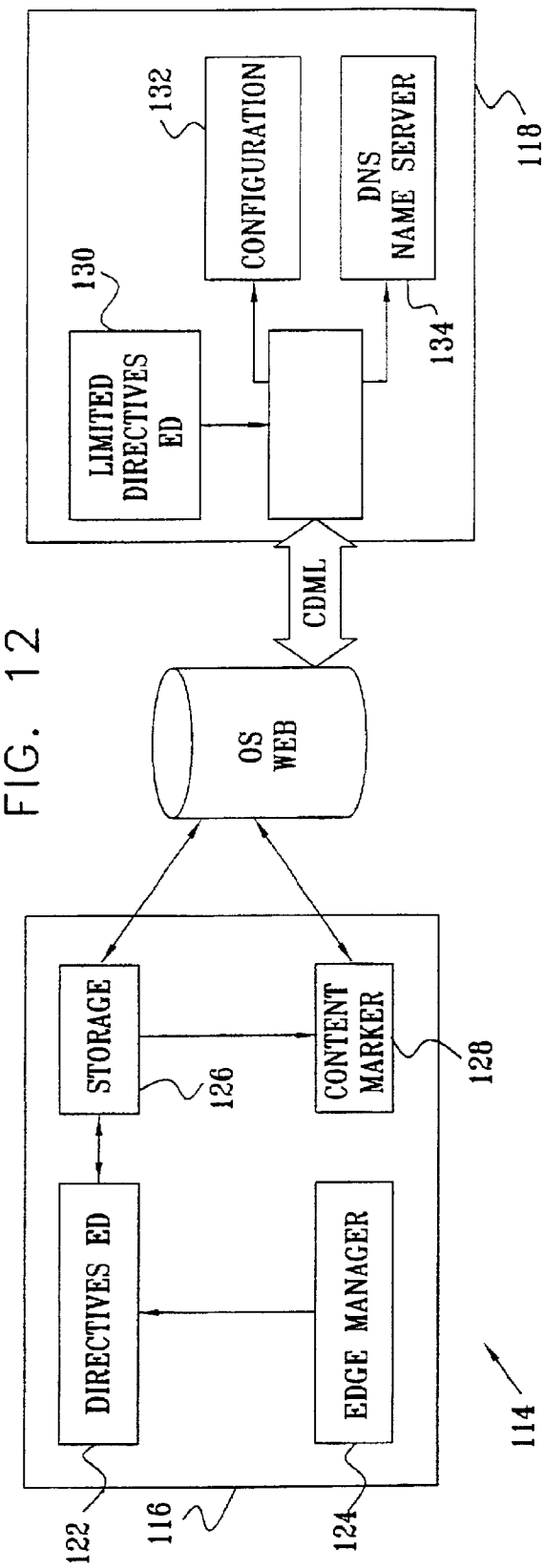
FIG. 12 is a block diagram illustrating in greater detail a portion of the arrangement of FIG. 6 wherein modules of the content delivery manager are shown that are employed in creating, deploying and executing directives for the edge server.

In a preferred embodiment of the invention a high level diagram of a system, herein for creating, deploying and executing directives for the edge server is disclosed with reference to FIGS. 6 and 12. The system 114 includes an origination component 116, which resides in the origin web server 46, and is responsible for creating and deploying the directives of the edge server 48. The system 114 also includes an execution component 118 which is located in the edge server 48, and is responsible for carry out the edge server directives produced by the origination component 116. The origination component 116 communicates with the execution component 118 using the HTTP protocol. The data passed between the two components in either direction is encapsulated using CDML.

The origination component 116 is employed by the users of the origin web server 46 for creating directives for the edge server 48 and other edge servers 120. After creation, the directives are placed on the origin web server 46 in CDML format, and are read periodically by the edge server 48 and the other edge servers 120.

The edge server directives may affect the content of the HTML objects in the origin web server 46 site. The origination component 116 is also responsible for adjusting the content of the HTML objects in the origin web server 46 site.

The origination component 116 has four components.

The directives editor 122, a part of the front edge tool, is a graphical user interface (GUI) editor used for editing the edge server directives. It is preferably written in Java (TM), and can run as an application on Windows NT (TM), and other well known platforms. The directives editor 122 uses the edge server configuration information created by the edge manager 124, and uses the storage component 126 in order to retrieve and store the edge server directives.

The storage component 126 is a database system that is responsible for storing the edge server directives created by the directives editor 122. The storage component 126 also creates and maintains CDML instruction files for the edge server 48 and the edge servers 120 that are stored on the origin web server 46 in a special directory.

The content marker 128 is a web publishing filter that is responsible for making the proper adjustments in the HTML pages when the pages are published to the origin web server 46. The content marker 128 uses the directives repository of the storage component 126 in order to perform the content marking.

The edge manager 124 configures and manages the edge server 48 and the edge servers 120 that are attached to the origin web server 46 site, and configures the hierarchy of edge servers. The link between an edge server and a group of edge servers is many-to-many. Thus, edge servers can belong to many groups, and groups can contain many edge servers. The edge manager 124 also configures different kinds of users that use the directives editor 122, and controls their access permissions as to different edge server directives.

The execution component 118 is placed at the edge server. This component is a local "representative" web Server of the origin web server 46 at the edge of the internet. The execution component 118 is responsible for serving and manipulating HTTP clients' requests. It carries out the directives dictated by the origination component 116 at the origin web server 46, and also carries out directives created locally at edge server 48 or the edge servers 120, using the limited directives editor 130, which is a limited version of the directives editor 122.

The execution component 118 can also manipulate the local DNS Name-to-IP mapping in the edge server 48 and the edge servers 120.

The execution component 118 has several components. The edge server 48 is a cache base web server that serves as a local "representative" of the origin web server 46. The edge server 48 is responsible for fetching the edge server directives from the origin web server 46, and deploying them. The edge server 48 also deploys directives defined by the limited directives editor 130. The edge server 48 is preferably configured by the edge server configuration utility 132.

The edge server configuration utility 132 is a tool for configuring the edge server 48.

The limited directives editor 130 is a GUI editor used for editing the local edge server directives. The limited directives editor 130 stores the directives locally at server of the execution component 118.

DNS Name Server.

The DNS name server 134 (or the EdgeDNS) is a DNS server that is capable of handling dynamic cache updates from a well known client. The DNS name server 134 is also responsible for finding the original name-to-IP mapping of the origin web server 46, in case it needs to be accessed by the edge server 48. The DNS name server 134 is further specialized in that it allows local cache replacements. It is an important component in the dynamic distribution of content according to the invention.

The DNS name server 134 also acts as a conventional DNS Name Server. For example it accepts and handles queries from clients, manages a local cache of DNS queries, maintains zones.

The three special services provided by the DNS name server 134 are: (1) dynamic cache replacement, as allowing external hosts to dynamically replace entries in the local DNS cache is not standard in the DNS protocols; (2) reduced time-to-live, wherein the ability of the DNS name server 134 to reply to DNS queries with a lower time-to-live for original mapping of DNS data, provides fast recovery; and (3) bypass mechanism, wherein the ability of the DNS name server 134 to provide the original DNS information to a query from the edge server, while bypassing the dynamic cache replacement mechanism, provides an access to the origin site. The conventional DNS system according to preferred embodiment of the invention as represented by the complex of DNS servers in FIGS. 1 and 2 is a distributed database that must be consistent and must always supply the same response to a given request, no matter where the request was issued. The inventive system requires a change in the conventional DNS model. According to preferred embodiments of the invention, the DNS system is required to supply different responses to a given request or query, depending on the location of the query, and the status of the edge server in the zone from which the request was made. This capability is realized in the preferred embodiments by effecting a change in the DNS system, such that local dynamic changes can be made in the database on behalf of the edge server. While there are current DNS servers that differentiate among client queries, and issue different replies accordingly, these systems are not distributed, have scalability problems and require a complex mechanism to exist. In the invention local DNS servers are modified to allow dynamic cache replacement by edge servers.

Figure 13:
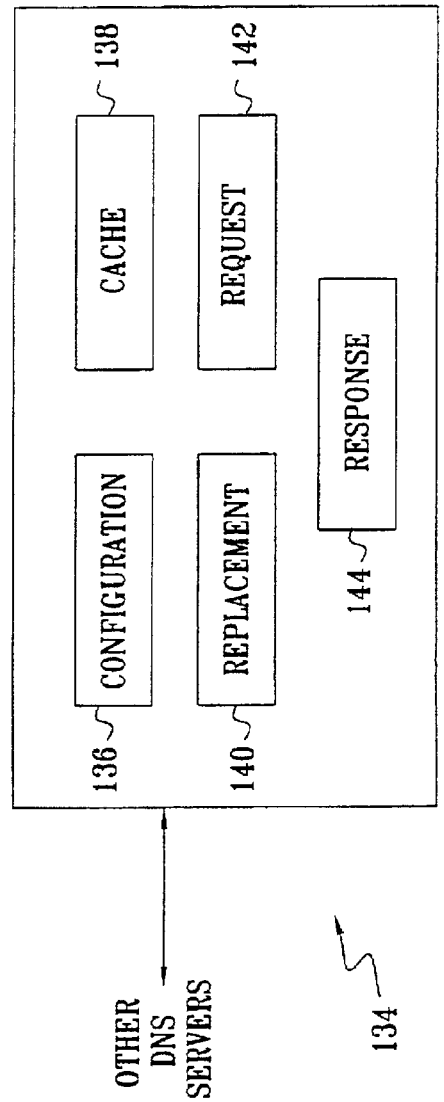
FIG. 13 is a detailed block diagram of a DNS server.

The modification of the DNS server involves changes as shown in FIG. 13, which illustrates the DNS name server 134 (FIG. 12) in greater detail. In the configuration module 136 provision is made to identify and mark zones that allow REPLACE operations to be performed. The cache module 138 distinguishes between "normal" DNS entries and "dynamically replaced" DNS entries. It is done by using a special entry type, canonical local cache replacement (CLCR). Entries of the special type are sent as the response to a DNS query, unless the query was produced by the edge server. Zones that may contain CLCR type entries are marked as "replaceable" zones, using an indicator called "nzone". This indication is used for the reduced time-to-live feature, and for the bypass mechanism feature. The replacement module 140 is responsible for handling REPLACE messages. The operation of the replacement module 140 is described by the following pseudocode fragment:

Listing 13

For each rr in the REPLACE message
parse rr from the message
if allowed do
    if "add" operation - add or replace the CLCR entry
    if "remove" operation - remove the CLCR entry The request module 142 is responsible for handling QUERY messages. It extracts relevant entries from the cache according to the query type and query domain name. The operation relevant to the EdgeDNS is described by the following pseudocode fragment:

Listing 14 get cache entries relevant to the query type and domain
for each cached entry do
    if in bypass mode
        if entry type is CLCR
            ignore it
        else
            add entry
    if not in bypass mode
        if entry type is CLCR
            add entry and ignore all other types
        else if no CLCR entries found
            add entry
    finally, if no entries found
        issue a normal DNS query to an external server
        after response arrives, send it back to the requester
        (while modifying the TTL value to max-ttl allowed)

The response module 144 is responsible for handling DNS response messages, generated by other DNS servers. It extracts relevant information from the response, and add it to the EdgeDNS cache. The operation relevant to the EdgeDNS is described by the following pseudocode fragment:

Listing 15 for each rr in the DNS response message
    parse the rr from the message
    if belongs to a "replaceable" zone,
        mark the entry as part of replaceable zone (for TTL modifications)

-continued

Listing 15 add the entry to the cache.
else
    handle the entry as normal DNS server handles it When a host in the internet needs to resolve a domain name, for example www.versedge.com, it uses a special program called "resolver" that tries to find the appropriate IP mapping for that name. The resolver generally checks the file "/etc/hosts" for locally mapped host names, and, if unsuccessful, the resolver sends a DNS query to one or more predefined name servers. The DNS query of a resolver is always a recursive query—it expects to receive a definitive answer.

The name server tries to resolve the query from its local cache. If unsuccessful, it initiates an iterative or a recursive request.

Figure 14:
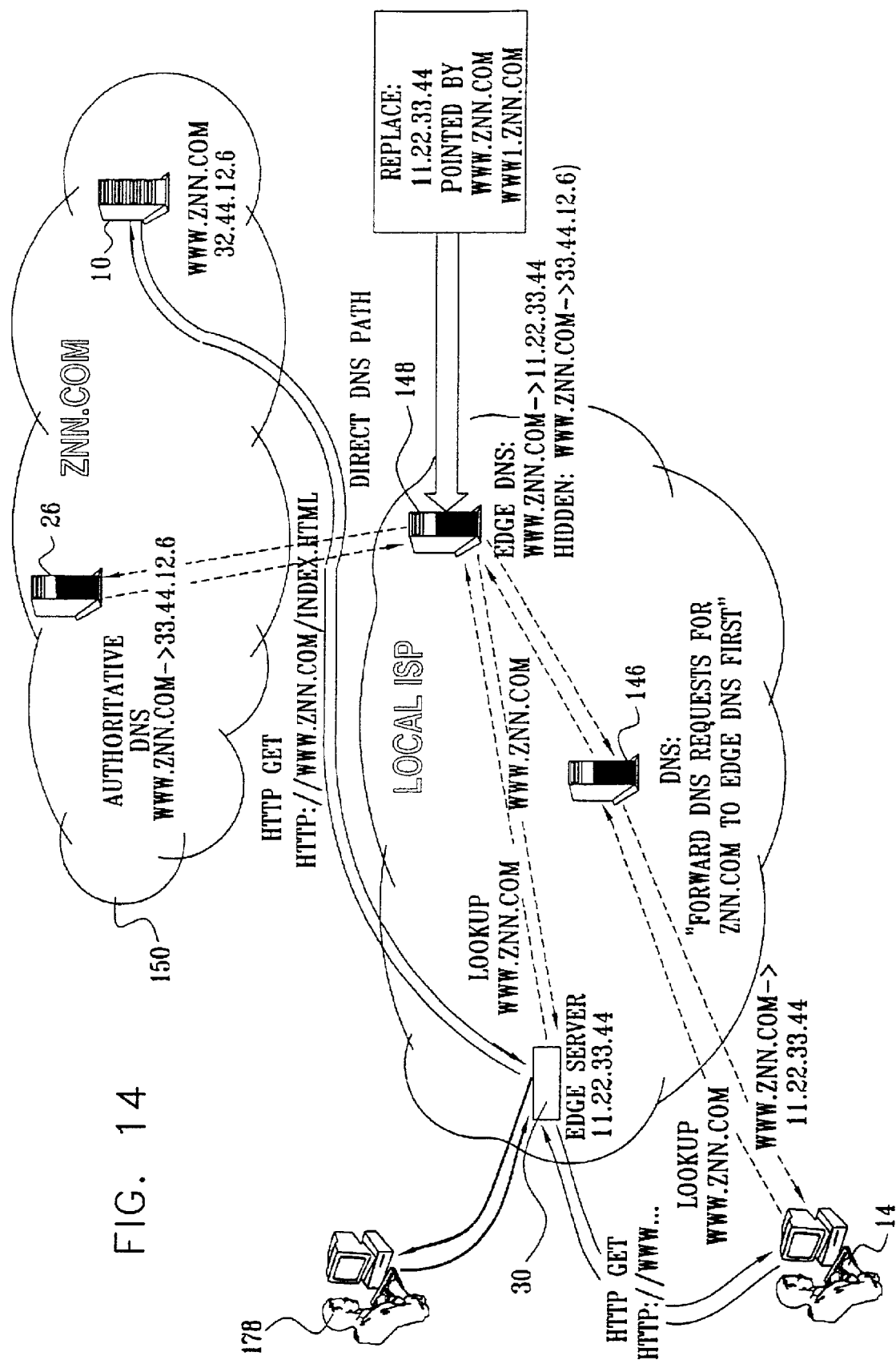
FIG. 14 represents a model of a content delivery and distribution system according to an alternate embodiment of the invention.

Referring to FIG. 14, in another embodiment of the invention, the DNS name server 146 dynamically maps a host name to the local IP address of an edge server in order to bypass the origin server 10. The DNS mapping is replaced in the local DNS name server 146. Since the action of replacing cache entries is both dangerous and intrusive, it is best to limit it to certain is hosts, and to specific zones.

The edge name server 148 enables the above noted local cache replacements. In order to efficiently use the edge name server 148, local DNS servers, shown representatively as the client regional DNS server 22, should be configured to forward DNS requests of specific zones to the edge name server 148, which resolves such requests. This is known as "zone forwarding".

As can be seen in FIG. 14 the edge name server 148 and the regional edge server 30 preferably should not be on the same host, in order to insure reliability. Should the regional edge server 30 crash, the edge name server 148 still needs to answer queries from DNS servers of local internet service providers.

Should the edge name server 148 fail, there is a built in recovery operation. The DNS system can ignore the forwarding command in case the forwarder is not available. This is done if the directive "first" is used in the forwarding statement. When a DNS server, such as the client regional DNS server 22, recognizes the failure of the edge name server 148, it overrides the forwarding command and accesses the authoritative DNS server 26 instead. After the edge name server 148 recovers, there is an interval during which it is still ignored by the client regional DNS server 22, but after a while, the client regional DNS server 22 renews the forwarding command.

The forwarding command is performed only when the data is not found in the local cache of the client regional DNS server 22, so when there is a failure of the edge name server 148 and the original data is fetched from the authoritative DNS server 26, the time-to-live of the data may be relatively long.

The edge name server 148 complies with all DNS Protocol and some DNS extensions, e.g., DDNS, Notify. It runs on Linux (TM) and Windows-NT (TM) on x86 processors. There is expected to source code available for other operating systems and platforms. The reliability and performance of the edge name server 148 are at least that of known name servers. The edge name server 148 complies with the security extensions that are included or will be included in the DNS system, e.g., DNSSEC, and TSIG.

The edge name server 148 has a direct path 150 to external authoritative DNS servers such as the authoritative DNS server 26, which is particularly important if firewalls exist.

The edge name server 148 allows trusted hosts and edge servers to modify the mapping of domain names to IP address (type "A" records) in its local cache. The modifications can be replacement of data, removal of data, or refresh of TTL for existing data. The modifications are performed in the cache, since the modified information must be invalidated after some short time (TTL) if the mapped domain becomes unreachable, or the mapping becomes incorrect for other reasons. Only non-authoritative Domain Name information in the edge name server 148 is appropriate for replacement, as authoritative information is not dynamically cached information.

If there is more than one edge server in the organization or the internet service provider, as may be required for reasons of fault tolerance or load balancing, the local cache replacement mechanism should support such a layout. The local cache replacement operations allow resource record sets that map a given domain name to more that one IP address. There may be a need to set precedence among the IP addresses, or to have a dominant IP address, that is replaced only in case the dominant edge server is not available.

The edge name server 148 may supply DNS data from its cache, which may shortly be overridden due to local cache replacement. If the data in the cache is the original DNS data, it may contain a relatively long TTL, perhaps hours or days. Since the cached information may be propagated to other DNS servers on responses, it is desirable to associate a short TTL with the original information. This forces a higher rate of data invalidation and increases the rate of local DNS queries. Thus, when there is local cache replacement, accurate data is propagated to all the DNS servers.

The edge name server 148 must supply the original DNS data when a host that appears as the target of the local cache entry does a query. The reason for doing so is to prevent a loop back. This feature is important since a locally mapped host may itself issue a query to the original host name. Such a request would be issued by the host directly to the edge name server 148, which must not return the requesting host's IP address as the name resolution. Instead the edge name server 148 resolves the original IP address for such a query.

The edge name server 148 supports the removal of multiple domain name mappings to a single IP address. The removal process occurs when the targeted IP address becomes unreachable or if an edge server needs to disconnect from a domain name. If more than one domain name is mapped to the same IP address, all of them need to be removed from the cache.

Security requirements (DNSSEC) are important considerations in the realization of the edge name server 148. Local cache replacement operation is intrusive, and may result in the propagation of bogus information into the DNS system. Currently the security of the conventional DNS system is doubtful, and it is important not to create further breaches of security, such as Trojan horses. As DNS security features becomes more widely accepted, they will likely will involve electronic signatures for the DNS entries. The edge name server 148 is capable of supplying an additional signature, using the keys of the administrative DNS zone. The simplest way to obtain the signature is from the administrative DNS zone, assuming the DNS name server 146 and the edge name server 148 are trusted. Meanwhile, local cache replacement operation is limited to trusted hosts only in the currently preferred embodiment.

The design of the edge name server 148 is based on BIND version 8 with an add-on for local cache replacement. Local cache replacement involves the usage of a new DNS message opcode, called "REPLACE". Since the REPLACE messages are not part of the standard DNS protocol and are not standard DNS messages, the REPLACE messages use an undefined opcode, and can be sent on a special and non-standard UDP/TCP port as implemented by the user.

The development of the edge name server 148 is based on the "BIND-8.2.2-P5" suite from Internet Software Consortium, Redwood City, Calif. In the present embodiment, it supports the Linux operating system provided by Red Hat, Inc., Durham, N.C. and Windows-NT (TM), provided by Microsoft, Inc., Redmond, Wash. Its operation requires VisualC++ to be installed.

In order to support the above operations, and to support the various requirements, including fetching the original data, the following cache design was chosen:

A new address local cache replacement (ALCR) data type is used for local cache replacement of domain name to IP mappings. Data of the type "LCR can only placed in the hashtab of BIND.

This type is used for an IP address resolution, and is always checked before an "A" data type. Thus it hides the "A" data type. If an ALCR data type is found in the hashtab for a given domain name, and the request originated from an IP address that is unmatched in the mapping, the data is then returned to the requester as an authoritative reply.

The resource record set of ALCR type is removed from the hashtab only in the case of cache invalidation, and not merely for clearance of cache space.

The ALCR data type includes a pointer to a "mapping collection" of the mapped IP address. Whenever an entry of type ALCR is added or removed from the cache, the mapping collection for the entry's IP address is updated. This collection is used for performing global operations on an IP address. No other changes are needed in the cache.

As mentioned above, the edge name server 148 responds to a request message having the opcode REPLACE. Standard DNS servers ignore the REPLACE messages, since the REPLACE opcode is currently not implemented in DNS.

The REPLACE operations can be translated according to the following actions: (1) "Add/Replace" adds or replaces the local IP mapping of a domain name, thus hiding the original remote IP mapping, except for locally mapped IP addresses. (2) "Remove" deletes the local IP mapping for a domain name, thus exposing un-hiding the "original" remote IP mapping if it exists. (3) "Multiple Remove" removes all the local cache entries that are mapped to a given IP address, thus exposing the original remote IP mapping for a domain name suffix, if it exists.

Type "A" cache entries with a domain name belonging to a zone for which a REPLACE operation is allowed have their TTLs reduced to some maximum, relatively short TTL before a DNS reply is issued. The maximum TTL value may differ from zone to zone. Alternatively, a default global TTL value may be set for the entire domain name space. The values are kept in the zone configuration file.

In order to increase the security of the edge name server 148, and in particular to prevent intrusive replacement operations by a non-privileged host, there is a need to limit such operations for certain known hosts. Preferably such operations are permitted only in specific zones. In other zones, access to specific hosts is permitted. Such configuration options are supported using "zone configuration" information that may be maintained for specific zones, or globally for the whole domain name space.

During configuration of the edge name server 148, the configuration file is read, and configuration information data structures are created. In order to support the TTL and security features described above, the configuration file should contain the following nonconventional changes:

In the options section two additional keywords are added to the "options" section:

```
options {
    [replace-listen-on [ port ip_port ] { address_match_list }; ]
    [ max-cache-out-ttl number;]
};
```

The identifier replace-listen-on is a list of IP interfaces and the port number that the edge name server 148 monitors for REPLACE messages.

The identifier max-cache-out-ttl is the maximum value of the output TTL for cached information. This value is valid, and would be referenced in the event an edge server crash.

In the zone section there is configuration information that is to be specifically applied for some zones. The syntax is similar to that in the options section:

```
zone "<name>" {
    type forward/replace;
    [ allow-replace { address_match_list };]
    [ max-cache-out-ttl number;]
};
```

The "forward" zone type already exists in BIND v8.2. The "replace" zone type is new, and is required for a zone that is used only for caching, and which allows local replacements. The new zone is used in order to allow specific access configuration for the purpose of local cache replacement.

The identifier allow-replace specifies which IP addresses are allowed to perform local cache replacement for the zone. The default is to deny replacement from all IP addresses.

Figure 15:
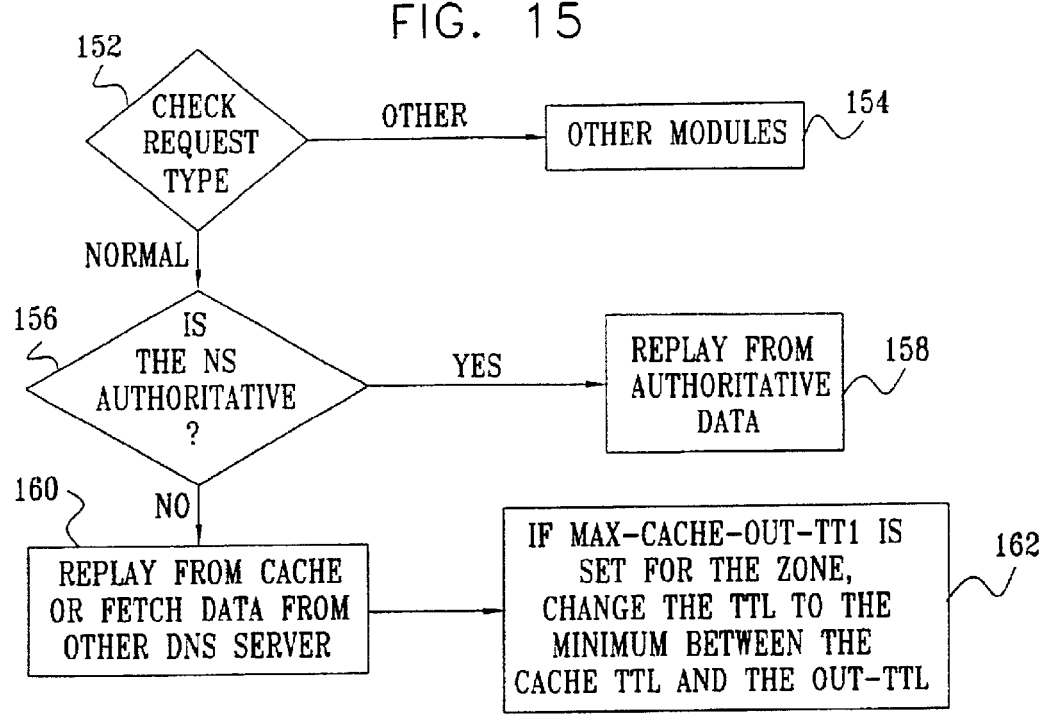
FIG. 15 is a flow diagram illustrating control flow in an edge name server shown in FIG. 14.
Figure 16:
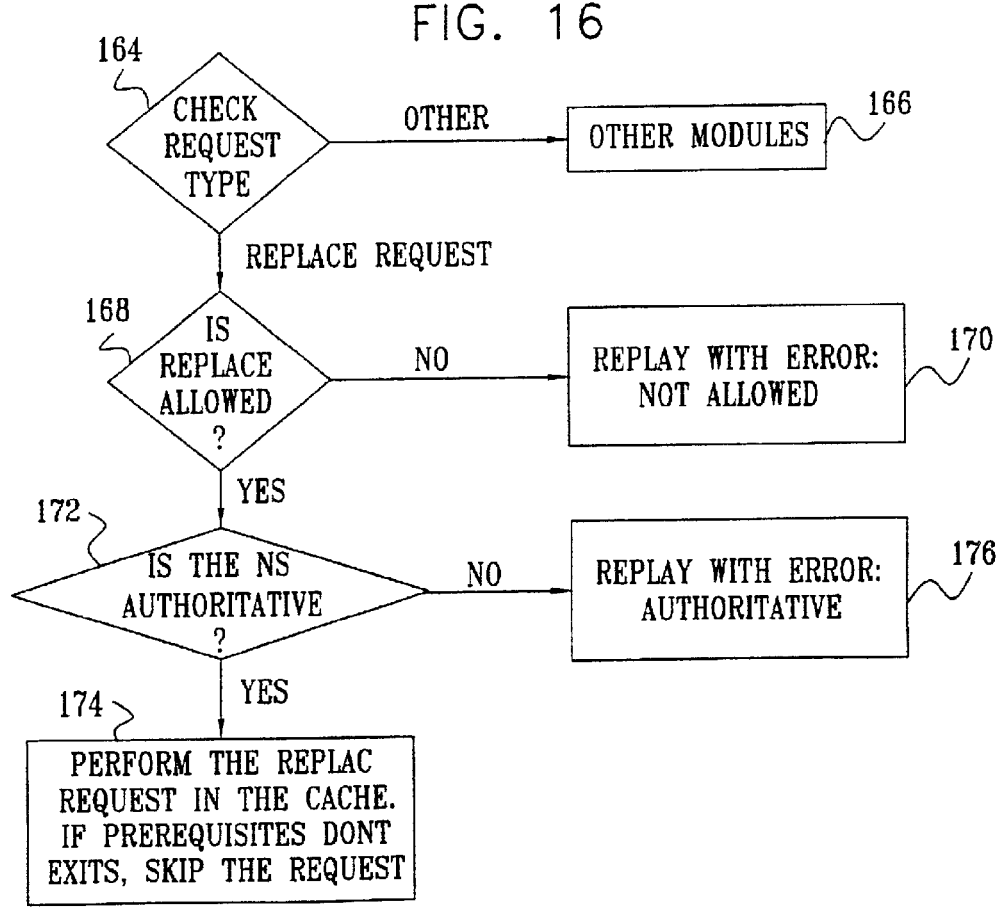
FIG. 16 is a flow diagram illustrating further aspects of control flow in the edge name server of FIG. 15.

Control flow within the edge name server 148 is explained with reference to FIGS. 15 and 16, wherein DNS queries, for type "A" data, is described. In FIG. 15 a normal DNS query is processed in the edge name server 148, while FIG. 16 illustrates the handling of a REPLACE query.

Referring now to FIG. 15, at decision step 152 it is determined whether a normal DNS query is being received by the edge name server 148. If not, then the query or message is referred to other modules at step 154. If a normal DNS query has been received, then at decision step 156 it is determined whether the name server is authoritative. If the result of the determination is affirmative, then the database of authoritative data is consulted, and a reply is made accordingly at step 158.

If the result of decision step 156 is negative, then at step 160 the required information is fetched from the local cache of the edge name server 148. In the event of a cache miss, the data is obtained from another DNS server. At step 162, if the value max-cache-out-ttl has been set for purposes of aging in the cache, then the TTL of the data is adjusted to the minimum of the value out-ttl and the value cache-ttl.

Before discussing the procedure for replace requests, a further description of the interface and data structure is provided. It will be recalled that "REPLACE" opcode messages are used for managing local cache replacement in the edge name server 148.

The underlying DNS message format is conventional. Some changes are necessary, however. For example, more error codes are possible using the opcode REPLACE than under the opcode QUERY, and some fields must be overloaded.

The REPLACE message, shown below in Table 4 is compatible with the conventional DNS message format as described in the document RFC 1035, Domain Names—Implementation And Specification, which can be found on the Internet Web Page, http://www.ietf.org/rfc.

TABLE 4

| Header | |
|---|---|
| local IP info | local IP used for mapping |
| Replace Names | local ACR resource records to be replaced |
| Additional | resource records holding additional information |

The header contains the following fields as shown in Table 5, as further explained in 6:

TABLE 5

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| QR | | Opcode | | | | | | ID | | | | | | | |
| | | | | | | | | Z | | | | | RCODE | | |
| | | | | | | | | IPCOUNT | | | | | | | |
| | | | | | | | | RPCOUNT | | | | | | | |
| | | | | | | | | RMCOUNT | | | | | | | |
| | | | | | | | | ADCOUNT | | | | | | | |

TABLE 6

| ID | A 16 bit identifier assigned by the program that generates any kind of query. This identifier is copied to the corresponding reply and can be used by the requester to match replies with outstanding queries. |
|---|---|
| QR | A one bit field that specifies whether this message is a query (0), or a response (1). |
| OPCODE | A four bits field that specifies kind of query in this message. This value is set by the originator of a query and copied into the response. The value reserved for REPLACE is 13. |
| Z | Reserved for future use. Must be zero in all queries and responses. |
| RCODE | Response code-this 4 bit field is set as part of responses. When a request is given, the RCODE field is set to '1111'. The values and meanings of this field within responses are as follows: |

| Mnemonic | Value | Description |
|---|---|---|
| NOERROR | 0 | No error condition. |
| FORMERR | 1 | The name server was unable to interpret the request due to a format |

TABLE 6-continued

|  |  | error. Any part of the message that does not comply with the description provided causes a FORMERR. |
| --- | --- | --- |
| SERVFAIL | 2 | The name server encountered an internal failure while processing this request, for example an operating system error. |
| NXDOMAIN | 3 | Some name that ought to exist, does not exist. |
| NOTIMP | 4 | The name server does not support the specified Opcode. |
| REFUSED | 5 | The name server refuses to perform the specified operation for policy or security reasons. |
| RMNXRR | 6 | Some RR that needed to be removed, does not exist |
| RPAUTH | 7 | The server is authoritative for some replacement RR domain names in the REPLACE. |
| RPRMERR | 8 | Errors RMNXRR and RPAUTH occurred. |
| IPCOUNT | | The number of IP addresses that we perform the mapping on. |
| RPCOUNT | | The count of RRs to be used for cache replacement. |
| RMCOUNT | | The count of RRs to be used for cache removal. |
| ADCOUNT | | Additional Data RRs. |

The local IP section has the same format as that specified in the above noted document RFC1035 at section 4.1.2], with the fields redefined as shown in Table 7.

TABLE 7

| 0 | 1 | 2 | 3 | 4 | 5 | 6 | 7 | 8 | 9 | 1 0 | 1 1 | 1 2 | 1 3 | 1 4 | 1 5 |
| --- | --- | --- | --- | --- | --- | --- | --- | --- | --- | --- | --- | --- | --- | --- | --- |
| | | | | | | | INAME | | | | | | | | |
| | | | | | | | ITYPE | | | | | | | | |
| | | | | | | | ICLASS | | | | | | | | |

Under the opcode REPLACE this section is used to denote the target IP addresses of the records being updated. All records to be replaced must be mapped to the same IP addresses. When there is more than one IP address in the local IP section, all the operations are performed for all the given IP addresses. This is advantageous if the edge server has more than one IP address.

The INAME is the IP address in the text format of four numbers having a range of values (0–255). The ITYPE must be of type PTR, and the ICLASS must be IN.

The replace names section contains a set of resource records to be added or replaced. The format of this section is as specified by the document RFC1035, section 4.1.3. The syntax of the resource records is as follows: there is a single edge server with its NAME field set to the domain name that is to be mapped to the local IP address. The TYPE must be ACR; the class must be IN; and the field RDATA must be empty. The name is mapped to the local IP address that was given by the field INAME. The TTL must be set to a value greater than zero. If this is not done, then a default TTL of 300 seconds is used.

If an entry with fields, NAME and IP having the same values exists, it is replaced. Otherwise a new entry having the current values of the fields NAME and IP is added.

The remove names section contains a set of resource records to be removed. The format of this section is as specified by the document RFC1035, section 4.1.3. The syntax of the resource records is as follows: a single RR with its NAME field set to the domain name that is already mapped to the local IP address and is removed. The TYPE must be ACR, the class must be IN. The TTL must be set to zero.

The NAME field can start with the character '*' as the first node. This is a special pattern that forces a global removal of all the names ending with the postfix of the NAME field (without the '*' character). For example "*.znn.com" means all the names that end with "znn.com" and include "a.b.znn.com", "a.znn.com", "znn.com", etc. It should be noted note that the meaning of the '*' character is slightly different than the one described in the document RFC1035.

When a REPLACE message is accepted, each resource record in the replace names and remove names sections is evaluated, then checked against the security module and the authority module. If the entry with the NAME field can be processed, the action is performed.

If there is a problem with a specific resource record, other than a syntax problem, an error resource record is created, and the RCODE field of the reply is updated according to the error type.

Referring again to FIGS. 14 and 16, at decision step 164 it is determined whether a normal DNS query is being received by the edge name server 148. If not, then the query or message is referred to other modules at step 166. If a REPLACE DNS query has been received, then at decision step 168 it is determined whether the request is allowed. If not, then at step 170 an error message is generated and the procedure terminates. If the request is allowed, control proceeds to decision step 172, it is determined if the name server is authoritative. If the result of the determination is affirmative, then, if the necessary conditions in the cache are met, cache replacement is effected at step 174. If at decision step 172 it was determined that the name server is not authoritative, then at step 176 an error message is generated and the procedure terminates.

The installation of the edge name server 148 is similar to the installation of BIND. The name of the name server daemon is changed from "named" to "edge-dns". Generally there are no other changes in the installation procedure.

The configuration of the edge name server 148 is similar to the configuration of BIND. The default configuration file name is changed from "named.conf" to "edge-dns.conf".

In some preferred embodiments, an interactive installation and configuration script is added. When operating under the Linux operating system this is accomplished using the "Linuxconf" program.

It is desirable during installation of the edge name server 148 to test the behavior of the REPLACE opcode, and to check the behavior of the system in the internet.

Initially, in order to test the "REPLACE" opcode and related operations, a program called "nsreplace" simulates the client during operation. The program nsreplace issues several kinds of REPLACE messages, and evaluates the return codes received from the edge name server 148.

After testing the "REPLACE" opcode, a global system test evaluates the behavior of the edge name server 148, in situations given requiring cache replacement. The tests include checking the returned TTL values, the differences in the replies, given the source IP address, checking the fall-over of cache entries, when there are no TTL refreshed entries or locally replaced cache entries.

The tests are performed using both nsreplace and another program, nslookup, a program that can produce DNS queries and analyze the response from the DNS server, including TTL information. The program nslookup issues "normal" requests requiring the edge name server 148 to look up and report the identification of name servers.

Edge Server Overtake.

In certain cases when a request for non-cacheable pages is made, assuming that such pages are known by their URL value, the regional edge server 30 can forward the request, along with its original client IP source address. Assuming that the firewall is open for this IP addresses, the response is received directly by the client with no need to further involve the regional edge server 30.

DNS and Edge Server Reliability.

The basic edge server reliability within a region is provided by the edge name server 148. It is guaranteed that the failure of a particular edge server causes the mapping of all requests to the domains supported by that edge server to be mapped to the origin server 10. In case the edge name server 148 is installed independently of the regional edge server 30, a check is performed to insure the operation of the regional edge server 30. The regional edge server 30 guarantees this by issuing the cache REPLACE command to the edge name server 148, marking its own IP address stored in the cache of the edge name server 148 with a short time-to-live. This ensures that if the regional edge server 30 fails, after at most this time-to-live period the IP address of the origin server 10 is used again, and the requests will no longer served by the edge server. Therefore so long as the edge name server 148 functions reliably, there is protection against failure of the regional edge server 30. Once the regional edge server 30 is restored to operation, the REPLACE command is reissued periodically and the user requests are once again selectively directed to the regional edge server 30.

In case the edge name server 148 fails, and stops responding to DNS queries directed to the regional DNS name server 146, the authoritative DNS server 26 in the domain of the origin server 10 is accessed as an alternative server. In this circumstance, client requests are directed to the origin server 10. The authoritative DNS server 26 attempts after some time interval to contact the edge name server 148 again in order to reactivate the regional edge server 30 and the edge name server 148.

File Downloads with Registration/Authorization.

Often there is a requirement for the origin server 10 to allow large file downloads. Such downloads can be software binaries, PDF, MP3 or MPEG files, having sizes in the order of tens to hundreds Mbytes. It is advantageous that such files be available in the cache of the regional edge server 30 and other edge servers, particularly if they are repeatedly downloaded to remote areas, in order to reduce the overhead of the servers of the relatively slow internet backbone.

It is possible, however, that the content provider permits downloading of such content only after the user requesting the material has been authorized or otherwise properly identified. For example, free software is typically given after a proper form has been completed. In such a case the origin server 10 dynamically links the authorized user, such as the client 14 to the downloaded material after obtaining a registration or authorization. In this situation, it is normally inappropriate for the origin server 10 to remotely cache such content. Yet, since such entries are non-cacheable, the load on the origin server 10 and its latency could increase significantly.

The regional edge server 30 has two different ways of dealing with the caching of such downloads. First, the download is cached or pre-fetched, using its specific service profile. If all users of the regional edge server 30 are authorized then the content is cached. In case users should still not be authorized two alternatives can be employed.

1. An unauthorized client 178 is directed to the origin server 10 where the user fills a form, possibly containing a password, or is otherwise authenticated. The client is then provided with a dynamic page where a value URL=X is displayed as the download entry. The user is also stamped with a cookie identifier, NAME, and a value Y. When the request for X is intercepted by the regional edge server 30, it applies a secure function $$Z=F(X,Y) \qquad\qquad (\text{eq. 1}).$$

The value Z directs the user to the appropriate download content. At this point the cookie may be erased or nullified. Alternatively, cookies are not employed. In this circumstance, when the unauthorized client 178 first approaches the regional edge server 30 for the download, the regional edge server 30 extends the HTTP header with the client IP address V. The origin server 10 responses with a form that is filled in by the client 178, and then with a URL U. When the client 178 accesses the download link U, the function is applied as $$Z=F(V,U) \qquad\qquad (\text{eq. 2}).$$

Instead of forwarding the request to the origin server 10 to fill the form, the form is preferably provided to the unauthorized client 178 by the regional edge server 30. This can be done by downloading a page using JSP or some other in-page code. The code is executed by the regional edge server 30, and if the form is found to be valid, the page that enables the download is sent to the client 178.

Directives Editor.

Referring now to FIG. 12, the operation of the directives editor 122 of the front edge tool is now disclosed in further detail. The directives editor 122 is a graphical editor for generating service profiles. It is an important aspect of the invention that they directives editor 122 enables content providers to define advanced services on the edges of the internet. That is, providers can control what content is viewable by different users at different regions, and how content is delivered to different users/regions in terms of latency, reliability and overall quality of delivery.

Figure 17:
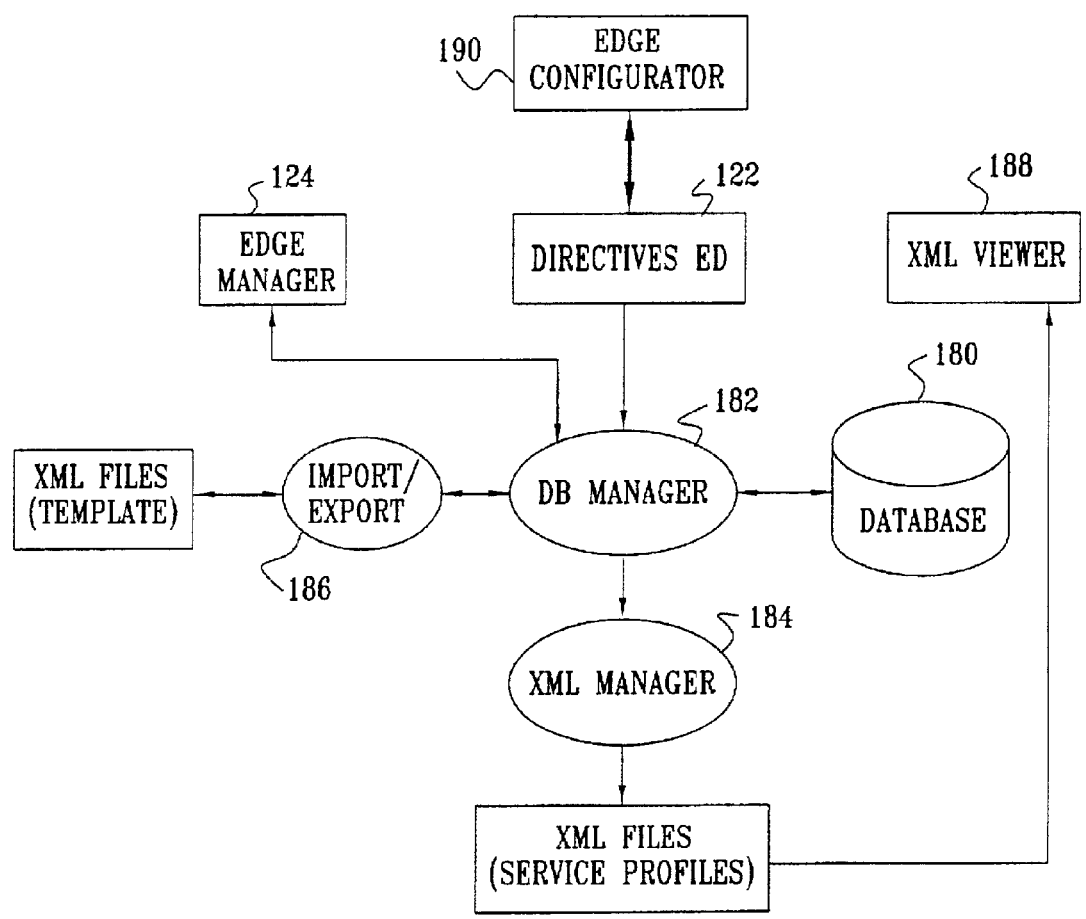
FIG. 17 is a block diagram in which elements of the content delivery manager of FIG. 6 are shown in greater detail.

As seen in FIG. 17 the directives editor 122 reads and writes data from a database 180, using the facilities of the database manager 182. The database manager 182 preferably uses the SQL protocol for sending and retrieving data from the database 180. It should be noted that the database manager 182 is the only element of the system having a direct connection to the database 180. An XML manager 184 is responsible for generating XML files based on the database 180 for use by the edge server 48 and the edge servers 120 (FIG. 6). Another important component is the import-export facility 186 that can export profiles from the database 180 to XML files, and can import profiles from XML files to the database 180.

The XML viewer 188 displays the XML files, which contain the service profiles in XML structure for use by the edge server 48 and the edge servers 120 (FIG. 6).

Service Profiles.

The directives editor 122 enables the user to define a complex profile grouping, which includes any number of service attribute categories, such as edge server group, customer group and time. The user can select edge server groups, customer groups and one time target for each profile.

Within the service attribute category the governing logical condition is "or", while between the categories the logical condition is "and". The directives editor 122 generates a profile record for each intersection group.

EXAMPLE

If the user defined a certain profile on the URL:
www.cnn.com/news/weather.html, wherein
edge server groups: ($G_1$=U.S.A, $G_2$=Italy).
Customer groups: ($C_1$=gold, $C_2$=bronze).
Time: (T=every day 22:00–23:30).
then the directives editor 122 generates a profile according to the logical formula $$(G_1+G_2)*(C_1+C_2)*T = G_1*C_1*T + G_1*C_2*T + G_2*C_1*T + G_2*C_2*T.$$

The profile condition records are shown in Table 8.

The directives editor 122 can generate exceptions by removing a general profile from a specific group, or by changing a general profile of a subgroup. If the user defined an exception for a certain group, then all the subgroups are affected by this exception.

An exception is a reference to a profile. Thus if the profile has changed then the exception has changed in a corresponding manner.

TABLE 8

| Profile ID | Condition ID | ES | ES group | Customer group | Time |
| --- | --- | --- | --- | --- | --- |
| 100123 | 1 | Null | U.S.A | Gold | 22:00–23:30 |
| 100123 | 2 | Null | U.S.A | Bronze | 22:00–23:30 |
| 100123 | 3 | Null | Italy | Gold | 22:00–23:30 |
| 100123 | 4 | Null | Italy | Bronze | 22:00–23:30 |

EXAMPLE

There is a Profile 100124 on U.S.A. The user can remove this profile from any subgroups, e.g. New York, by generating an exception for the New YOrk subgroup.

Profile 100124
URL: www.cnn.com/news/today.html
edge server groups: U.S.A.
Customer groups: gold, bronze.
Time: every day
22:00–23:30.
Exception 78965 Profile 100124
edge server groups: New York.
Action: Remove Profile The user has 2 options to select content in a service program. First, in context-free content selection, as explained above, the service profile includes a set of URLs that can be identified by a common pattern in their name. A special "private" case occurs when the "pattern" is a single fully specified URL. In this method only the "pattern" is sent to the edge server, because the edge server can understand from the pattern whether the URL has a policy or not.

Second, in context-sensitive content selection, users mark pages through links to them from other pages. In this mode, both the marked URL and the link pointing to it are significant for setting a policy, as explained below. If a "recursive" option is enabled, the marking also applies to the links that emanate from a given URL, up to a user-defined depth of recursion. When using context-sensitive content selection a list of all affected URLs is generated, because the edge server can not determine from the root URL whether a subsidiary URL has a profile or not.

Using the directives editor 122, the user can view a site map and define service profiles using the map.

Users are optionally allowed to "subscribe" to an edge server as a member of a defined user group, for example in a customer based group. Otherwise, it would be too costly to allow any user to access any edge server and receive appropriate service. In some preferred embodiments virtual policies of an edge server, with the exception of caching policies, are loaded when a user from the group accesses the edge server. The inherent delay caused by the loading process is only experienced by the first user of the group.

The directives editor 122 allows the user to create any hierarchical group structure, and the structure is dynamic. The user can insert a new level after an existing level of the hierarchy, remove an existing level, move edge servers from node to node, and more.

Using the directives editor 122, localization of URLs can be accomplished automatically, in which case they directives editor 122 maintains a list of localization rules. Optionally the user may manually select all the URLs to be localized.

When local feed is required, there are several possible operations to be performed. If the local feed is defined on an internal site link, within the domain ov the origin web server 46 (FIG. 6), then the local feed operation is interpreted as a translation rule.

When the original link is external, three steps should be performed:

1. Create a new HTML file within the local site domain that contains a redirection to the original link.

2. Replace the original external link with the new local HTML file's link.

3. Create a translation rule from the HTML file's link to the "local feed".

There are 3 possible ways to perform the "local feed" transformation:

1. Referring again to FIGS. 6 and 17, an edge configurator 190, located in the origin web server 46, creates a mapping from edge server groups to for each local feed type descriptor. Since the mapping is constructed in the origin web server, a specific translation rule is sent to each of the edge servers 48, 120 upon creation of a local feed. The local feed mapping is done only at the origin web server 46, and the edge configurator 190 is responsible for appropriately configuring URLs requiring local feed for the edge server 48 and the edge servers 120.

2. There are special "local feed" variables, e.g., "$WEATHER", "$CURRENCY", etc. The translation rule that is created when the local feed operation is performed contains an abstract mapping from the original URL to the variable name, rather than to a URL. The edge server is provided with a local configuration for such special variables. Preferably the configurations of all the special variables are held in a hash table. If the variable is not configured or has no value, then no translation is performed, and the local feed is not activated. The edge server is responsible for configuring special variables, and the origin web server has no control of the process.

3. The local feed translation can be logically based. The edge configurator 190 creates an abstract rule for translating the original URL to "local feed". The edge server is required to have a local translation rule for such a URL to a local URL. If the local translation rule is not declared, then no translation is performed, and the local feed is not activated. The edge server is responsible for configuring the local URLs, and the origin web server has no control of the process.

Site view is an important feature of the directives editor 122. Site view enables content providers to control not only how content is provided, but to assign content to different groups. Thus, a particular physical origin server may not appear the same, when viewed from different edge servers. The directives editor 122 preferably enables users to view the result of the operation on a browser, because the operation is quite complicated.

Referring now to FIG. 6, for each file to be compressed the packing services facility 58 requires a translation rule from the original URL to the compressed file. The edge server 48 is includes a program to perform uncompression.

For each archive a rule is generated to translate from the root URL to the archive file. The translation rule is valid for every URL specified in the URL's list. All the files in the archive are inserted into the cache according to specification of the URL.

For each encrypted file there is also a translation rule. The edge server translates the URL into the relevant encrypted data.

With reference to FIG. 12, the storage component 126 is a database engine th no control qat is responsible for two functions. It stores and retrieves the directives created by the directives editor 122. It also maintains and places the directives for edge servers.

The storage component 126 enables the following actions: store directives; query directives; and create and update edge server directives.

The content marker 128 is part of the origin server publishing system. It is a filter that is responsible for changing the HTML content according to the directives created by the directives editor 122. The content marker 128 preferably operates in any conventional publishing environment, and is an interactive tool, as well as an automatic tool that runs in the background of the origin server publishing environment, or other publishing tool. All available publishing information possible is used. The graphical user interface of the content marker 128 can be used by any content publisher in order to alter or monitor the filtering operation. The graphical user interface recognizes several interference levels encountered during the filter operation, has filtering guidelines, and offers a manual filtering option.

The edge manager 124 is responsible for creating the hierarchical groups of edge servers, and for configuring and monitoring the status of the edge servers. The edge manager 124 is a GUI editor.

Execution Component.

The modules of the execution component 118 (FIG. 12) will now be disclosed in further detail.

The edge server 48 is a web server and accordingly supports the standard protocols, such as HTTP 1.0 and HTTP 1.1. The edge server 48 also supports the security level of a standard web server, including authentication and access control. Since the edge server 48 also acts as a cache proxy server, it is designed to support several caching protocols, including configuration as a parent proxy server, in the event there is a proxy server for external access.

Figure 18:
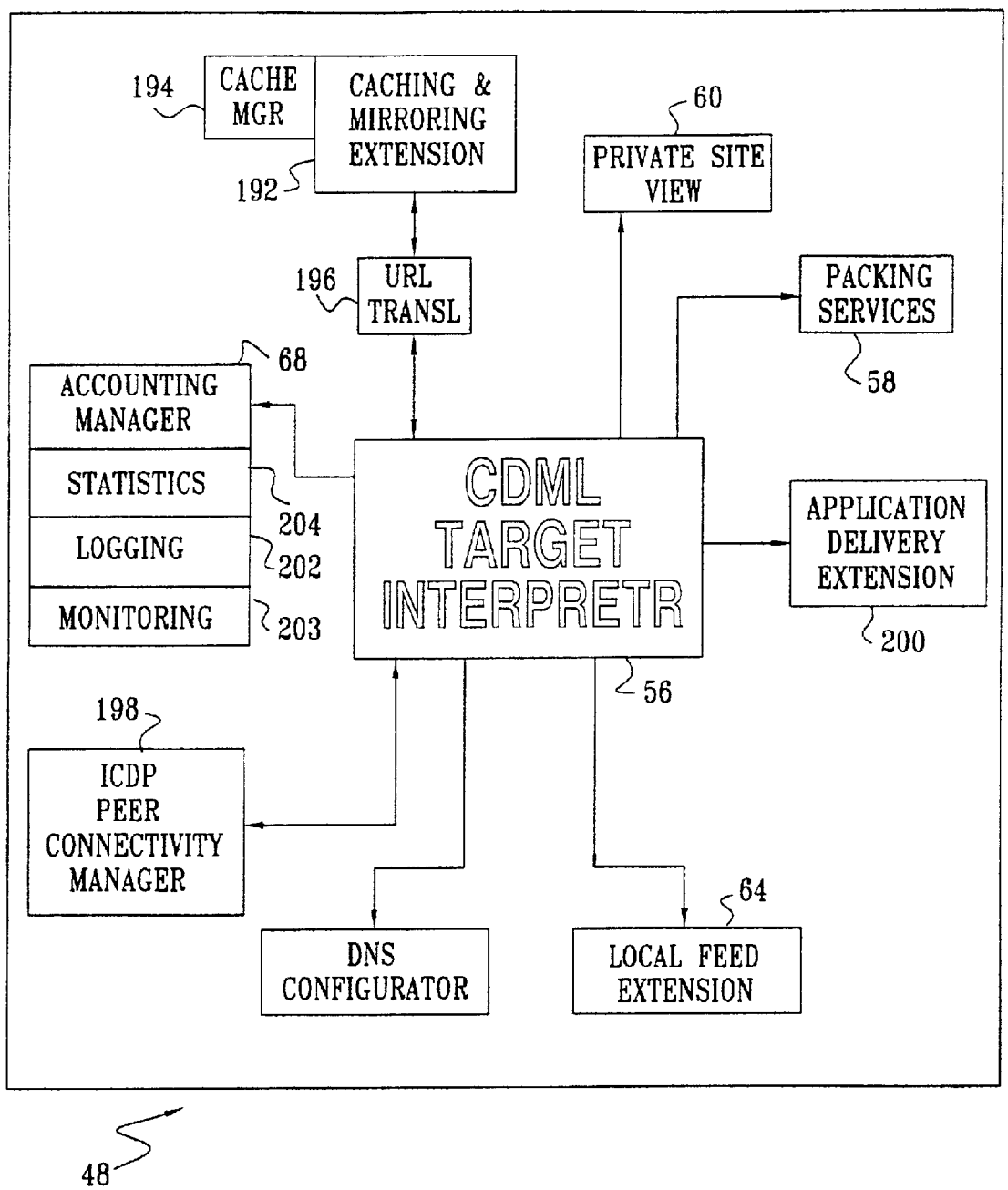
FIG. 18 is a block diagram of a DNS edge server in accordance with the invention.

Referring to FIGS. 6, 12, and 18, the edge server 48 has a built-in CDML interpreter, the target interpreter 56. The target interpreter 56 fetches CDML instructions from CDML files periodically, and parses them, then dispatches the parsed instructions to other components of the edge server 48.

The caching and mirroring module 192 holds all the web objects that were fetched from the origin web server 46. It is desirable that the caching and mirroring module 192 be as simple as possible, as it is anticipated that most of the end user's requests will eventually be forwarded to it. It includes a cache manager 194 that removes pages according to a governing cache policy.

The cache policy is based on priority queues together with a least recently used (LRU) or any other cache removal algorithm. Preferably, in order to increase the effectiveness of caching management, while not overly increasing its complexity, an aging mechanism can be imposed to move objects from higher priority queues to lower priority queues.

The cache manager 194 is designed to handle cache misses effectively. Such misses are preferably fetched from the origin web server 46. Since some actions, such as URL translation, packing and site view may change the data returned from the origin web server 46, the cache manager 194 employs an external network module (not shown) to fetch an object from the origin web server 46. The external network module is configured to return the object after it has been proceed by other relevant edge server.

The URL translation module 196 performs URL translation in three possible cases:

1. When a client request arrives at the edge server 48, and the request contains a URL that can be translated.

2. When an HTML reply from the origin web server 46 arrives at the edge server 48, the URL translation module 196 can translate some of the URL links in the reply before caching it and before forwarding it to the end user. However such a translation is intrusive, and is generally probably not be dynamic, since it is performed before caching the reply. When there are multiple views of the same web page, for example, differentiated by customer types, this option requires a different cached object for each view.

3. This is similar to the immediately preceding case, except but when the edge server 48 replies from the cache, the translation is done each time the data is read from the cache.

In the preferred embodiment, the edge server 48 supports only the first of the three cases. In the second case the translation can be avoided by performing it in the origin web server 46, and then supplying a rule for transforming the original URL into the translated duplicate.

The edge server 48 supports "client view" by adding client data to the requests which identify the edge server, the client, or both. Such client view information is added during the URL translation process, or by the module that handles the client requests. This facility is indicated as the private site view 60. It is created at the origin web server 46, and is sent to the execution component 118 as a set of URL translation rules. This can be accomplished prior to caching an HTML object, so the object is cached directly as the site view.

The local feed extension module 64 may impose heavy engineering requirements on the edge server. In particular the edge server is required to have a local configuration for each variable or local feed translation rule. These configurations are preferably held in a hash table. As was explained above, regardless of whether the translation rules are based on variables, or are logically based, the edge server has full responsibility for configuration.

The packing services facility 58 involves extensive URL translation. It also requires extensive data processing for the uncompression, archive extraction, and decryption of the incoming reply from the origin web server 46.

Uncompression is performed on a previously compressed web object. It involves 6 stages: (1) Initially a check is made to determine if the document is in the cache. The cache entry of the uncompressed document is according to the original URL. (2) If there is a cache miss, then URL translation is applied to the compressed document. (3) The compressed document is fetched, and (4) uncompressed. (5) A translation is made to recover the uncompressed document's URL. (6) The uncompressed document is stored in the cache. The URL translations are performed for each cache refresh operation.

Archive extraction is performed by the packing services facility 58. The fetching of an archive is usually done during mirroring operations conducted by the caching and mirroring module 192, and therefore occurs according to a refresh schedule, rather by client request.

The decryption process is more complicated than the other processes. Since it is assumed that encryption is used for simplifying access to the origin web server 46, the original security level of the origin web server 46 must be preserved. In other words, if the encrypted data is meant only for privileged end users, it should be denied to non-privileged end users. Decryption by the packing services facility 58 involves 6 stages: (1) Checks are made to determine if the document is in the cache, and if the end user has appropriate privileges. The cache entry of the decrypted document according to the original URL. If the client is not privileged, the request is forwarded to the origin web server 46 for authentication. (2) If there is a cache miss, then URL translation is applied to the encrypted document. (3) The compressed document is fetched, and (4) uncompressed. (5) A translation is made to recover the decrypted document's URL. (6) The decrypted document is stored in the cache, using a privileged mode.

The connectivity management module 198 provides dynamic connection and disconnection of the edge server 48 and the edge servers 120 from the web path of the origin web server 46, or the policy control server 42. In general, the connectivity management module 198 module performs the following actions: (1) It automatically identifies delegated domain names from the CDML directives. Preferably it has received the list of all the delegated hosts and responds act according to this list. (2) The connectivity management module 198 is able to add itself or reconnect to a DNS Server for a given domain name, using the IP address of at least one local DNS server. (3) It is capable of disconnection from a DNS Server. (4) The connectivity management module 198 removes the entire set of its dynamically allocated domain names from the DNS server before it shuts down.

The application delivery module 200 allows the execution of applications in the edge server 48. An application can be one of the following: (1) An executable that is compatible with the operating system of the edge server 48; (2) a servlet that is tuned to work in a distributed environment; and (3) a computer graphics interface bin script (cgi-bin scripts) that is capable of working in a distributed environment.

The application delivery module 200 module runs servlets and cgi-bin scripts in the same way as they are executed by a web server. Executables are supported in a set-root environment with a special user ID, and with limited access permissions.

The edge server 48 logs its operation using the logging module 202, which is responsible for logging several kinds of activity, such as connections, requests, replies, errors, cache actions, translations, etc. The configuration and detail level of the logs is set by the edge server configuration utility 132. The logs are formatted in a text format, as used in other well known web and proxy servers.

The accounting manager 68 includes a statistics collection module 204, which is responsible for processing the log information, and sends a report to the origin web server 46. In some preferred embodiments the edge server 48 ships raw data, but optionally it may process and summarize the statistics data before sending it.

Content.

As described above the end user can optionally select content using either the context free or context sensitive technique.

While this invention has been explained with reference to the structure disclosed herein, it is not confined to the details set forth and this application is intended to cover any modifications and changes as may come within the scope of the following claims:

What is claimed is:

1. A content and application delivery system comprising:
   an origin web site having an origin web server, said origin web server having a first memory for storing a first version of a web content;
   an edge server disposed in an external domain name zone communicating via a data network with said origin web server and a policy control server, said data network comprising a regional DNS server;
   said edge server having a second memory for storing a second version of said web content and deriving said second version from said origin web server according to directives of a service policy that resides at said policy control server, said edge server downloading said directives of said service policy from said policy control server via said data network;
   an edge DNS server linked to said regional DNS server, said edge DNS server being configured as an authoritative DNS server for said external domain name zone, said edge DNS server further being configured to cooperate with said regional DNS server to cause a request of a user for a URL within said origin web site requiring a DNS address resolution by said regional DNS server to be resolved so as to redirect said request to said edge server and to entirely avoid an access of said origin web site by said user,
   wherein responsively to said request a third version of said web content is provided to the user from said edge server, said third version being derived from said second version in accordance with said directives of said service policy.

2. The system according to claim 1, wherein said policy control server is said origin web server.

3. The system according to claim 1, wherein said directives of said service policy are specified using an XML based language.

4. The system according to claim 3, wherein said directives of said service policy include a description of resources of said origin web site.

5. The system of claim 4 wherein said description of resources is specified using a resource definition framework, said resource definition framework having extensions comprising protocol, type, size, encoding convention, creation time, expiration time, keyword, target groups, an alternate URL for fetching said resources, and a location of a code for creating a dynamic resource;
   wherein said description of resources includes at least one of said extensions.

6. The system according to claim 4 wherein said directives of said service policy include a description of users at a target site.

7. The system of claim 1 wherein communication between said edge server and at least one of said policy control server and said origin web server is effected using an http protocol or an https protocol.

8. The system of claim 1, wherein said origin web site comprises a plurality of origin web sites, and said first version is distributed in said plurality of origin web sites, defining thereby a distributed first version, said second version being derived from said distributed first version.

9. The system of claim 1 wherein said policy control server comprises a plurality of web servers.

10. The system of claim 9, wherein said web servers are said origin web server and said edge server being located at a third party site.

11. The system of claim 1, wherein said directives comprise a description of an edge server group associated with said origin web site.

12. The system of claim 11, wherein said description of an edge server group includes information concerning at least one of an organization type, geographical region, language, business relation to said origin web site, edge server hardware capabilities, edge server software capabilities, edge server security specifications, internet location and internet connection speed of members of said edge server group.

13. The system of claim 1, wherein said second version is derived from said first version by the steps of:
selecting resources from said first version according to predetermined criteria comprising at least one of a resource URL, time of resource generation, length, keyword list, target groups, data format, and key;
transforming a selected resource in said second memory responsive to said directives, wherein said directives comprise a description of an edge server group associated with said origin web site to define a transformed selected resource; and
storing said transformed selected resource in said second memory.

14. The system according to claim 13, wherein said second memory comprises a cache memory.

15. The system according to claim 13, wherein said predetermined criteria comprise a presence of updated resources in said first version that are absent in said second version.

16. The system according to claim 1, wherein said service policy differentiates a resource of said first version from a resource of said second version according to an attribute of said edge server and an attribute of at least one of said first version and said second version.

17. The system according to claim 16, wherein said attribute comprises at least one of a caching priority, caching validation, a caching invalidation, preposition at a predetermined time and preposition upon an occurrence of a predetermined event.

18. The system according to claim 1, wherein said service policy differentiates a resource of said second version from a resource in said third version according to at least one of attribute of the user, attribute of the edge server, request time and attribute of the resource.

19. The system according to claim 1, wherein one of said directives of said service policy instructs said edge server to redirect said request of said user to another web resource.

20. The system according to claim 19, wherein said another web resource is located at said origin web site.

21. The system according to claim 19, wherein said another web resource is external to said origin web site.

22. The system according to claim 19, wherein said request is redirected by sending an http redirect instruction from said edge server to said user.

23. The system according to claim 19, wherein said request is redirected to another resource by said edge server by modifying a URL portion of said request and loading the resource from the origin site.

24. The system according to claim 19, wherein said request is redirected according to an attribute of the user.

25. The system according to claim 1, wherein at least two of said first version, said second version, and said third version are identical.

26. The system according to claim 1, wherein a group of resources of said first version is stored in a compressed form, and a corresponding group of resources of said second version is uncompressed by said edge server according to said directives.

27. The system according to claim 26, wherein said group of resources of said first version is stored in a packed form, and said corresponding group of resources of said second version is unpacked by said edge server according to said directives.

28. The system according to claim 1, wherein a resource of said first version is in an encrypted form, and a corresponding resource of said second version is decrypted by said edge server according to said directives.

29. The system according to claim 1, wherein a resource of said first version is communicated by a first protocol to form a resource of said second version, wherein said resource of said second version is communicated by a second protocol to form a resource of said third version.

30. The system according to claim 29, wherein said first protocol is file transfer protocol and said second protocol is http.

31. The system according to claim 29, wherein said first protocol is identical to said second protocol, wherein parameters of said first protocol differ from parameters of said second protocol.

32. The system according to claim 1, wherein a resource at said URL has an action defined therein, and said edge server performs said action.

33. The system according to claim 32, wherein said action comprises execution of an application.

34. The system according to claim 33, wherein said application is a web form processing application;
wherein in a first step said edge server communicates a form to be completed by the user; and
in a second step parameters of said form are transmitted from the user to said edge server.

35. The system according to claim 33, wherein said application is a user password processing application;
wherein in a first step said edge server triggers a password template to be filled by the user; and
in a second step form parameters of said password template are transmitted from the user to said edge server.

36. The system according to claim 33, wherein instructions of said application cause said edge server to identify an attribute of said user that is included in said request and to return resources in said second memory of said edge server that are associated with a said URL of said request and said attribute of said user.

37. The system according to claim 36, wherein said attribute is identified in a request header having a cookie, and said resources are defined in said directives of said service policy, wherein said directives are stored in said edge server.

38. The system according to claim 33, wherein said application is a user password processing application;

wherein said edge server forwards said request to said origin web server and delivers a user name and a user password to said origin web server;

wherein responsive to said user name and said user password said resource is transmitted by said origin web server to said edge server.

39. The system according to claim 38, wherein said resource is held in a cache by said edge server.

40. The system according to claim 33, wherein said application is a web common gateway interface extension or a Java servlet.

41. The system according to claim 1 wherein the user is a member of a group, and responsive to said request said edge server authenticates a membership of the user in said group.

42. The system according to claim 1, wherein said edge server is in communication with an external web server via said data network, and a portion of said second version is obtained from said external web server according to said service policy.

43. The system according to claim 1, wherein a resource at said URL is received by said edge server from said origin web server and stored therein, wherein said resource is modified prior to being stored in said edge server responsive to attributes of said edge server, said user, and said resource that are specified in said directives of said service policy.

44. The system according to claim 43, wherein said resource is modified by replacement thereof with a second resource that is local to said edge server.

45. The system according to claim 43, wherein said resource is modified by combination thereof with a second resource that is local to said edge server.

46. The system according to claim 43, wherein said resource is a web page that is modified by an operation consisting of at least one of frame insertion, textual or graphic insertion, html code insertion, link modification, embedded object modification, and adaptation of said web page to requirements of a browser.

47. The system according to claim 46, wherein a first URL in an embedded link of said web page is modified to define a second URL having a domain name value such that a routing of said request using said second URL is directed to said edge server.

48. The system according to claim 1, wherein said request is modified according to edge server, user and resource attributes that are specified in said directives.

49. The system according to claim 48, wherein said request is modified by an operation consisting of at least one of an addition of user information to an http header of said request, adding a cookie to said request, modifying said URL of said request, modifying form content of said URL, modifying a body of said request, and adding password information to said URL.

50. The system according to claim 48 wherein a resource at said URL comprises a first URL, and said request is modified by an operation comprising modifying said first URL to define a second URL having a domain name value such that a routing of said request using said second URL omits said edge server.

51. The system according to claim 48, wherein a resource at said URL comprises a first URL, wherein in a first operation said first URL is modified to define a second URL having a domain name value such that a routing of said request using said second URL is directed to said edge server, and in a second operation said second URL is modified to define a third URL having a domain name value such that a routing of said request using said third URL omits said edge server.

52. The system according to claim 1, wherein said second version is obtained by said edge server from said origin web server according to a modification of said URL, said modification designating a portion of said first version in said origin web server.

* * * * *